US006951977B1

(12) United States Patent
Streitenberger et al.

(10) Patent No.: US 6,951,977 B1

(45) Date of Patent: Oct. 4, 2005

(54) METHOD AND DEVICE FOR SMOOTHING A MELODY LINE SEGMENT

(75) Inventors: Frank Streitenberger, Ilmenau (DE); Martin Weis, Ilmenau (DE); Claas Derboven, Ilmenau (DE); Markus Cremer, Ilmenau (DE)

(73) Assignee: Fraunhofer-Gesellschaft zur Foerderung der angewandten Forschung E.V., Munich (DE)

( * ) Notice: Subject to any disclaimer, the term of this patent is extended or adjusted under 35 U.S.C. 154(b) by 0 days.

(21) Appl. No.: 11/013,041

(22) Filed: Dec. 14, 2004

(30) Foreign Application Priority Data

Oct. 11, 2004 (DE) ...................... 10 2004 049 478

(51) Int. Cl.[7] ............................ G01P 3/00; G10H 1/02; G10H 7/00

(52) U.S. Cl. .......................................... 84/626; 84/645

(58) Field of Search .................. 84/608–609, 625–627, 84/633, 660, 645

(56) References Cited

U.S. PATENT DOCUMENTS 6,111,183 A * 8/2000 Lindemann .................. 84/633
2003/0205124 A1 * 11/2003 Foote et al. .................. 84/608

FOREIGN PATENT DOCUMENTS

DE 102004010878.1 3/2004
DE 102004033829.9 3/2004
DE 102004033867.1 3/2004

OTHER PUBLICATIONS

Baumann, U. A Method of Recognition and Separation of Multiple Acoustic Objects. Technische University Munich. 1995.

Correa, J. Towards the Automated Analysis of Simple Polyphonic Music: A Knowledge-based Approach. Department of Electronic Engineering, Queen Mary, University of London. Jan. 2003.

(Continued)

*Primary Examiner*—Jeffrey W. Donels

(74) *Attorney, Agent, or Firm*—Glenn Patent Group; Michael A. Glenn

(57) ABSTRACT

A tone smoothing is performed such that to each time section of a melody line segment a number is associated such that for all groups of directly neighboring time sections, to which the same spectral component is associated by the melody line segment, the numbers associated with the directly neighboring time sections are different numbers from one to the number of the directly neighboring time sections, for each spectral component that is associated with one of the time sections of the melody line segment, the numbers of those groups are added up to which time sections of the same the respective spectral component is associated by the melody line segment, a smoothing spectral component is determined as the spectral component for which the greatest summing-up results, and the melody line segment is changed, by associating the determined smoothing spectral component to each time section of the melody line segment. By this, in particular the inadequacy of monophonic audio signals is considered, usually comprising a transient process at beginnings of notes, so that only to the end of the notes the desired note pitch is achieved.

37 Claims, 30 Drawing Sheets

OTHER PUBLICATIONS

Golo, M. A Robust Predominant-F0 Estimation Method for Real-Time Detection of Melody and Bass Lines in CD Recordings. Electrotechnical Laboratory. Ibaraki, Japan.

Klapuri, A. Multipitch Estimation and Sound Separation by the Spectral Smoothness Principle. Proc. IEEE International Conference on Acoustics, Speech, and Signal Processing. Salt Lake City, UT. 2001.

Klapuri, A. Multiple Fundamental Frequency Estimation Based on Harmonicity and Spectral Smoothness. IEEE Trans. Speech and Audio Processing. 2003.

Klapuri, A. Number Theoretical Means of Resolving a Mixture of Several Harmonic Sounds. Proc. European Signal Processing Conference. Rhodes, Greece. 1998.

Klapuri, A. Signal Processing Methods for the Automatic Transcription of Music. Tampere University of Technology. Publications 460. Mar. 17, 2004.

Klapuri, A. Sound Onset Detection by applying Psychoacoustic Knowledge. Proc. IEEE International Conference on Acoustics, Speech, and Signal Processing. Phoenix, AZ. 1999.

Klapuri, A., et al. Automatic Estimation of the Meter of Acoustic Musical Signals. Tampere University of Technology, Institute of Signal Processing. Report 1. Tampere, Finland. 2004.

Klapuri, A., et al. Efficient Calculation of a Physiologically-Motivated Representation for Sound. Proc. 14th IEEE International Conference on Digital Signal Processing. Santorini, Greece. 2002.

Martin, K. A Blackboard System for Automatic Transcription of Simple Polyphonic Music. M.I.T. Media Laboratory Perceptual Computing Section Technical Report No. 385.

Paiva, R, et al. A Methodology for Detection of Melody in Polyphonic Musical Signals. Audio Engineering Society 116th Convention. May 8-11, 2004. Berlin, Germany.

* cited by examiner

METHOD AND DEVICE FOR SMOOTHING A MELODY LINE SEGMENT

CROSS-REFERENCE TO RELATED APPLICATION

This application claims priority from German Patent Application No. 102004049478.9, which was filed on 11 Oct. 2004, and is incorporated herein by reference in its entirety.

FIELD OF THE INVENTION

The present invention relates to the extraction of a melody underlying an audio signal. Such an extraction may for example be used in order to obtain a transcribed illustration or musical representation of a melody underlying a monophonic or polyphonic audio signal which may also be present in an analog form or in a digital sampled form. Melody extractions thus enable for example the generation of ring tones for mobile telephones from any audio signal, like e.g. singing, humming, whistling or the like.

DESCRIPTION OF THE RELATED ART

For some years already, signal tones of mobile telephones have not only served for signalizing a call anymore. The same rather became an entertainment factor with growing melodic capabilities of the mobile devices and a status symbol among adolescents.

Earlier mobile telephones partially offered the possibility to compose monophonic ring tones at the device itself. This was complicated, however, and often frustrating for users with a little knowledge regarding music and was unsatisfactory with regard to the results. Therefore, this possibility or functionality, respectively, has largely disappeared from new telephones.

In particular modern telephones, which allow polyphonic signalizing melodies or ring tones, respectively, offer such an abundance of combinations, so that an independent composition of a melody on such a mobile device is hardly possible anymore. At most, ready-made melody and accompaniment patterns may be newly combined in order to thus enable independent ring tones in a restricted way.

Such a combination possibility of ready-made melody and accompaniment patterns is for example implemented in the telephone Sony-Ericsson T610. In addition to that, the user is, however, dependent on buying commercially available, ready-made ring tones.

It would be desirable, to be able to provide an intuitively operable interface for generating a suitable signalizing melody to the user that does not assume a high musical education but is suitable for a conversion of own polyphonic melodies.

In most keyboards today, a functionality exists known as a so called accompanying automatics, to automatically accompany a melody when the chords to be used are predetermined. Apart from the fact that such keyboards provide no possibility to transmit the melody provided with an accompaniment via an interface to a computer and have it converted into a suitable mobile telephone format in order to be able to use the same as ring tones in a mobile telephone, the use of a keyboard for generating own polyphonic signalizing melodies for mobile telephones is not an option for most users as same are not able to operate this musical instrument.

DE 102004010878.1 with the title "Vorrichtung und Verfahren zum Liefern einer Signalisierungs-Melodie", whose applicant is the same as the applicant of the present invention and which was filed at the German Patent and Trademark Office on Mar. 5, 2004, describes a method using which with the help of a java applet and a server software monophonic and polyphonic ring tones may be generated and sent to a mobile device. The approaches for extracting the melody from audio signals proposed there are very prone to errors or only useable in a limited way, however. Among others it is proposed there to obtain a melody of an audio signal by extracting characteristic features from the audio signal in order to compare the same with corresponding features of pre-stored melodies and to then select that one among the pre-stored melodies as the generated melody for which the best match results. This approach, however, inherently restricts the melody recognition to the pre-stored set of melodies.

DE 102004033867.1 with the title "Verfahren und Vorrichtung zur rhythmischen Aufbereitung von Audiosignalen" and DE 102004033829.9 with the title "Verfahren und Vorrichtung zur Erzeugung einer polyphonen Melodie" which were filed at the same day at the German Patent and Trademark Office, are also directed to the generation of melodies from audio signals, do not consider the actual melody recognition in detail, however, but rather the subsequent process of deriving an accompaniment from the melody together with a rhythmic and harmony-depending processing of the melody.

Bello, J. P., Towards the Automated Analysis of Simple Polyphonic Music: A Knowledge-based Approach, University of London, Diss., January 2003 for example treats the possibilities of melody recognition, wherein different types of the recognition of the initial point of time of notes are described either based on the local energy in the time signal or on an analysis in the frequency domain. Apart from that, different methods for a melody line recognition are described. The common thing about these proceedings is that they are complicated in that the finally obtained melody is obtained via detours by the fact that initially in the time/spectral representation of the audio signal several trajectories are processed or traced, respectively, and that only among those trajectories finally the selection of the melody line or the melody, respectively, is made.

Also in Martin, K. D., A Blackboard System for Automatic Transcription of Simple Polyphonic Music, M.I.T. Media Laboratory Perceptual Computing Section Technical Report No. 385, 1996, a possibility for an automatic transcription is described, wherein the same is also based on the evaluation of several harmonic traces in a time/frequency representation of the audio signal or the spectrogram of the audio signal, respectively.

In Klapuri, A. P.: Signal Processing Methods for the Automatic Transcription of Music, Tampere University of Technology, Summary Diss., December 2003, and Klapuri, A. P., Signal Processing Methods for the Automatic Transcription of Music, Tampere University of Technology, Diss., December 2003, A. P. Klapuri, "Number Theoretical Means of Resolving a Mixture of several Harmonic Sounds". In Proceedings European Signal Processing Conference, Rhodos, Greece, 1998, A. P. Klapuri, "Sound Onset Detection by Applying Psychoacoustic Knowledge", in Proceedings IEEE International Conference on Acoustics, Speech, and Signal Processing, Phoenix, Ariz., 1999, A. P. Klapuri, "Multipitch Estimation and sound separation by the Spectral Smoothness Principle", in Proceedings IEEE International Conference on Acoustics, Speech, and Signal Processing, Salt Lake City, Utah, 2001, Klapuri A. P. and Astola J. T., "Efficient Calculation of a Physiologically-motivated Representation for Sound", in Proceedings 14$^{th}$ IEEE International Conference on Digital Signal Processing, Santorin, Greece, 2002, A. P. Klapuri, "Multiple Fundamental Frequency Estimation based on Harmonicity and Spectral Smoothness", IEEE Trans. Speech and Audio Proc., 11(6), pp. 804–816, 2003, Klapuri A. P., Eronen A. J. and Astola J. T., "Automatic Estimation of the Meter of Acoustic Musical Signals", Tempere University of Technology Institute of Signal Processing, Report 1-2004, Tampere, Finland, 2004, ISSN: 1459:4595, ISBN: 952-15-1149-4, different methods regarding the automatic transcription of music are described.

With regard to the basic research in the field of the extraction of a main melody as a special case of polyphonic transcription, further Bauman, U.: Ein Verfahren zur Erkennung und Trennung multipler akustischer Objekte, Diss., Lehrstuhl für Mensch-Maschine-Kommunikation, Technische Universitat Munchen, 1995, is to be noted.

The above-mentioned different approaches for melody recognition or automatic transcription, respectively, present special requirements for the input signal. For example, they only admit piano music or only a certain number of instruments and exclude percussive instruments or the like.

The hitherto most practicable approach for current modern and popular music is the approach of Goto, as it is for example described in Goto, M.: A Robust Predominant-FO Estimation Method for Real-time Detection of Melody and Bass Lines in CD Recordings, Proc. IEEE International Conference on Acoustics, Speech and Signal Processing, pp. II-757–760, June 2000. The goal in this method is the extraction of a dominant melody and bass line, wherein the detour for line finding again takes place via the selection among several trajectories, i.e. using so called "agents". Therefore, the method is expensive.

Melody detection is also treated by Paiva R. P. et al.: A Methodology for Detection of Melody in Polyphonic Musical Signals, 116$^{th}$ AES Convention, Berlin, May 2004. Also there the proposal is made to take the path of a trajectory tracing in the time/spectral representation. The document also relates to the segmentation of the individual trajectories until the same are post-processed to a note sequence.

It would be desirable to have a method for melody extraction or automatic transcription, respectively, which is more robust and reliably functions for a wider plurality of different audio signals. Such a robust system may lead to high time and cost savings in "Query by Huming"-systems, i.e. in systems in which a user is able to find songs in a data base by humming them in, as an automatic transcription for the reference files of the system data base would be possible. A robustly functioning transcription might also find use as a receiving front-end. It would further be possible to use an automatic transcription as a supplement to an audio ID system, i.e. a system which recognizes audio files at a fingerprint contained within the same, as when not recognized by the audio ID system, like e.g. due to a missing fingerprint, the automatic transcription might be used as an alternative in order to evaluate an incoming audio file.

A stably functioning automatic transcription would further provide a manufacturing of similarity relations in connection with other musical features, like e.g. key, harmony and rhythm, like e.g. for a "recommendation-engine". In musical science, a stabile automatic transcription might provide new views and lead to a review of opinions with regard to older music. Also for maintaining the copyrights by an objective comparison of pieces of music, an automatic transcription which is stabile in its application might be used.

In summary, the application of the melody recognition or auto-transcription, respectively, is not restricted to the above-mentioned generation of ring tones for mobile telephones, but may in general serve as a support for musicians and those interested in music.

SUMMARY OF THE INVENTION

It is the object of the present invention to provide a method and a device for a tone smoothing so that a more stable scheme or a scheme correctly operating for a wider plurality of audio signals, respectively, is enabled for melody recognition.

In accordance with a first aspect, the present invention provides a device for smoothing a melody line segment, having the provider for providing a time/spectral representation of the audio signal, wherein the provider for providing is implemented such that it provides a time/spectral representation that comprises a spectral band with a sequence of spectral values for each of a plurality of spectral components and that the time/spectral representation in each spectral band comprises a spectral value for each time section of a sequence of time sections of the audio signal; the determinater for determining, on the basis of the time/spectral representation of the audio signal, a melody line segment of the audio signal that respectively uniquely associates one spectral component to each time section of a section of the sequence of time sections; and a tone smoothing means which is implemented to associate a number to each time section of the melody segment such that for all groups of directly adjacent time sections, that have the same spectral component associated to the same by the melody line segment, the numbers associated to the directly neighboring time sections are different numbers from one up to the number of the directly neighboring time sections, for each spectral component associated with one of the time sections of the melody line segment, add up the numbers of those groups to which time sections of the same the respective spectral component is associated by the melody line segment, determine a smoothing spectral component as the spectral component for which the greatest summing-up results; change the melody line segment by associating the certain smoothing spectral component to each time section of the melody line segment.

In accordance with a second aspect, the present invention provides a method for smoothing a melody line segment, having the steps of providing a time/spectral representation of the audio signal, wherein the provider for providing is implemented such that it provides a time/spectral representation comprising for each of a plurality of spectral components a spectral band with a sequence of spectral values, and that the time/spectral representation comprises in each spectral band a spectral value for each time section of a sequence of time sections of the audio signal; determine on the basis of a time/spectral representation of the audio signal a melody line segment of the audio signal that uniquely associates one spectral component to each time section of a section of the sequence of time sections; and performing a tone smoothing by allocating a number to each time section of the melody line segment such that for all groups of directly neighboring time sections, to which the same spectral component is associated by the melody line segment, the numbers allocated to the directly neighboring time sections are different numbers from one to the number of the directly neighboring time sections, for each spectral component associated with one of the time sections of the melody line segment, adding up the numbers of those groups to which time sections of the same the respective spectral component is associated by the melody line segment, determining a smoothing spectral component as the spectral component for which the greatest summing-up results; and changing the melody line segment by associating to each time section of the melody line segment the determined smoothing spectral component.

In accordance with a third aspect, the present invention provides a computer program having a program code for performing the above-mentioned method when the computer program runs on a computer.

It is the finding of the present invention that the melody extraction or the automatic transcription may be made clearly more stable and that the transcription result may be improved, respectively, when at the resulting segments or trajectories, respectively, a tone smoothing of a melody line gained from a spectrogram of an audio signal is performed such that a number is associated with each time section of a melody line segment such that for all groups of directly neighboring time sections to which the same spectral component is associated by the melody line segment, the numbers associated with the directly neighboring time sections are numbers from 1 up to the number of directly neighboring time sections, that for each spectral component associated with one of the time sections of the melody line segment the numbers of those groups are added up to which time sections of the same the respective spectral component is associated by the melody line segment, that a smoothing spectral component is determined to be the spectral component for which the greatest summing-up results, and that the melody line segment is changed by associating the determined smoothing spectral component to each time section of the melody line segment. By this, in particular the inadequacy of monophonic audio signals is considered, that mostly have a transient process at the beginnings of notes, so that only towards the end of the notes the desired note pitch is achieved.

According to a preferred embodiment of the present invention, in melody line determination the assumption is sufficiently considered, that the main melody is the portion of a piece of music that man perceives the loudest and most concise. With regard to this, in determining the melody of the audio signal at first a melody line is determined extending through the time/spectral representation, by the fact that exactly one spectral component or one frequency bin of the time/spectral representation is associated with every time section or frame, respectively—in a unique way—i.e., according to a special embodiment, the one that leads to the sound result with the maximum intensity.

According to a preferred embodiment of the present invention, the above indicated statement of musicology, that the main melody is the portion of a piece of music that man perceives the loudest and most concise, is considered with regard to two aspects. According to this embodiment, the time/spectral representation or the spectrogram, respectively, of an interesting audio signal is scaled using the curves of equal volume reflected by human volume perception in order to determine the melody of the audio signal on the basis of the resulting perception-related time/spectral representation. In more detail, according to this embodiment, the spectrogram of the audio signal is first logarithmized so that the logarithmized spectral values indicate the sonic pressure level. Subsequently, the logarithmized spectral values of the logarithmized spectrogram are mapped to perception-related spectral values depending on their respective value and on the spectral component to which they belong. In doing so, functions are used that represent the curves of equal volume as a sonic pressure depending on spectral components or depending on the frequency, respectively, and are associated with different volumes. The perception-related spectrum is again delogarithmized in order to generate a time/sound spectrum from the result by forming sums of delogarithmized perception-related spectral values per frame for predetermined spectral components. These sums include the delogarithmized perception-related spectral value at the respective spectral component and the delogarithmized perception-related spectral value at the spectral components that form an overtone for the respective spectral component. The thus obtained time/sound spectrum represents a version of the time/spectral representation which is derived from the same.

BRIEF DESCRIPTION OF THE DRAWINGS

In the following, preferred embodiments of the present invention are explained in more detail with reference to the accompanying drawings, in which.

DESCRIPTION OF THE PREFERRED EMBODIMENTS

With reference to the following description of the figures it is noted, that there the present invention is explained merely exemplary with regard to a special case of application, i.e. the generation of a polyphonic ring melody from an audio signal. It is explicitly noted at this point, however, that the present invention is of course not restricted to this case of application, but that an inventive melody extraction or automatic transcription, respectively, may also find use somewhere else, like e.g. for facilitating the search in a database, the mere recognition of pieces of music, enabling the maintaining of the copyright by an objective comparison of pieces of music or the like, or, however, for a mere transcription of audio signals, in order to be able to indicate the transcription result to a musician.

Figure 1:
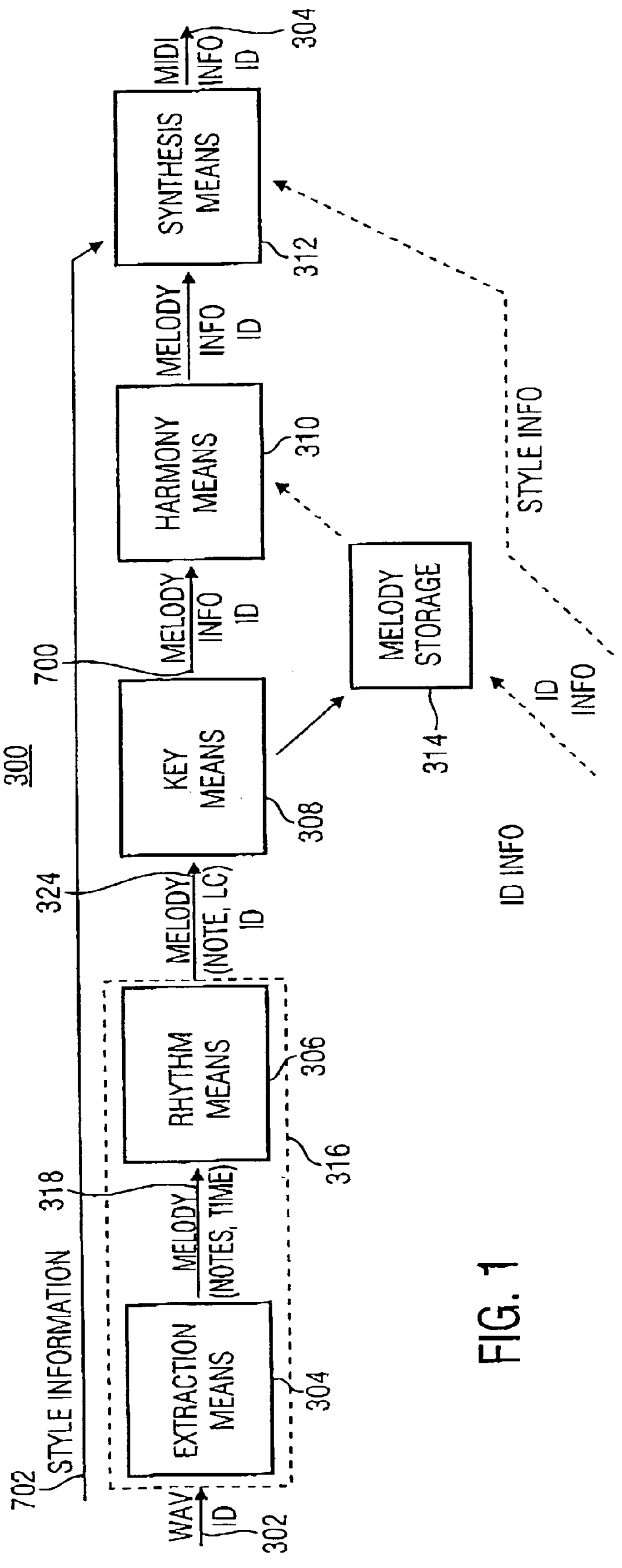
FIG. 1 shows a block diagram of a device for generating a polyphonic melody.

FIG. 1 shows an embodiment for a device for generating a polyphonic melody from an audio signal containing a desired melody. In other words, FIG. 1 shows a device for a rhythmic and harmonic rendition and new instrumentation of an audio signal representing a melody and for supplementing the resulting melody by a suitable accompaniment.

The device of FIG. 1 which is generally indicated at 300 includes an input 302 for receiving the audio signal. In the present case it is as an example assumed that the device 300 or the input 302, respectively, expects the audio signal in a time sampling representation, like e.g. as a WAV file. The audio signal may, however, also be present in another form at the input 302, like e.g. in an uncompressed or a compressed form or in a frequency band representation. The device 300 further includes an output 304 for outputting a polyphonic melody in any format, wherein in the present case as an example an output of the polyphonic melody in the MIDI format is assumed (MIDI=musical instrument digital interface). Between the input 302 and the output 304 an extraction means 304, a rhythm means 306, a key means 308, a harmony means 310 and a synthesis means 312 are connected in series in this order. Further, means 300 includes a melody storage 314. An output of the key means 308 is not only connected to an input of the subsequent harmony means 310 but further to an input of the melody storage 314. Accordingly, the input of the harmony means 310 is not only connected to the output of the key means 308 arranged upstream but also to an output of the melody storage 314. A further input of the melody storage 314 is provided to receive a provisioning identification number ID. A further input of the synthesis means 312 is implemented to receive style information. The meaning of style information and of the provisioning identification number may be seen from the following functional description. Extraction means 304 and rhythm means 306 together form a rhythm rendering means 316.

As the setup of the device 300 of FIG. 1 was described above, in the following its functioning is described.

The extraction means 304 is implemented to subject the audio signal received at the input 302 to a note extraction or recognition, respectively, in order to obtain a note sequence from the audio signal. In the present embodiment, the note sequence 318 passing on the extraction means 304 to the rhythm means 306 is present in a form in which for every note n a note initial time, $t_n$, which for example indicates the tone or note beginning, respectively, in seconds, a tone or note duration, respectively, $\tau_n$, indicating the note duration of the note for example in seconds, a quantized note or tone pitch, i.e. C, F sharp or the like, for example as an MIDI note, a volume Ln of the note and an exact frequency $f_n$ of the tone or the note, respectively, contained in the note sequence, wherein n is to represent an index for the respective note in the note sequence increasing with the order of subsequent notes or indicating the position of the respective notes in the note sequence, respectively.

The melody recognition or audio transcription, respectively, performed by means 304 for generating the note sequence 318, is later explained in more detail with reference to FIGS. 2–35.

The note sequence 318 still represents the melody as it was illustrated by the audio signal 302. The note sequence 318 is then supplied to the rhythm means 306. The rhythm means 306 is implemented in order to analyze the supplied note sequence in order to determine a length of time, an upbeat, i.e. a time raster, for the note sequence and thus adapt the individual notes of the note sequence to suitable time-quantified lengths, like e.g. whole notes, half notes, crotchets, quavers etc. for the certain time and to adjust the note beginnings of the notes to the time raster. The note sequence output by the rhythm means 306 thus represents a rhythmically rendered note sequence 324.

At the rhythmically rendered note sequence 324 the key means 308 performs a key determination and if applicable a key correction. In particular, means 308 determines based on the note sequence 324 a main key or a key, respectively, of the user melody represented by the note sequence 324 or the audio signal 302, respectively, including the mode, i.e. major or minor, of the piece which was for example sung. After that, the same recognizes further tones or notes, respectively, in the note sequence 114 not contained in the scale and corrects the same in order to come to a harmonically sounding final result, i.e. a rhythmically rendered and key-corrected note sequence 700 which is passed on to the harmony means 310 and represents a key-corrected form of the melody requested by the user.

The functioning of means 324 with regard to the key determination may be implemented in different ways. The key determination may for example be performed in the way described in the article Krumhansl, Carol L.: Cognitive Foundations of Musical Pitch, Oxford University Press, 1990, or in the article Temperley, David: The cognition of basical musical structures, The MIT Press, 2001.

The harmony means 310 is implemented to receive the note sequence 700 from means 308 and to find a suitable accompaniment for the melody represented by this note sequence 700. For this purpose, means 310 acts or operates bar-wise, respectively. In particular, means 310 is operable at every bar as it is determined by the time raster determined by the rhythm means 306, such that it creates a statistic about the tones or tone pitches, respectively, of the notes $T_n$ occurring in the respective time. The statistics of the occurring tones is then compared to the possible chords of the scale of the main key, as it was determined by the key means 308. Means 310 selects in particular that chord among the possible chords whose tones match best with the tones in the respective time, as it is indicated by the statistics. This way, means 310 determines the one chord for every time which best suits the tones or notes, respectively, in the respective time, which were for example sung. In other words, means 310 associates chord stages of the basic key to the times found by means 306, depending on the mode, so that a chord progression forms over the course of the melody. At the output of means 310, apart from the rhythmically rendered and key-corrected note sequence including NL, the same further outputs a chord stage indication for every time to the synthesis means 312.

The synthesis means 312 uses, for performing the synthesis, i.e. for an artificial generation of the finally resulting polyphonic melody, style information, which may be input by a user, as is indicated by case 702. For example, by the style information, a user may select from four different styles or musical directions, respectively, in which this polyphonic melody may be generated, i.e. pop, techno, latin or reggae. For each of these styles either one or several accompaniment patterns are deposited in the synthesis means 312. For generating the accompaniment the synthesis means 312 now uses the accompaniment pattern(s) indicated by the style information 702. For generating the accompaniment the synthesis means 312 strings together the accompaniment patterns per bar. If the chord for a time determined by means 310 is the chord version, in which an accompaniment pattern is already present, then the synthesis means 312 simply selects the corresponding accompaniment pattern for the current style for this time for the accompaniment. If, however, for a certain time the chord determined by means 310 is not the one in which an accompaniment pattern is deposited in means 312, then the synthesis means 312 shifts the notes of the accompaniment pattern by the corresponding number of semitones or changes the third and changes the sixth and fifth by a semitone in case of another mode, i.e. by shifting upwards by a semitone in case of a major chord and the other way in case of a minor chord.

Further, the synthesis means 312 instruments the melody represented by the note sequence 700 passed on from the harmony means 310 to the synthesis means 312 in order to obtain a main melody and finally combines accompaniment and main melody to a polyphonic melody which it outputs presently exemplarily in the form of an MIDI file at the output 304.

The key means 308 is further implemented to save the note sequence 700 in the melody storage 314 under a provisioning identification number. If the user is not satisfied with the result of the polyphonic melody at the output 304, he may input the provisioning identification number together with new style information again into the device of FIG. 1, whereupon the melody storage 314 passes on the sequence 700 stored under the provisioning identification number to the harmony means 310 which then, as described above, determines the chords, whereupon the synthesis means 312 using the new style information, depending on the chords, generates a new accompaniment and a new main melody depending on the note sequence 700 and combines the same to a new polyphonic melody at the output 304.

In the following, with reference to FIGS. 2–35 the functioning of the extraction means 304 is described. Here, first of all with reference to FIGS. 2–26, the proceeding in melody recognition for the case of polyphonic audio signals 302 at the input of means 304 is described.

Figure 2:
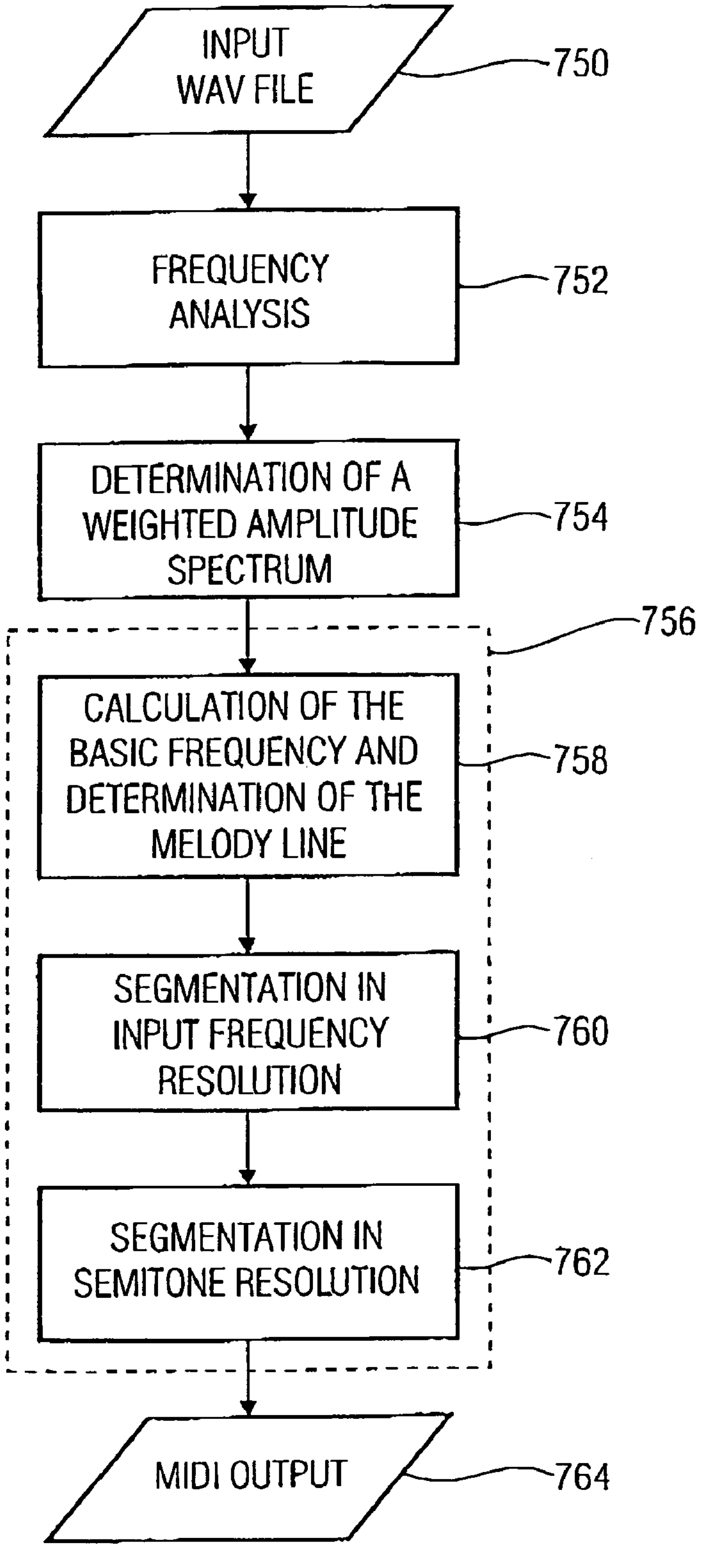
FIG. 2 shows a flow chart for illustrating the functioning of the extraction means of the device of FIG. 1.

FIG. 2 first of all shows the coarse proceeding in melody extraction or auto transcription, respectively. Starting point is reading in or input, respectively, of the audio file in a step 750 which may be present as a WAV file, as described above. After that, means 304 performs a frequency analysis at the audio file in a step 752, in order to hereby provide a time/frequency representation or a spectrogram, respectively, of the audio signal contained in the file. In particular, step 752 includes a decomposition of the audio signal into frequency bands. Here, the audio signal is separated in preferably temporally overlapping time sections within the scope of a windowing which are then respectively spectrally decomposed in order to obtain a spectral value for each time section or each frame, respectively, for each of a set of spectral components. The set of spectral components depends on the selection of the transformation underlying the frequency analysis 752, wherein a special embodiment is explained for this in the following with reference to FIG. 4.

After step 752, means 304 determines a weighted amplitude spectrum or a perception-related spectrogram, respectively, in a step 754. The exact proceeding for determining the perception-related spectrogram is explained in more detail in the following with reference to FIGS. 3–8. The result of step 754 is a resealing of the spectrogram obtained from the frequency analysis 752 using the curves of equal volume reflecting human perception sense in order to adjust the spectrogram to the human perception sense.

The processing 756 following step 754 among other uses the perception-related spectrogram obtained from step 754 in order to finally obtain the melody of the output signal in the form of a melody line organized in note segments, i.e. in a form in which groups of subsequent frames have respectively the same associated tone pitch, wherein these groups are spaced from each other in time over one or several frames, do not overlap and therefore correspond to note segments of a monophonic melody.

In FIG. 2, the processing 756 is organized in three substeps 758, 760 and 762. In the first substep the perception-related spectrogram is used in order to obtain a time/basic frequency representation from the same and to use this time/basic frequency representation again to determine a melody line such that exactly one spectral component or one frequency bin, respectively, is uniquely associated with every frame. The time/basic frequency representation considers the separation of sounds into partial tones by the fact that first of all the perception-related spectrogram of step 754 is delogarithmized in order to perform a summing for each frame and for each frequency bin via the delogarithmized perception-related spectral values at this frequency bin and at those frequency bins that represent the overtones for the respective frequency bin. The result is one range of sounds per frame. From this range of sounds, the determination of the melody line is performed, by selecting the keynote or the frequency or the frequency bin, respectively, for each frame, in which the range of sounds has its maximum. The result of step 758 is therefore more or less a melody line function that uniquely associates exactly one frequency bin to every frame. This melody line function again defines a melody line course in the time/frequency domain or in a two-dimensional melody matrix, respectively, that is spanned by the possible spectral components or the bins, respectively, on the one hand and the possible frames on the other hand.

The following substeps 760 and 762 are provided in order to segment the continuous melody line to thus result in individual notes. In FIG. 2, the segmentation is organized in two substeps 760 and 762, depending on whether the segmentation takes place in input frequency resolution, i.e. in frequency bin resolution, or whether the segmentation takes place in semitone resolution, i.e. after quantizing the frequencies to semitone frequencies.

The result of the processing 756 is processed in step 764 in order to generate a sequence of notes from the melody line segments, wherein to each note an initial note point of time, a note duration, a quantized tone pitch, an exact tone pitch, etc., is associated.

After the functioning of the extraction means 304 of FIG. 1 was described above with reference to FIG. 2 rather generally, in the following with reference to FIG. 3 the functioning of the same is described in more detail for the case that music represented by the audio file at the input 302 is of a polyphonic origin. The differentiation between polyphonic and monophonic audio signals results from the observation that monophonic audio signals frequently come from musically less skilled persons and therefore comprise musical shortcomings that request a slightly different proceeding with regard to the segmentation.

Figure 3:
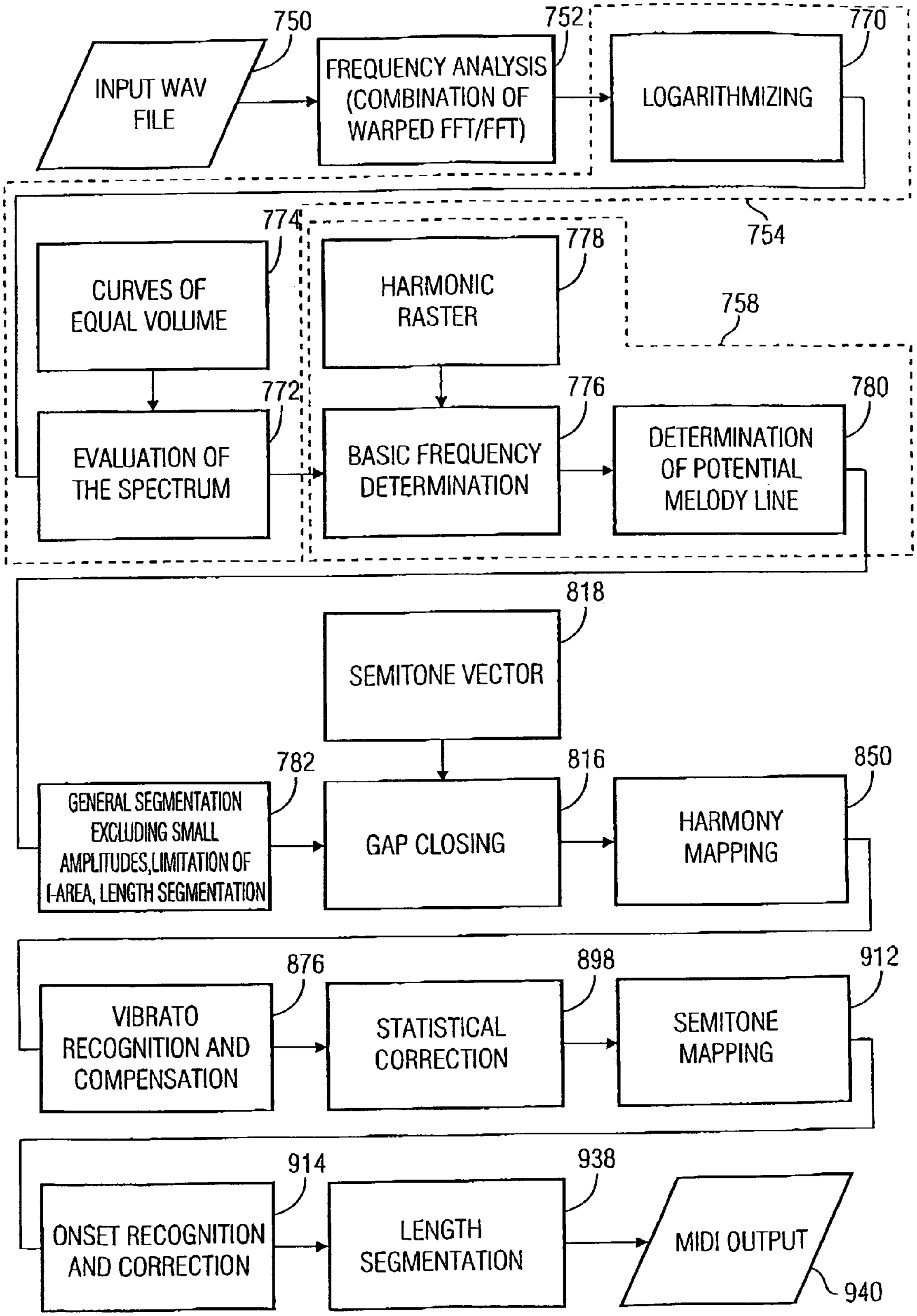
FIG. 3 shows a detailed flow chart for illustrating the functioning of the extraction means of the device of FIG. 1 for the case of a polyphonic audio input signal.

In the first two steps 750 and 752 FIG. 3 corresponds to FIG. 2, i.e. first of all an audio signal is provided 750 and the same is subjected to a frequency analysis 752. According to one embodiment of the present invention, the WAV file is for example present in a format, as the individual audio samples are sampled with a sampling frequency of 16 kHz. The individual samples are here for example present in a 16 bit format. Further, it is exemplarily assumed in the following that the audio signal is present as a mono file.

The frequency analysis 752 may then for example be performed using a warped filter bank and an FFT (fast Fourier transformation). In particular, in the frequency analysis 752 the sequence of audio values is first of all windowed with a window length of 512 samples, wherein a hop size of 128 samples is used, i.e. the windowing is repeated every 128 samples. Together with the sample rate of 16 kHz and the quantizing resolution of 16 bits, those parameters represent a good compromise between time and frequency resolution. With these exemplary settings, one time section or one frame, respectively, corresponds to a time period of 8 milliseconds.

The warped filter bank is used according to a special embodiment for the frequency range up to approximately 1,550 Hz. This is required in order to obtain a sufficiently good resolution for deep frequencies. For a good semitone resolution sufficient frequency bands should be available. With a lambda value from −0.85 at a 16 kHz sample rate on a frequency of 100 Hz approximately two to four frequency bands correspond to one semitone. For low frequencies, each frequency band may be associated with one semitone. For the frequency range up to 8 kHz then the FFT is used. The frequency resolution of the FFT is sufficient for a good semitone representation from about 1,550 Hz. Here, approximately two to six frequency bands correspond to a semitone.

In the implementation described above as an example, the transient performance of the warped filter bank is to be noted. Preferably, due to this a temporal synchronization is performed in the combination of the two transformations. The first 16 frames of the filter bank output are for example discarded, just like the last 16 frames of the output spectrum FFT are not considered. In a suitable interpretation the amplitude level is identical at filter bank and FFT and need not be adjusted.

Figure 4:
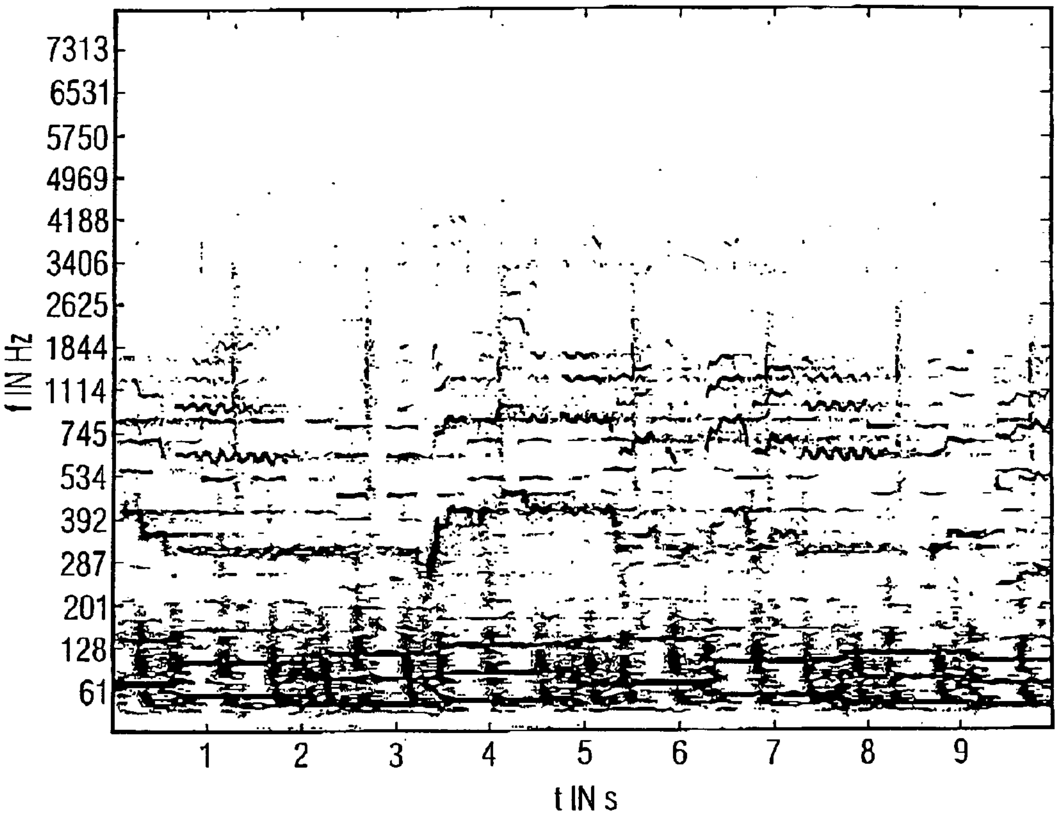
FIG. 4 shows an exemplary example for a time/spectral representation or a spectrogram, respectively, of an audio signal, as it may result in the frequency analysis in FIG. 3.

FIG. 4 exemplarily shows an amplitude spectrum or a time/frequency representation or a spectrogram, respectively, of an audio signal, as it was obtained by the preceding embodiment of a combination of a warped filter bank and an FFT. Along the horizontal axis in FIG. 4 the time t is indicated in seconds s, while along the vertical axis the frequency f runs in Hz. The height of the individual spectral values is gray-scaled. In other words, the time/frequency representation of an audio signal is a two-dimensional field that is spanned by the possible frequency bins or spectral components, respectively, on the one side (vertical axis) and the time sections or frames, respectively, on the other side (horizontal axis), wherein to each position of this field at a certain tupel of frame and frequency bins a spectral value or an amplitude, respectively, is associated.

According to a special embodiment, the amplitudes in the spectrum of FIG. 4 are still post-processed within the scope of the frequency analysis 752, as the amplitudes which are calculated by the warped filter bank may sometimes not be exact enough for the subsequent processing. The frequencies that are not exactly on the center frequency of a frequency band have a lower amplitude value than frequencies that exactly correspond to the center frequency of a frequency band. In addition, in the output spectrum of the warped filter bank a crosstalk to neighboring frequency bands results also referred to as bins or as frequency bins, respectively.

For correcting the faulty amplitudes the effect of crosstalk may be used. At maximum two neighboring frequency bands in each direction are effected by these faults. According to one embodiment, for this reason in the spectrogram of FIG. 4 within each frame the amplitudes of neighboring bins are added to the amplitude value of a center bin and this holds true for all bins. As there is the danger that wrong amplitude values are calculated when two tone frequencies are especially close to each other in a musical signal and thus phantom frequencies are generated, having greater values than the two original sine portions, according to one preferred embodiment only the amplitude values of the directly adjacent neighbor bins are added to the amplitude of the original signal portion. This presents a compromise between accuracy and the occurrence of side effects resulting from the addition of the directly neighboring bins. Despite the low accuracy of the amplitude values this compromise is acceptable in connection with the melody extraction, as the change of the calculated amplitude value may be neglected in the addition of three or five frequency bands. In contrast to that, the developing of phantom frequencies is much more important. The generation of phantom frequencies is increased with the number of simultaneously occurring sounds in a piece of music. In the search for the melody line this may lead to wrong results. The calculation of the exact amplitude is preferably performed both for the warped filter bank and for the FFT, so that the musical signal is subsequently represented across the complete frequency spectrum by an amplitude level.

The above embodiment for a signal analysis from a combination of a warped filter bank and an FFT enables an audition-adapted frequency resolution and the presence of a sufficient number of frequency bins per semitone. For more details regarding the implementation reference is made to the dissertation of Claas Derboven with the title "Implementierung und Untersuchung eines Verfahrens zur Erkennung von Klangobjekten aus polyphonen Audiosignalen", developed at the Technical University of Ilmenau in 2003, and to the dissertation of Olaf Schleusing with the title "Untersuchung von Frequenzbereichstransformationen zur Metadatenextraktion aus Audiosignalen", developed at the Technical University of Ilmenau in 2002.

As mentioned above, the analysis result of the frequency analysis 752 is a matrix or a field, respectively, of spectral values. These spectral values represent the volume by the amplitude. The human volume perception has, however, a logarithmic division. It is therefore sensible to adjust the amplitude spectrum to this division. This is performed in a logarithmizing 770 following step 752. In the logarithmizing 770 all spectral values are logarithmized to the level of the sonic pressure level, which corresponds to the logarithmic volume perception of man. In particular, in the logarithmizing 770 to the spectral value p in the spectrogram, as it is obtained from the frequency analysis 752, p is mapped to a sonic pressure level value or a logarithmized spectral value L by $$L[\mathrm{dB}] = 20\mathrm{Log}\left(\frac{p}{p_0}\right)$$

wherein $p_0$ here indicates the sonic reference pressure, i.e. the volume level that has the smallest perceptible sonic pressure at 1,000 Hz.

Figure 7:
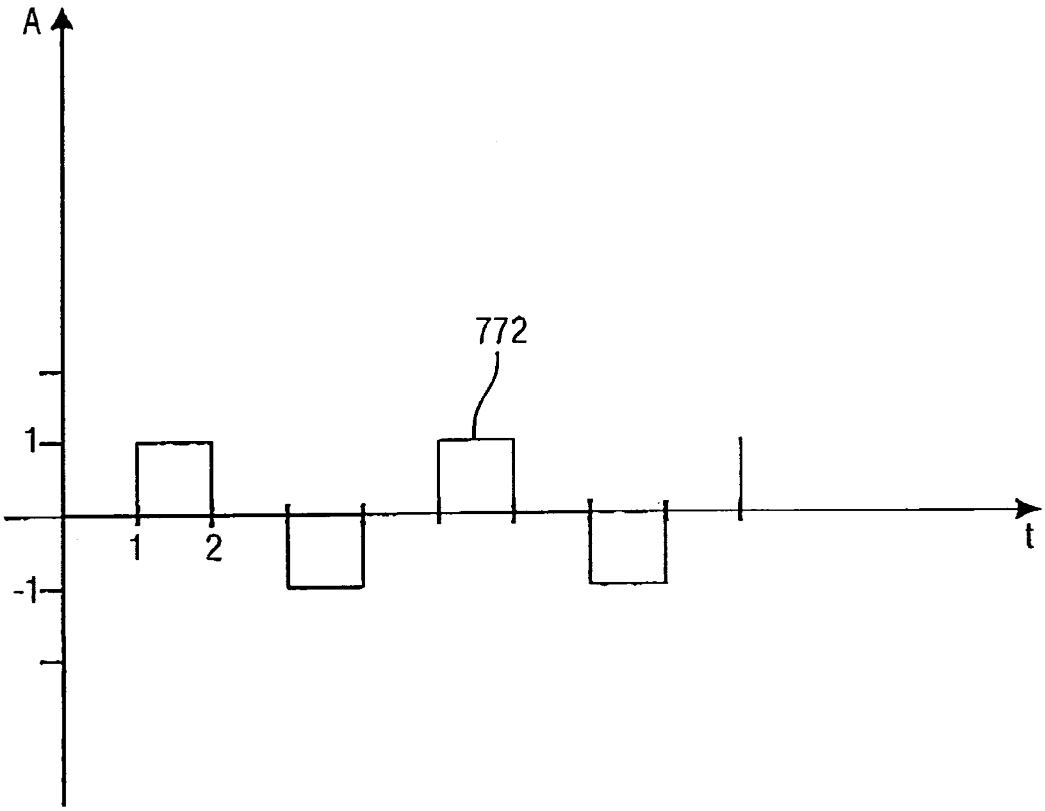
FIG. 7 shows a graph of an audio signal as it is used before the actual logarithmizing in FIG. 3 in order to obtain a reference value for the logarithmizing.

Within the logarithmizing 770 this reference value has to be determined first. While in the analog signal analysis as a reference value the smallest perceptible sonic pressure $p_0$ is used, this regularity may not easily be transferred to the digital signal processing. For determining the reference value, according to one embodiment, for this purpose a sample audio signal is used, as it is illustrated in FIG. 7. FIG. 7 shows the sample audio signal 772 over time t, wherein in the Y direction the amplitude A is plotted in the smallest digital units that may be illustrated. As it may be seen, the sample audio signal or reference signal 772, respectively, is present with an amplitude value of one LSB or with the smallest digital value that may be illustrated, respectively. In other words, the amplitude of the reference signal 772 only oscillates by one bit. The frequency of the reference signal 772 corresponds to the frequency of the highest sensitivity of the human audibility threshold. Other determinations for the reference value may be more advantageous depending on the case, however.

Figure 5:
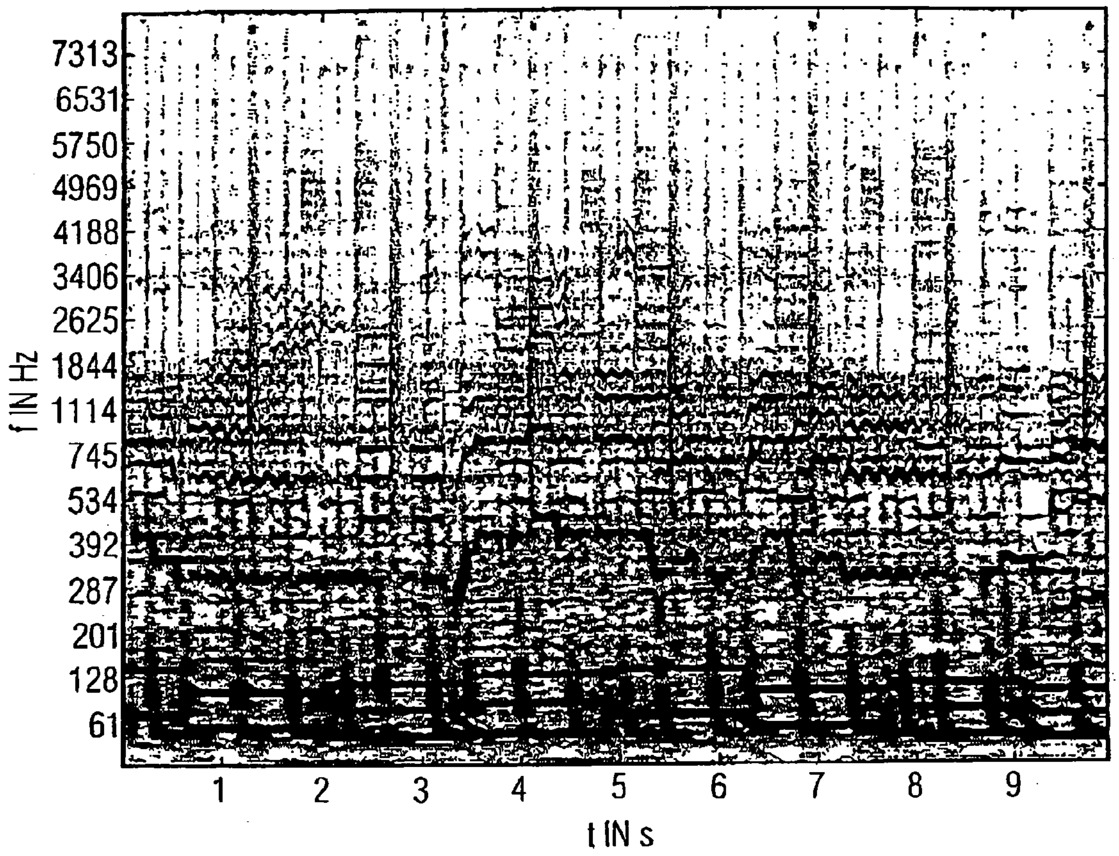
FIG. 5 shows a logarithmized spectrogram, as it results after the logarithmizing in FIG. 3.

In FIG. 5, the result of the logarithmizing 770 of the spectrogram of FIG. 4 is illustrated exemplarily. Should one part of the logarithmized spectrogram be located in the negative value range due to the logarithmizing, these negative spectral or amplitude values, respectively, are set to 0 dB for preventing non-sensible results in the further processing in order to obtain positive results across the complete frequency range. It is noted only as a precaution that in FIG. 5 the logarithmized spectral values are illustrated in the same way as in FIG. 4, i.e. arranged in a matrix spanned by the time t and the frequency f, and grey-scaled depending on the value, i.e. the darker the higher the respective spectral value.

The volume evaluation of humans is frequency-depending. Thus, the logarithmized spectrum, as it results from the logarithmizing 770, is to be evaluated in a subsequent step 772 in order to obtain an adjustment to this frequency-depending evaluation of man. For this purpose, curves of equal volume 774 are used. The evaluation 772 is required in particular in order to adjust the different amplitude evaluation of musical sounds across the frequency scale to human perception, as according to human perception the amplitude values of lower frequencies have a lower evaluation than amplitudes of higher frequencies.

Figure 6:
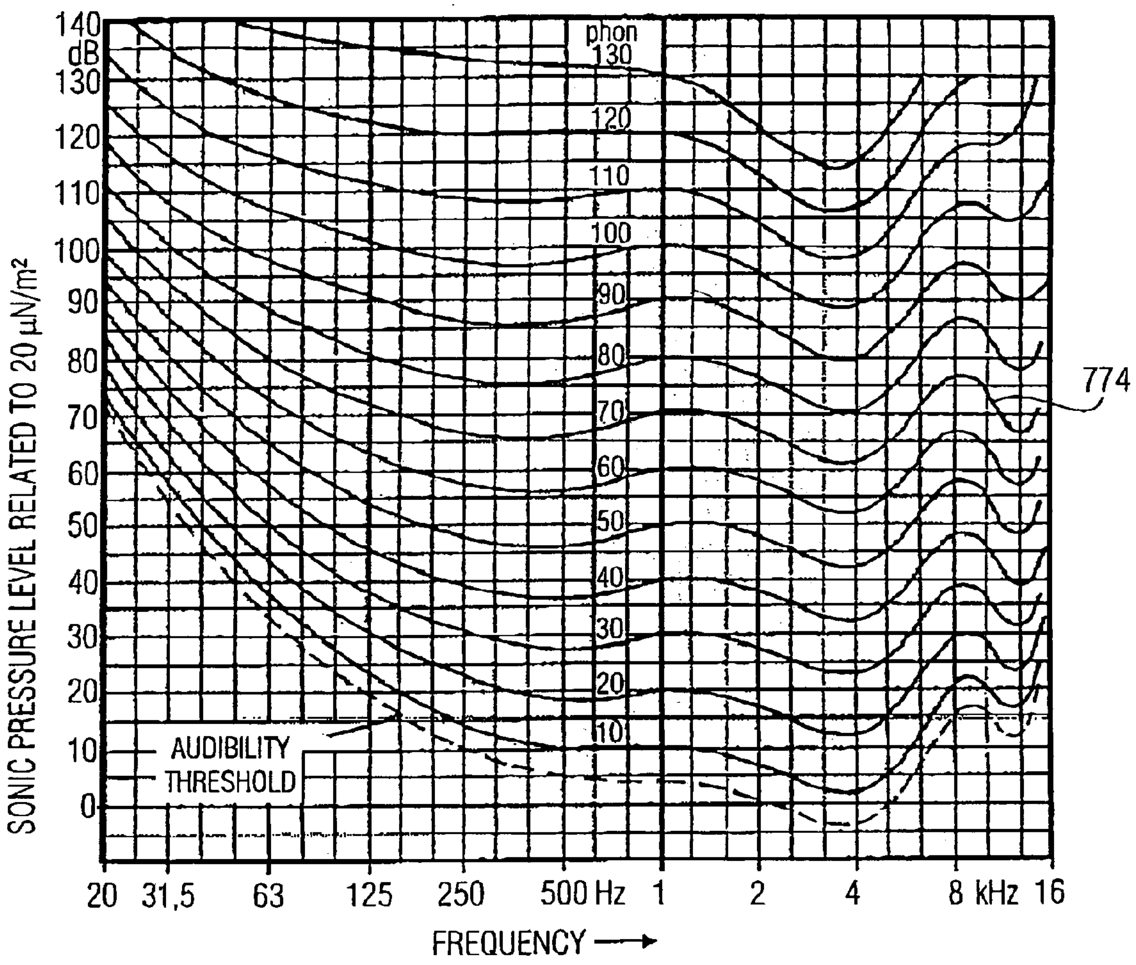
FIG. 6 shows a diagram with the curves of equal volume, as they underlie the evaluation of the spectrogram in FIG. 3.

For the curves 774 of equal volume, presently as an example the curve characteristic from DIN 45630 page 2, Deutsches Institut für Normung e.V., Grundlagen der Schallmessung, Normalkurven gleicher Lautstärke, 1967, was used. The graph course is shown in FIG. 6. As it may be seen from FIG. 6, the curves of equal volume 774 are respectively associated with different volume levels, indicated in phones. In particular, these curves 774 indicate functions that associate a sonic pressure level in dB to each frequency such that any sonic pressure levels located on the respective curve correspond to the same volume level of the respective curve.

Preferably, the curves of equal volume 774 are present in an analytical form in means 204, wherein it would also be possible, of course, to provide a look-up table that associates a volume level value to every pair of frequency bin and sonic pressure level quantization value. For the volume curve with the lowest volume level, for example the formula $$\frac{L_{T4}}{\mathrm{dB}} = 3{,}64\left(\frac{f}{\mathrm{kHz}}\right)^{-0{,}8} - 6{,}5\exp^{\left(-0{,}6\left(\frac{f}{\mathrm{kHz}}-3{,}3\right)^2\right)} + 10^{-3}\left(\frac{f}{\mathrm{kHz}}\right)^4 \qquad (2)$$

may be used. Between this curve shape and the audibility threshold according to German industrial standard, however, deviations are present in the low- and high-frequency value range. For adjusting, the functional parameters of the idle audibility threshold may be changed according to the above equation in order to correspond to the shape of the lowest volume curve of the above-mentioned German industrial standard of FIG. 6. Then, this curve is shifted vertically in the direction of higher volume levels in spacings of 10 dB and the functional parameters are adjusted to the respective characteristic of the function graphs 774. The intermediate values are determined in steps of 1 dB by linear interpolation. Preferably, the function having the highest value range may evaluate a level of 100 dB. This is sufficient, as a word width of 16 bits corresponds to a dynamic range of 98 dB.

Based on the curves 774 of the same volume, means 304 in step 772 maps every logarithmized spectral value, i.e. every value in the array of FIG. 5, depending on the frequency f or the frequency bin, respectively, to which it belongs, and on its value representing the sonic pressure level, to a perception-related spectral value representing the volume level.

Figure 8:
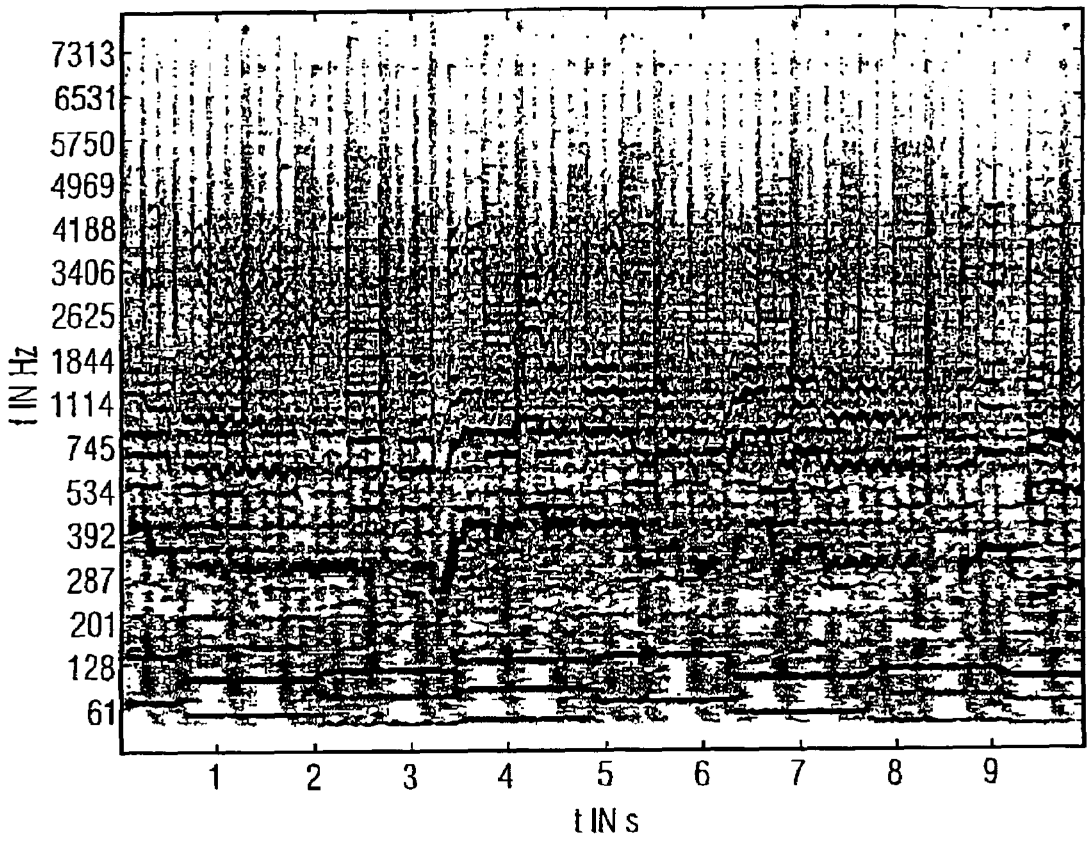
FIG. 8 shows a perception-related spectrogram, as it is obtained after the evaluation of the spectrogram of FIG. 5 in FIG. 3.

The result of this proceeding for the case of the logarithmized spectrogram of FIG. 5 is shown in FIG. 8. As it may be seen, in the spectrogram of FIG. 8 low frequencies have not a special importance anymore. Higher frequencies and their overtones are emphasized more strongly by this evaluation. This also corresponds to the human perception for evaluating the volume for different frequencies.

The above-described steps 770–774 represent possible substeps of step 754 from FIG. 2.

The method of FIG. 3 continues with a basic frequency determination or with the calculation of the overall intensity of every sound in the audio signal, respectively, after the evaluation 772 of the spectrum in a step 776. For this purpose, in step 776 the intensities of every keynote are added to the associated harmonic. From a physical view a sound consists of a keynote among the associated partial tones. Here, the partial tones are integer multiples of the basic frequency of a sound. The partial tones or overtones are also referred to as harmonics. In order to now, for every keynote, sum the intensity of the same and the respectively associated harmonics, in step 776 a harmonic raster 778 is used in order to search for overtone or overtones, respectively, that are an integer multiple of the respective keynote, for every possible keynote, i.e. every frequency bin. For a certain frequency bin as a keynote, thus further frequency bins corresponding to an integer multiple of the frequency bin of the keynote are associated as overtone frequencies.

In step 776 now for all possible keynote frequencies the intensities in the spectrogram of the audio signal are added at the respective keynote and its overtones. In doing so, however, a weighting of the individual intensity values is performed, as due to several simultaneously occurring sounds in a piece of music there is the possibility that the keynote of a sound is masked by an overtone of another sound having a lower-frequency keynote. In addition, also overtones of a sound may be masked by overtones of another sound.

In order to determine the tones of a sound belonging together anyway, in step 776 a tone model is used based on the principle of the model of Mosataka Goto and adjusted to the spectral resolution of the frequency analysis 752, wherein the tone model of Goto in Goto, M.: A Robust Predominant-FO Estimation Method for Real-time Detection of Melody and Bass Lines, in CD Recordings, Proc. IEEE International Conference on Acoustics, Speech and Signal Processing, Istanbul, Turkey, 2000, is described.

Based on the possible basic frequency of a sound, by the harmonic raster 778 for each frequency band or frequency bin, respectively, the overtone frequencies belonging to it are associated. According to a preferred embodiment, overtones for basic frequencies are searched in only one particular frequency bin range, like e.g. from 80 Hz–4,100 Hz, and harmonics are only considered to the $15^{th}$ order. In doing so, the overtones of different sounds may be associated with the tone model of several basic frequencies. By this effect, the amplitude ratio of a searched sound may be changed substantially. In order to weaken this effect, the amplitudes of the partial tones are evaluated with a halved Gaussian filter. The basic tone here receives the highest valency. Any following partial tones receive a lower weighting according to their order, wherein the weighting for example decreases in a Gauss-shape with an increasing order. Thus, an overtone amplitude of another sound masking the actual overtone has no special effect on the overall result of a searched voice. As the frequency resolution of the spectrum for higher frequencies decreases, not for every overtone of a higher order a bin with the corresponding frequency exists. Due to the crosstalk to the adjacent bins of the frequency environment of the searched overtone, using a Gaussian filter the amplitude of the searched overtone may be reproduced relatively well across the closest frequency bands. Overtone frequencies or the intensities at the same, respectively, do therefore not have to be determined in units of frequency bins, but also an interpolation may be used in order to exactly determine the intensity value at the overtone frequency.

The summation across the intensity values is, however, not performed directly at the perception-related spectrum of step 772. Rather, initially in step 776 the perception-related spectrum of FIG. 8 is first of all delogarithmized with the help of the reference value from step 770. The result is a delogarithmized perception-related spectrum, i.e. an array of delogarithmized perception-related spectral values for every tupel of frequency bin and frame. Within this delogarithmized perception-related spectrum, for every possible keynote the spectral value of the keynote and, if applicable, interpolated spectral values are added using the harmonic raster 778 of the associated harmonic, which results in a sound intensity value for the frequency range of all possible keynote frequencies, and that for every frame—in the above example only within the range from 80 to 4,000 Hz. In other words, the result of step 776 is a sound spectrogram, wherein step 776 itself corresponds to a level addition within the spectrogram of the audio signal. The result of step 776 is for example entered into a new matrix that comprises one line for each frequency bin within the frequency range of possible keynote frequencies and a column for each frame, wherein in each matrix element, i.e. at every crossing of column and row, the result of the summation for the corresponding frequency bin is entered as a keynote.

Next, in a step 780, a preliminary determination of a potential melody line is performed. The melody line corresponds to a function over time, i.e. to a function that associates exactly one frequency band or one frequency bin, respectively, to each frame. In other words, the melody line determined in step 780 defines a trace along the definition range of the sound spectrogram or the matrix, respectively, of step 776, wherein the trace along the frequency axis never overlaps or is ambiguous, respectively.

The determination is performed in step 780 such that for each frame over the complete frequency range of the sound spectrogram the maximum amplitude is determined, i.e. the highest summation value. The result, i.e. the melody line, mainly corresponds to the basic course of the melody of the music title underlying the audio signal 302.

The evaluation of the spectrogram with the curves of equal volume in step 772 and the search for the sonic result with the maximum intensity in step 780 support the statement of musical science that the main melody is the portion of a music title that man perceives the loudest and the most concise.

The above described steps 776 to 780 present possible substeps of step 758 of FIG. 2.

In the potential melody line of step 780 segments are located that do not belong to the melody. In melody pauses or between melody notes, dominant segments, like e.g. from the bass course or other accompaniment instruments may be found. These melody pauses have to be removed by the later steps in FIG. 3. Apart from that, short individual elements result that may not be associated to any range of the title. They are for example removed using a 3×3 average value filter, as it is described in the following.

Figure 9:
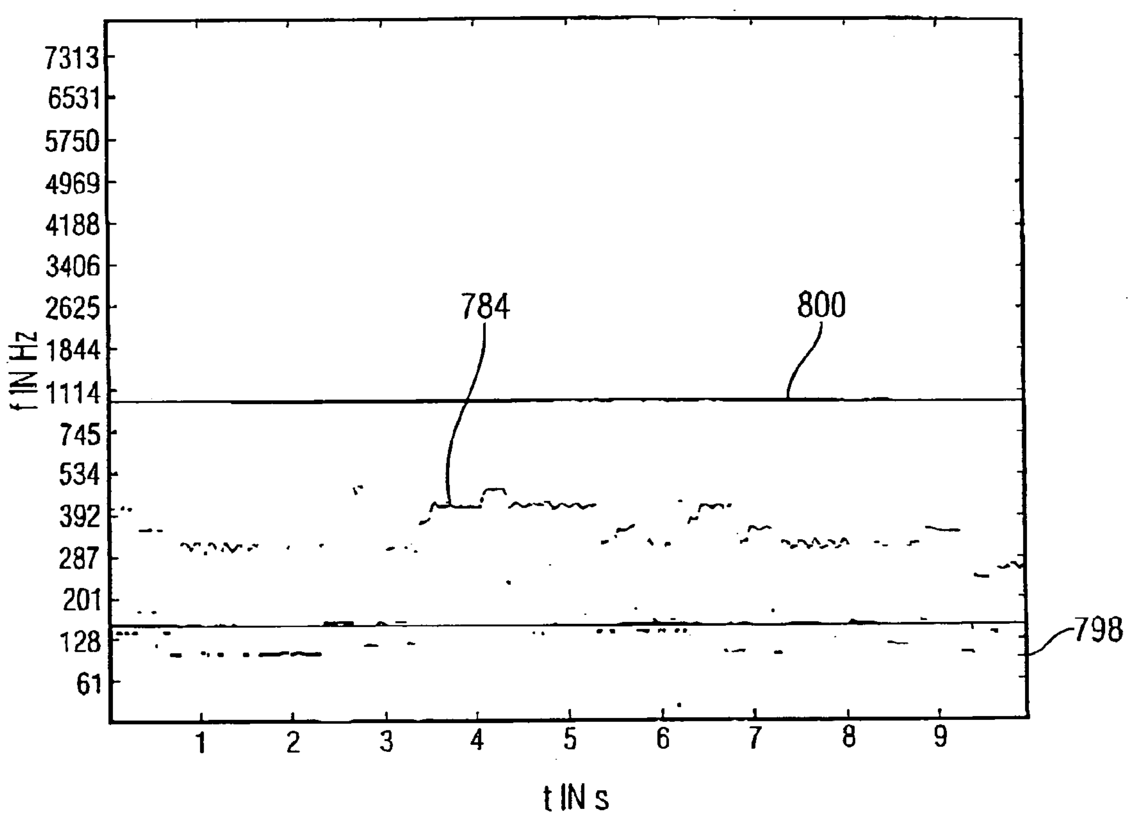
FIG. 9 shows the melody line or function, respectively, indicated in the time/spectral domain resulting from the perception-related spectrum of FIG. 8 by the melody line determination of FIG. 3.

After the determination of the potential melody line in step 780, in a step 782 first of all a general segmentation 782 is performed which cares for parts of the potential melody line to be removed that may not belong to the actual melody line prima facie. In FIG. 9, for example the result of the melody line determination of step 780 is illustrated as an example for the case of the perception-related spectrum of FIG. 8. FIG. 9 shows the melody line plotted over time t or over the sequence of frames along the x axis, wherein along the y axis the frequency f or the frequency bins, respectively, are indicated. In other words, in FIG. 9 the melody line of step 780 is illustrated in the form of a binary image array which is in the following also sometimes referred to as a melody matrix and comprises a row for each frequency bin and a column for each frame. All points of the array at which the melody line is not present, comprise a value of 0 or are white, respectively, while the points of the array at which the melody line is present comprise a value of 1 or are black, respectively.

These points are consequently located at tupels of frequency bin and frame associated with each other by the melody line function of step 780.

Figure 10:
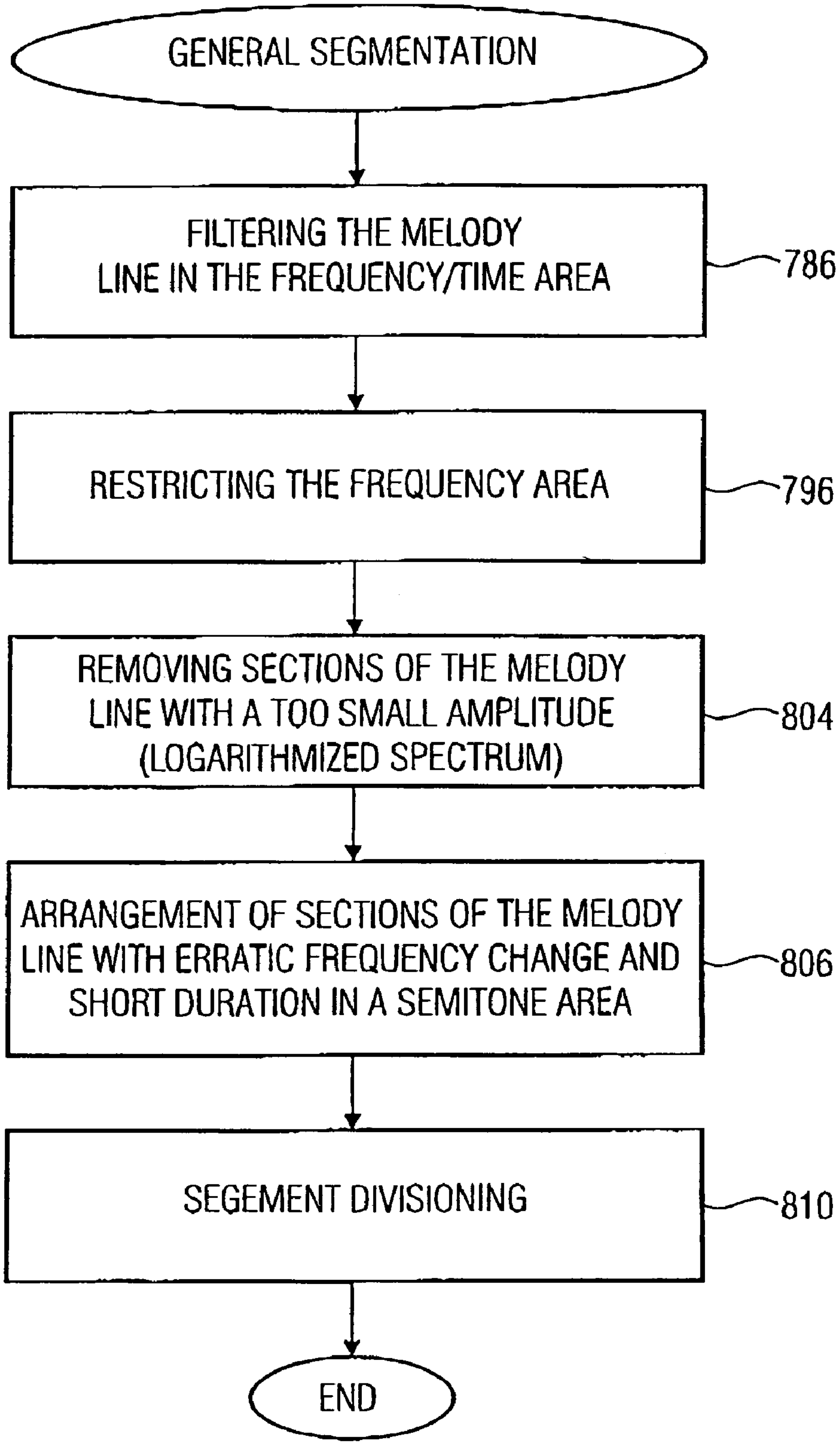
FIG. 10 shows a flow chart for illustrating the general segmentation of FIG. 3.

At the melody line of FIG. 9, designated by reference numeral 784 in FIG. 9, now the step 782 of the general segmentation is operative, for which a possible implementation is explained in more detail with reference to FIG. 10.

The general segmentation 782 starts in a step 786 with the filtering of the melody line 784 in the frequency/time range of an illustration in which the melody line 784, as shown in FIG. 9, is indicated as a binary trace in an array spanned by the frequency bins on the one side and the frames on the other side. The pixel array of FIG. 9 is for example an x-times-y pixel array, wherein x corresponds to the number of frames and y corresponds to the number of frequency bins.

Figure 11:
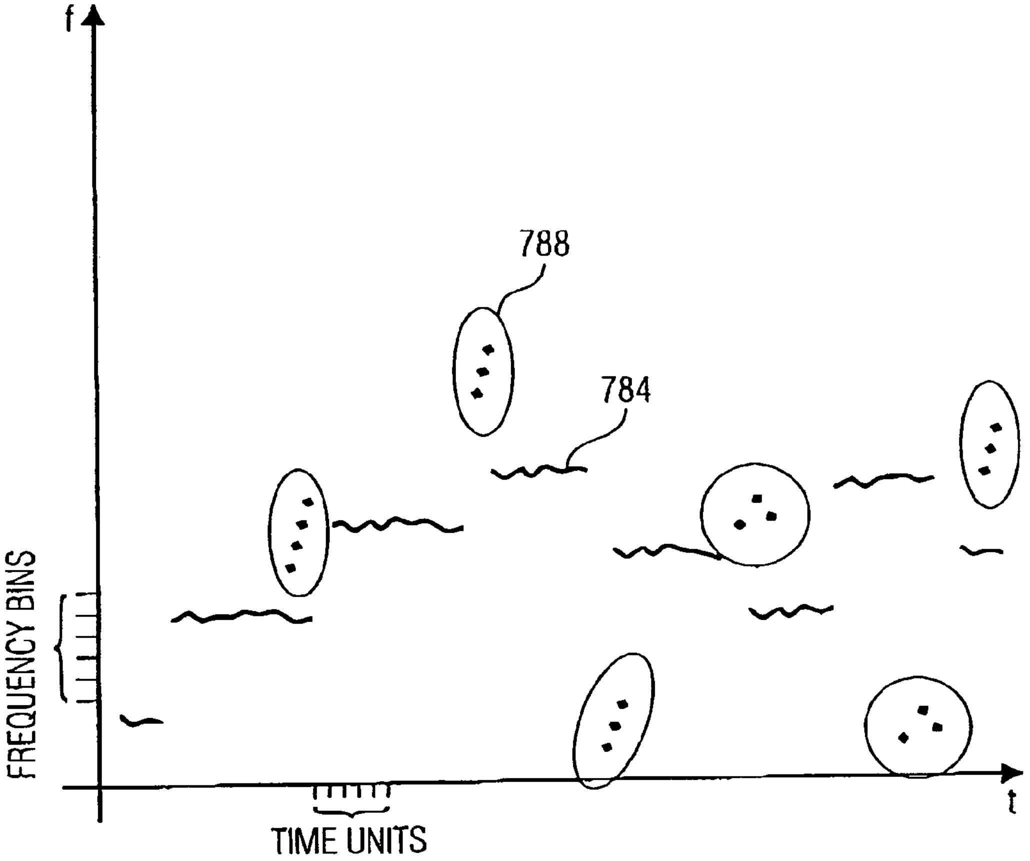
FIG. 11 shows a schematical illustration of an exemplary melody line course in the time/spectral domain.

The step 786 is now provided to remove minor outliers or artifacts, respectively, in the melody line. FIG. 11 exemplarily shows in schematical form a possible shape of a melody line 784 in an illustration according to FIG. 9. As it may be seen, the pixel array shows areas 788 in which individual black pixel elements are located which correspond to the sections of the potential melody line 784 that do certainly not belong to the actual melody due to their short time duration and should therefore be removed.

In step 786 for this reason from the pixel array of FIG. 9 or FIG. 11, respectively, in which the melody line is illustrated in a binary way, initially a second pixel array is generated by entering a value for each pixel corresponding to the summation of the binary values at the corresponding pixel and the pixels neighboring this pixel. For this purpose, reference is made to FIG. 12*a*. There, an exemplary section of the course of a melody line in the binary image of FIG. 9 or FIG. 11 is illustrated. The exemplary section of FIG. 12*a* includes five rows, corresponding to different frequency bins 1–5, and five columns A–E corresponding to different neighboring frames. The course of the melody line is symbolized in FIG. 12 by the fact that the corresponding pixel elements representing parts of the melody lines are hatched. According to the embodiment of FIG. 12*a*, by the melody line the frequency bin 4 is associated to frame B, the frequency bin 3 to frame C, etc. Also to frame A a frequency bin is associated by the melody line, this is not located among the five frequency bins of the section of FIG. 12*a*, however.

In the filtering in step 786 first of all—as already mentioned—for every pixel 790 the binary value of the same and the binary value of the neighboring pixels is summed. This is for example illustrated as an example in FIG. 12*a* for pixel 792, wherein at 794 a square is drawn in the figure surrounding the pixels neighboring the pixel 792 and the pixel 792 itself. For the pixel 792, consequently a sum value of 2 would result, as in the area 794 around the pixel 792 only two pixels are located that belong to the melody line, i.e. the pixel 792 itself and the pixel C3, i.e. at the frame C and the bin 3. This summation is repeated by shifting the area 794 for any further pixels, whereby a second pixel image results, also sometimes referred to as an intermediate matrix in the following.

Figure 12:
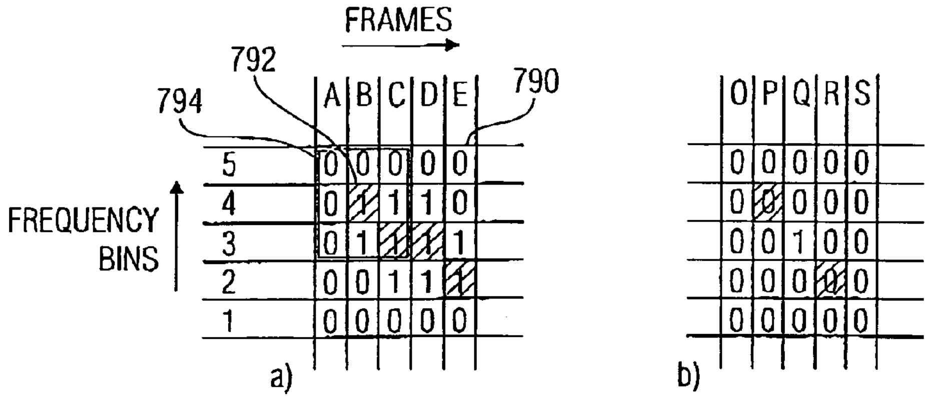
FIG. 12 shows a schematical illustration of a section from the melody line course illustration of FIG. 11 for illustrating the operation of filtering in the general segmentation of FIG. 10.

This second pixel image is then subjected to a mapping pixel-by-pixel, wherein in the pixel image all sum values of 0 or 1 are mapped to zero and all sum values larger than or equal to 2 are mapped to 1. The result of this mapping is illustrated in FIG. 12*a* with the numbers of “0” and “1” in the individual pixels 790 for the exemplary case of FIG. 12*a*. As it may be seen, the combination of 3×3 summation and subsequent mapping to “1” and “0” by use of the threshold value 2 leads to the fact that the melody line “smears”. The combination so to speak operates as a low-pass filter, which would be undesired. Therefore, within the scope of step 786 the first pixel image, i.e. the one from FIG. 9 or FIG. 11, respectively, or in FIG. 12 the pixel image symbolized by the hatched pixel, respectively, is multiplied with the second pixel array, i.e. the one that is represented by zeros and ones in FIG. 12*a*. This multiplication prevents a low-pass filtering of the melody line by the filtering 786 and additionally guarantees the unambiguous association of frequency bins to frames.

The result of the multiplication for the section of FIG. 12*a* is that the filtering 786 changes nothing at the melody line.

This is desired here, as the melody line is obviously coherent in this area and the filtering of step 786 is only provided for removing outliers or artifacts 788, respectively.

For illustrating the effect of the filtering 786, FIG. 12*b* shows a further exemplary section from the melody matrix of FIG. 9 or FIG. 11, respectively. As it may be seen there, the combination of summation and threshold value mapping leads to an intermediate matrix, in which two individual pixels P4 and R2 obtain a binary value of 0, although the melody matrix comprises a binary value of 1 at these pixel positions, as it may be seen by the hatching in FIG. 12*b* which is to indicate that the melody line is present at these pixel positions. These occasional “outliers” of the melody line are therefore removed by the filtering in step 786 after the multiplication.

After step 786, within the scope of the general segmentation 782 a step 796 follows, in which parts of the melody line 784 are removed by the fact that those parts of the melody line are neglected which are not located within a predetermined frequency range. In other words, in step 796 the value range of the melody line function of step 780 is restricted to the predetermined frequency range. Again in other words, in step 796 all pixels of the melody matrix of FIG. 9 or FIG. 11, respectively, are set to zero, which are located outside the predetermined frequency range. In the case of a polyphonic analysis, as it is presently assumed, a frequency range for example ranges from 100–200 to 1,000–1,100 Hz and preferably from 150–1,050 Hz. In case of a monophonic analysis, as it is assumed with reference to FIG. 27 ff., a frequency range for example ranges from 50–150 to 1,000–1,100 Hz and preferably from 80 to 1,050 Hz. The restriction of the frequency range to this bandwidth supports the observation that melodies in popular music are mostly represented by singing that is located within this frequency range, just like human language.

Figure 13:
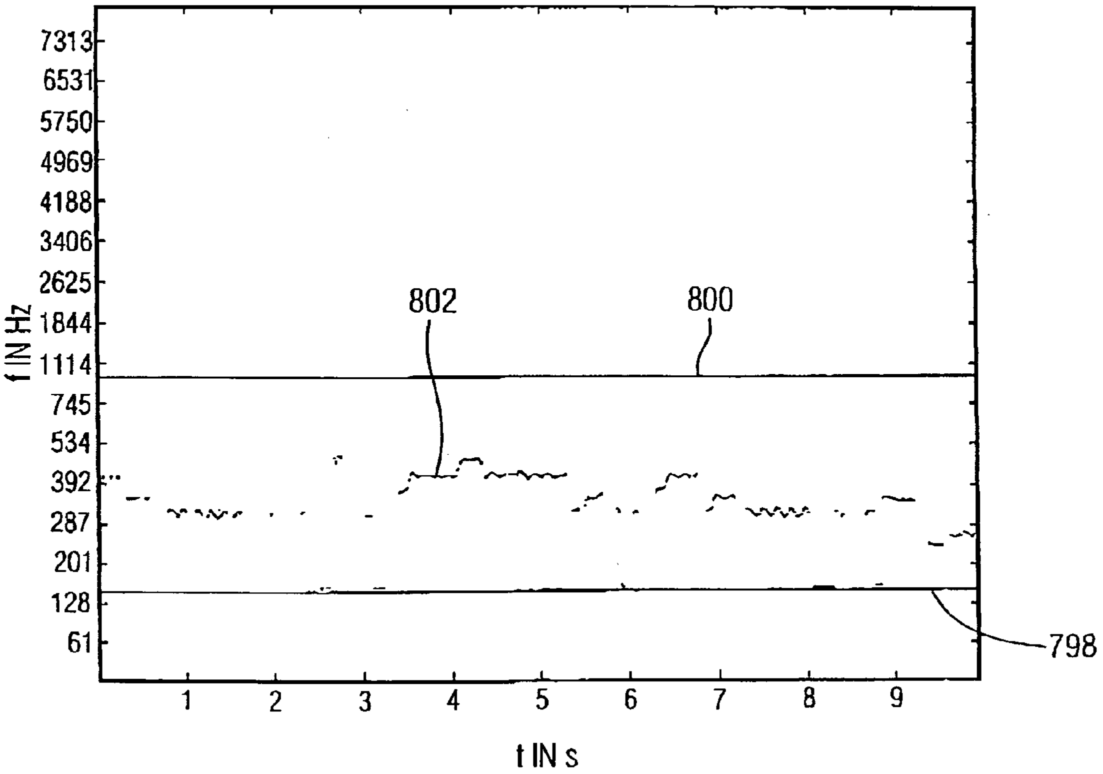
FIG. 13 shows the melody line course of FIG. 10 after the frequency range limitation in the general segmentation of FIG. 10.

For illustrating step 796, in FIG. 9 exemplarily a frequency range from 150 to 1,050 Hz is indicated by a bottom cut-off frequency line 798 and a top cut-off frequency line 800. FIG. 13 shows the melody line filtered by step 786 and clipped by step 796, which is for a differentiation provided with the reference numeral 802 in FIG. 13.

After step 796, in a step 804 a removal of sections of the melody line 802 having an amplitude that is too small is performed, wherein the extraction means 304 hereby goes back to the logarithmic spectrum of FIG. 5 of step 770. In particular, the extraction means 304 looks up in the logarithmized spectrum of FIG. 5 for the corresponding logarithmized spectral value for each tupel of frequency bin and frame through which the melody line 802 passes and determines whether the corresponding logarithmized spectral value is less than a predetermined percentage of the maximum amplitude or the maximum logarithmized spectral value, respectively, in the logarithmized spectrum of FIG. 5. In the case of a polyphonic analysis, this percentage is preferably between 50 and 70% and preferably 60%, while in a monophonic analysis this percentage is preferably between 20 and 40% and preferably 30%. Parts of the melody line 802 for which this is the case are neglected. This proceeding supports the condition that a melody usually always approximately has the same volume, or that sudden extreme volume fluctuations are hardly to be expected, respectively. In other words, therefore in step 804 all pixels of the melody matrix of FIG. 9 or FIG. 17, respectively, are set to zero, at which the logarithmized spectral values are less than the predetermined percentage of the maximum logarithmized spectral value.

Figure 14:
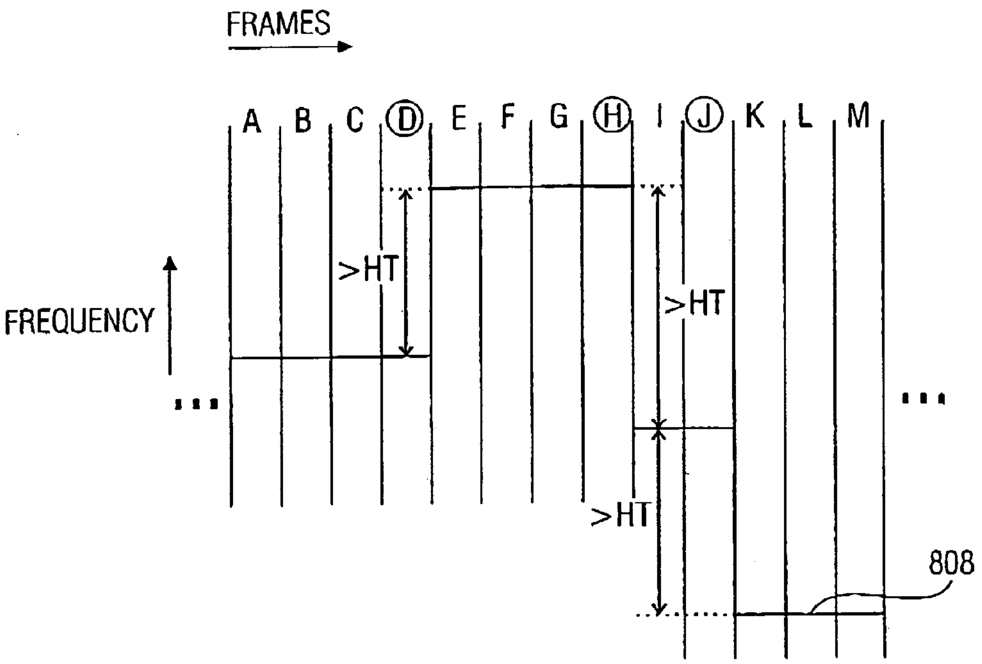
FIG. 14 shows a schematical drawing in which a section of a melody line is shown, for illustrating the operation of the penultimate step in the general segmentation of FIG. 10.

After step 804 in a step 806 an elimination of those sections of the remaining melody line follows at which the course of the melody line changes erratically in the frequency direction in order to only shortly show a more or less continuous melody course. In order to explain this, reference is made to FIG. 14 showing a section from the melody matrix across A–M subsequent frames, wherein the frames are arranged in columns, while the frequency increases from bottom to top along the column direction. The frequency bin resolution is not shown in FIG. 14 for reasons of clarity.

The melody line, as it resulted from step 804, is exemplarily shown in FIG. 14 with the reference numeral 808. As it may be seen, the melody line 808 constantly remains on one frequency bin in the frames A–D, in order to then show a frequency jump between the frames D and E, which is larger than a semitone distance HT. Between the frames E and H the melody line 808 then remains again constantly on one frequency bin, in order to then again fall from frame H to frame I by more than a semitone distance HT. Such a frequency leap which is larger than a semitone distance HT also occurs between the frames J and K. From there, the melody line 808 remains again constantly on one frequency bin between the frames J and M.

For performing the steps 806, means 304 now scans the melody line frame-by-frame for example from front to back. In doing so, means 304 checks for each frame whether between this frame and the following frame a frequency jump larger than the semitone distance HT takes place. If this is the case, means 302 marks those frames. In FIG. 14, the result of this marking is illustrated exemplarily by the corresponding frames being surrounded by a circle, here the frames D, H and J. In a second step, means 304 now checks between which of the marked frames less than a predetermined number of frames is arranged, wherein in the present case the predetermined number is preferably three. Altogether, by doing so sections of the melody line 808 are chosen at which the same jumps by less than a semitone between directly subsequent frames which are at the same time, however, less than four frame elements long. Between the frames D and H in the present exemplary case three frames are located. This means nothing but that across the frames E–H the melody line 808 jumps by no more than one semitone. Between the marked frames H and J, however, only one frame is located. This means nothing but that in the area of the frames I and J the melody line 808 leaps both forward and also backward in time direction by more than a semitone. This section of the melody line 808, i.e. in the area of the frames I and J, is therefore neglected during the following processing of the melody line. In the current melody matrix, for this reason the corresponding melody line element is set to zero at the frames I and J, i.e. it becomes white. This exclusion may at most include three subsequent frames, which corresponds to 24 ms. Tones shorter than 30 ms hardly occur in nowadays music, however, so that the exclusion after step 806 does not lead to a deterioration of the transcription result.

Figure 15:
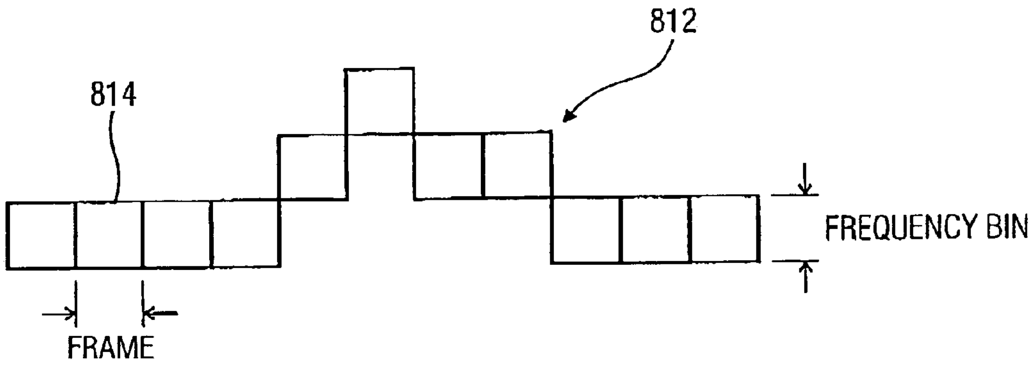
FIG. 15 shows a schematical drawing of a section from a melody line for illustrating the operation of the segment classification in the general segmentation of FIG. 10.

After step 806, the processing within the scope of the general segmentation 782 proceeds to step 810, where means 304 divides the remaining residuals of the former potential melody line of step 780 into a sequence of segments. In the division into segments, all elements in the melody matrix are united to one segment or one trajectory, respectively, which are directly adjacent. In order to illustrate this, FIG. 15 shows a section from melody line 812, as it results after step 806. In FIG. 15, only the individual matrix elements 814 from the melody matrix are shown, along which the melody line 812 proceeds. In order to check which matrix elements 814 are to be united to one segment, means 304 for example scans the same in the following way. First of all, means 304 checks, whether the melody matrix comprises a marked matrix element 814 at all for a first frame. If not, means 304 proceeds with the next matrix element and checks again the next frame for the presence of a corresponding matrix element. Otherwise, i.e. if a matrix element that is part of a melody line 812 is present, means 304 checks the next frame for the presence of a matrix element that is part of the melody line 812. If this is the case, means 304 further checks whether this matrix element is directly adjacent to the matrix element of the preceding frame. One matrix element is directly adjacent to another, if the same directly abut on each other in the row direction or if the same lie diagonal corner to corner. If a neighboring relation is present, then means 304 performs the test for the presence of a neighboring relation also for the next frame. Otherwise, i.e. in an absence of a neighboring relation, a currently recognized segment ends at the preceding frame and a new segment starts at the current frame.

The section from the melody line 812 shown in FIG. 15 represents an incomplete segment in which all matrix elements 814 that are part of the melody line or along which the same proceeds, respectively, are directly adjacent to each other.

The segments found this way are numbered so that a sequence of segments results.

The result of the general segmentation 782 is consequently a sequence of melody segments, wherein each melody segment covers a sequence of directly neighboring frames. Within each segment, the melody line jumps from frame to frame by at most a predetermined number of frequency bins, in the preceding embodiment by at most one frequency bin.

After the general segmentation 782, means 304 continues with the melody extraction in step 816. The step 816 serves for closing the gap between neighboring segments in order to address the case that due to for example percussive events in the melody line determination in step 780 inadvertently other sound portions were recognized and filtered out in the general segmentation 782. The gap-closing 816 is explained in more detail with reference to FIG. 16, wherein the gap closing 816 goes back to a semitone vector determined in a step 818, wherein the determination of the semitone vector will be described in more detail with reference to FIG. 17.

Figure 17:
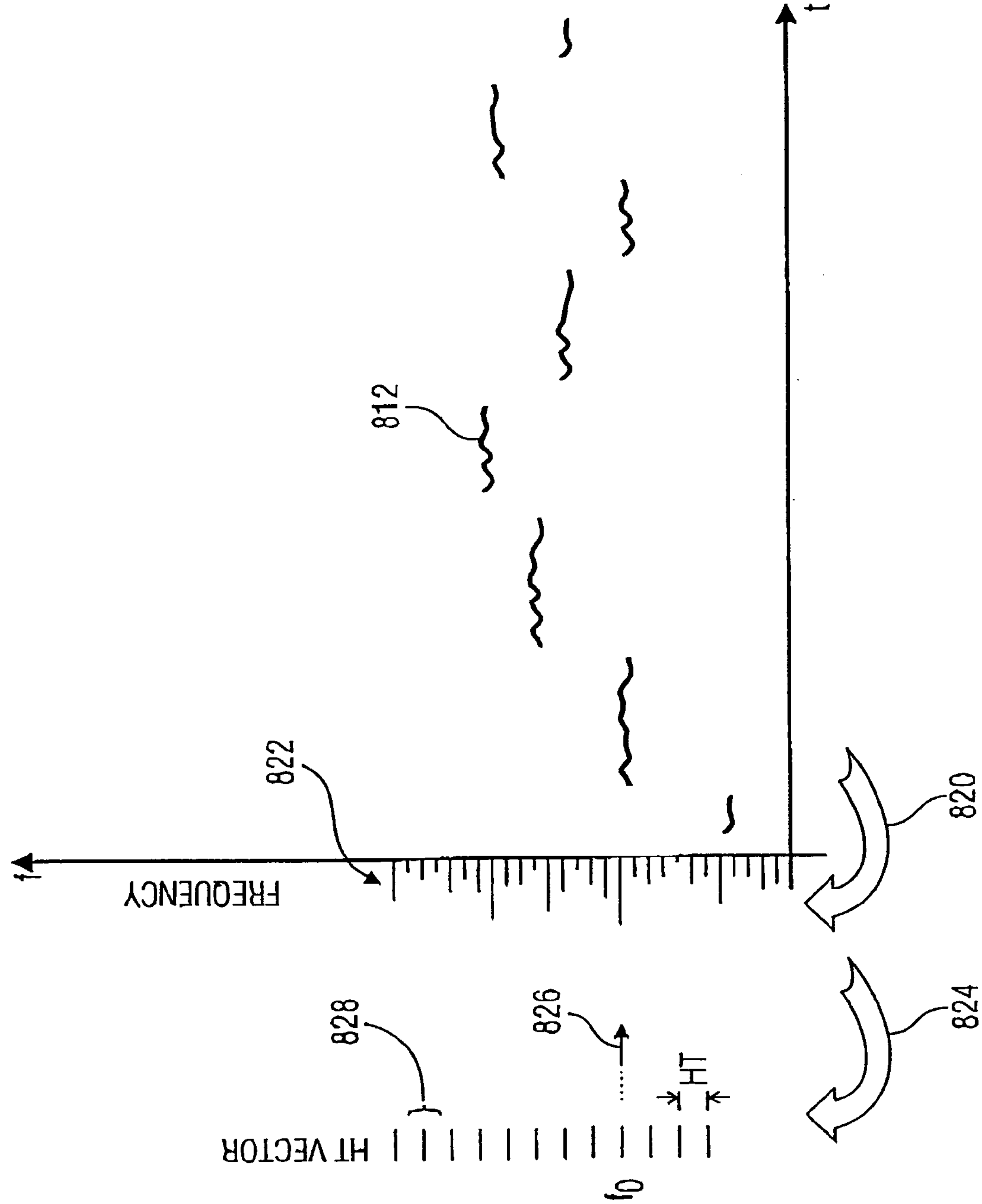
FIG. 17 shows a schematical drawing for illustrating the proceedings in positioning the variable semitone vector in FIG. 3.

As the gap-closing 816 again uses the semitone vector, in the following at first with reference to FIG. 17 the determination of the variable semitone vector is explained. FIG. 17 shows the incomplete melody line 812 resulting from the general segmentation 782 in a form entered into the melody matrix. In the determination of the semitone vector in step 818, means 304 now defines which frequency bins the melody line 812 passes und how often or in how many frames, respectively. The result of this proceeding, illustrated by case 820, is a histogram 822 which indicates the frequency for each frequency bin f, how often the melody line 812 passes the same, or how many matrix elements of the melody matrix that are part of the melody line 812 are arranged at the respective frequency bin. From this histogram 822, means 304 determines the frequency bin with the maximum frequency in a step 824. This is indicated by an arrow 826 in FIG. 17. Based on this frequency bin 826 of the frequency $f_0$, means 304 then determines a vector of frequencies $f_i$ that comprise a frequency distance to each other and in particular to the frequency $f_0$ corresponding to an integer multiple of the semitone length HT. The frequencies in the semitone vector are in the following referred to as semitone frequencies. Sometimes, reference is also made to semitone cut-off frequencies in the following. These are located exactly between neighboring semitone frequencies, i.e. exactly centered to the same. A semitone distance is defined as $2^{1/12}$ of the useful frequency $f_0$, as usual in music. By the determination of the semitone vector in step 818, the frequency axis f along which the frequency bins are plotted may be divided into semitone areas 828 that extend from semitone cut-off frequency to neighboring cut-off frequency.

Figure 16:
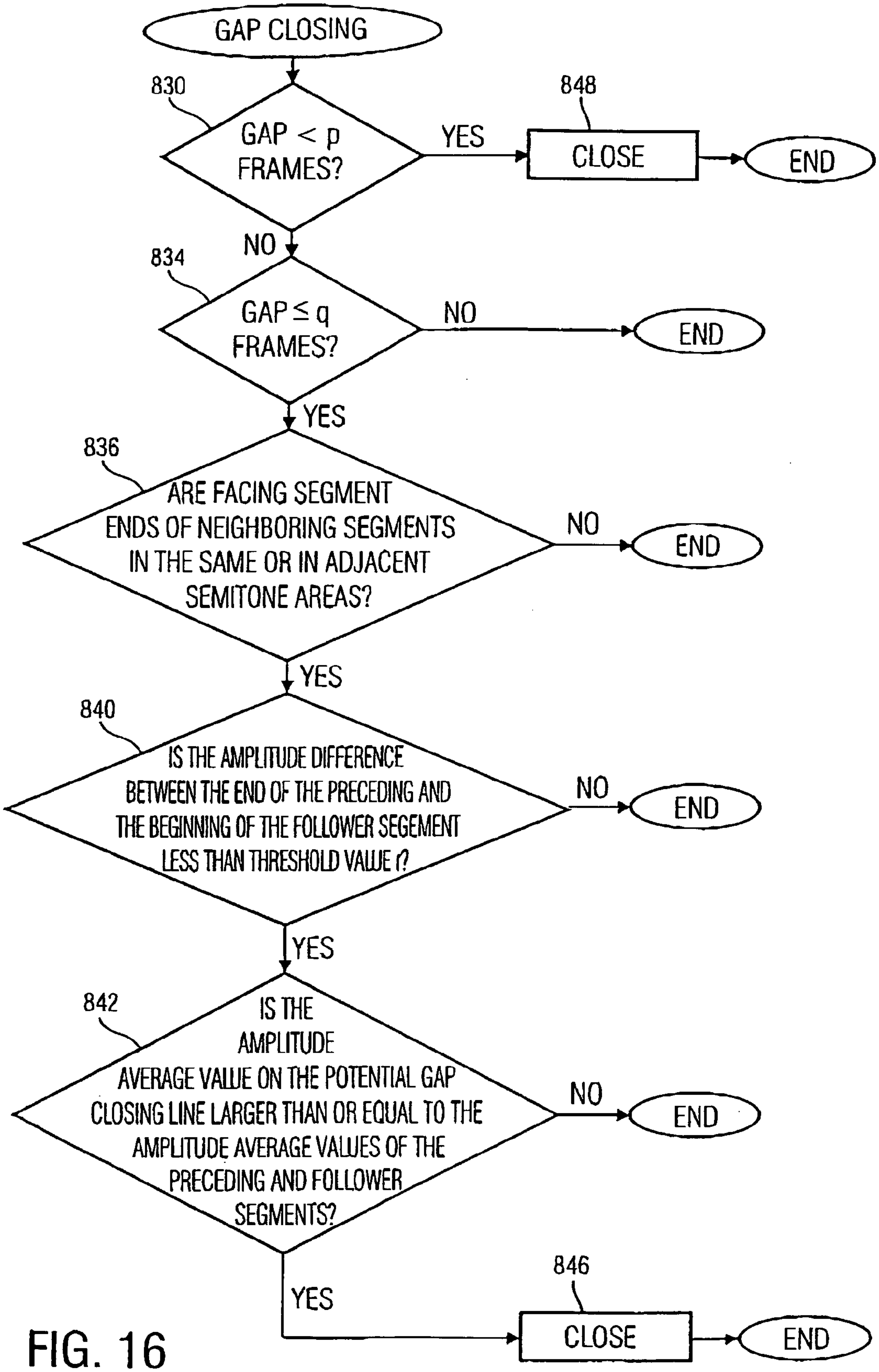
FIG. 16 shows a flow chart for illustrating the gap-closing in FIG. 3.
Figure 18:
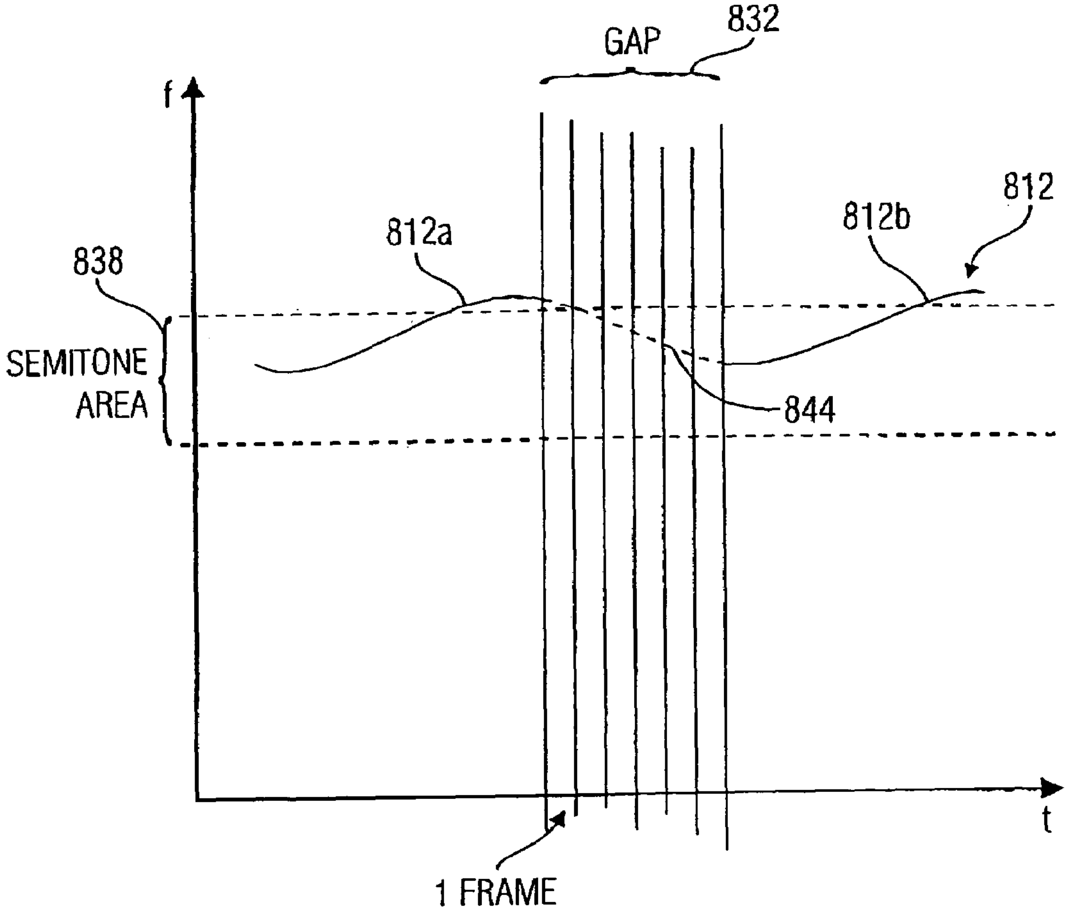
FIG. 18 shows a schematical drawing for illustrating the gap-closing of FIG. 16.
Figure 19:
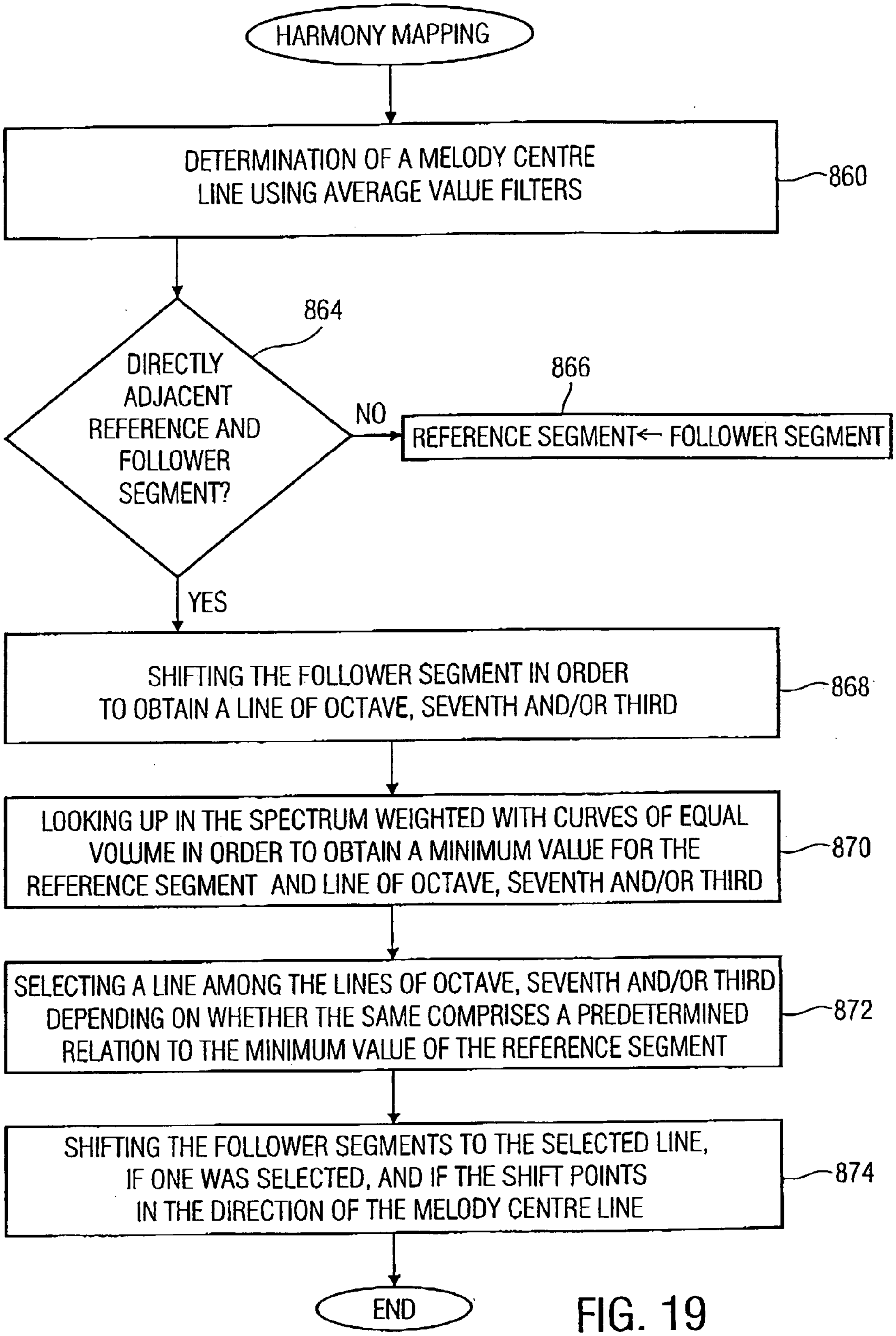
FIG. 19 shows a flow chart for illustrating the harmony mapping in FIG. 3.

The gap-closing is based on this division of the frequency axis f into semitone areas, as it is explained in the following with reference to FIG. 16. As already mentioned, it is tried in gap-closing 816 to close gaps between neighboring segments of the melody line 812 that inadvertently resulted in melody line recognition 780 or the general segmentation 782, respectively, as it was described above. The gap-closing is performed in segments. For a current reference segment, within the scope of the gap-closing 816 it is first of all determined in a step 830 whether the gap between the reference segment and the following segment is less than a predetermined number of p frames. FIG. 18 exemplarily shows a section from the melody matrix with a section from the melody line 812. In the exemplarily regarded case, the melody line 812 comprises a gap 832 between two segments 812*a* and 812*b* of which the segment 812*a* is the above-mentioned reference segment. As it may be seen, the gap in the exemplary case of FIG. 18 is six frames.

In the present exemplary case with the above indicated preferred sample frequencies, etc., p is preferably 4. In the present case, the gap 832 is therefore not smaller than four frames, whereupon the processing proceeds with step 834 in order to check whether the gap 832 is equal to or less than q frames, wherein q is preferably 15. This is presently the case, which is why the processing proceeds with step 836, where it is checked whether the segment ends of the reference segment 812*a* and the follower segment 812*b* which are facing each other, i.e. the end of the segment 812*a* and the beginning of the follower segment 812*b*, are located in one single or in adjacent semitone areas. In FIG. 18, for illustrating the circumstances, the frequency axis f is divided into semitone areas, as it was determined in step 818. As it may be seen, in the case of FIG. 18 the segment ends of the segments 812*a* and 812*b* which are facing each other are located in one single semitone area 838.

For this case of the positive examination in step 836, the processing within the scope of gap-closing proceeds with step 840, where it is checked which amplitude difference in the perception-related spectrum of step 772 is present at the positions of the end of the reference segment 812*a* and the beginning of the follower segment 812*b*. In other words, means 304 looks up the respective perception-related spectral values at the positions of the end of the segment 812*a* and the beginning of the segments 812*b* in step 840, in the perception-related spectrum of step 772, and determines the absolute value of the difference of the two spectral values. Further, means 304 determines in step 840, whether the difference is greater than a predetermined threshold value r, wherein the same is preferably 20–40% and more preferably 30% of the perception-related spectral value at the end of the reference segment 812*a*.

If the determination in step 840 provides a positive result, the gap-closing proceeds with step 842. There, means 304 determines a gap-closing line 844 in the melody matrix directly combining the end of the reference segment 812*a* and the beginning of the follower segment 812*b*. The gap-closing line is preferably straight, as it is also shown in FIG. 18. In particular, the connecting line 844 is a function across the frames, across which the gap 832 extends, wherein the function associates one frequency bin to each of these frames, so that in the melody matrix a desired connecting line 844 results.

Along this connecting line, means 304 then determines the corresponding perception-related spectral values from the perception-related spectrum of step 772, by looking up at the respective tupels of frequency bin and frame of the gap-closing line 844 in the perception-related spectrum. Via these perception-related spectral values along the gap-closing line, means 304 determines the average value and compares the same to the corresponding average values of the perception-related spectral values along the reference element 812*a* and the follower segment 812*b* within the scope of step 842. If both result in comparisons, that the average value for the gap-closing line is greater than or equal to the average value of the reference or follower segments 812*a* or 812*b*, respectively, then the gap 832 is closed in a step 846, i.e. by entering the gap-closing line 844 in the melody matrix or setting the corresponding matrix elements of the same to 1, respectively. At the same time, in step 846 the list of segments is changed in order to unite the segments 812*a* and 812*b* to one common segment, whereupon the gap closing for the reference segment and the follower segment is completed.

A gap closing along the gap-closing line 844 also results when it results in step 830 that the gap 832 is less than 4 frames long. In this case, in a step 848 the gap 832 is closed, i.e. like in the case of step 846 along a direct and preferably straight gap-closing line 844 connecting the facing ends of the segments 812*a*–812*b*, whereupon the gap closing for both segments is completed and proceeds with the following segment, if present. Although this is not shown in FIG. 16, the gap closing in step 848 is further made dependent on one condition corresponding to that of step 836, i.e. of the fact that the two facing segment ends lie in the same or in neighboring semitone areas.

If one of the steps 834, 836, 840 or 842 leads to a negative examination result, the gap closing for the reference segment 812*a* is completed and is again performed for the follower segment 812*b*.

The result of the gap closing 816 is therefore possibly a shortened list of segments or a melody line, respectively, comprising gap-closing lines in some places in the melody matrix, if applicable. As it resulted from the preceding discussion, in a gap smaller than 4 frames a connection between neighboring segments in the same or the adjacent semitone area is always provided.

A harmony mapping 850 follows upon the gap closing 816 which is provided to remove errors in the melody line which resulted through the fact that in the determination of the potential melody line 780 by mistake the wrong tonic or keynote of a sound was determined. In particular, the harmony mapping 850 operates segment by segment, in order to shift individual segments of the melody line resulting after the gap closing 816 by an octave, a fifth or a major third, as it is described in more detail in the following. As the following description will show, the conditions for this are strict in order not shift a segment erroneously in the frequency by mistake. The harmony mapping 850 is described in more detail in the following with reference to FIGS. 19 and 20.

Figure 20:
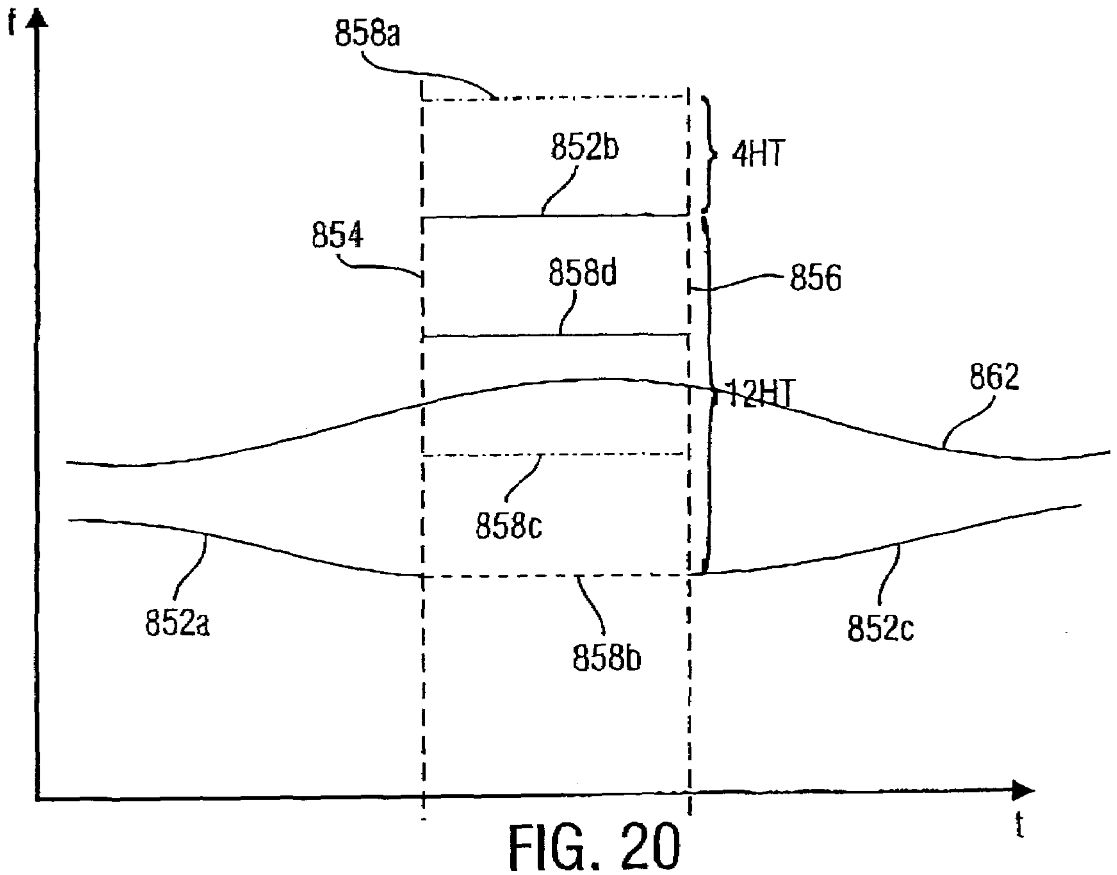
FIG. 20 shows a schematical illustration of a section from the melody line course for illustrating the operation of the harmony mapping according to FIG. 19.

As already mentioned, the harmony mapping 850 is performed in segments. FIG. 20 exemplarily shows a section of the melody line, as it resulted after the gap closing 816. This melody line is provided with the reference numeral 852 in FIG. 20, wherein in the section of FIG. 20 three segments of the melody line 852 may be seen, i.e. the segments 852*a*–*c*. The illustration of the melody line is again presented as a trace in the melody matrix, wherein, however, it is noted again that the melody line 852 is a function that uniquely associates a frequency bin to the individual—meanwhile not to all of them anymore—frames, so that the traces shown in FIG. 20 result.

The segment 852*b* located between the segments 852*a* and 852*c* seems to be cut out of the melody line course, as it would result through the segments 852*a* and 852*c*. In particular, in the present case the segment 852*b* exemplarily connects to the reference element 852*a* without a frame gap, as it is indicated by a dashed line 854. In the same way, exemplarily the time area covered by the segment 852 should directly abut on the time area covered by the segment 852*c*, as it is indicated by a dashed line 856.

In FIG. 20 now, in the melody matrix or in the time/frequency representation, respectively, further dashed, dash-dotted and dash-dot-dotted lines are shown, which also result from a parallel-shifting of the segment 852*b* along the frequency axis f. In particular, a dash-dot line 858 is shifted by four semitones, i.e. by a major third, to the segment 852*b* towards higher frequencies. A dashed line 858*b* is shifted by twelve semitones from the frequency direction f downwards, i.e. by one octave. For this line, again a line of the third 858*c* is illustrated dash-dotted and a line of the fifth 858*d* is illustrated as a dash-dot-dotted line, i.e. a line shifted by seven semitones towards higher frequencies relative to the line 858*b*.

As it may be seen from FIG. 20, the segment 852*b* seems to have been determined erroneously within the scope of the melody line determination 780, as the same would be inserted less erratically between the neighboring segments 852*a* and 852*c* when shifting downwards by one octave. It is therefore the task of the harmony mapping 850 to check whether a shifting of such “outliers” should take place or not, as such frequency jumps occur less often in a melody.

The harmony mapping 850 begins with the determination of a melody centre line using a average value filter in a step 860. In particular, step 860 includes the calculation of a sliding average value of the melody course 852 with a certain number of frames across the segments in the direction of time t, wherein the window length is for example 80–120 and preferably 100 frames with the frame length of 8 ms mentioned above as an example, i.e. correspondingly different number of frames with another frame length. In more detail, for the determination of the melody center line, a window of the length of 100 frames is shifted along the time axis t in frames. In doing so, all frequency bins associated with frames within the filter window by the melody line 852 are averaged, and this average value for the frame is entered into the middle of the filter window, whereby after a repetition for subsequent frames in the case of FIG. 20 a melody center line 862 results, a function that uniquely associates a frequency to the individual frames. The melody center line 862 may extend across the complete time area of the audio signal, wherein in this case the filter window has to be “narrowed” correspondingly at the beginning and the end of the piece, or only across an area that is spaced from the beginning and the end of the audio piece by half of the filter window width.

In a subsequent step 864 means 304 checks whether the reference segment 852*a* directly abuts on the following segment 852*b* along the time axis t. If this is not the case, the processing is performed again (866) using the following segment as the reference segment.

In the present case of FIG. 20, however, the examination in step 864 leads to a positive result, whereupon the processing proceeds with step 868. In step 868 the follower segment 852*b* is virtually shifted in order to obtain the lines of the octave, fifth and/or third 858*a*–*d*. The selection of major, third, fifth and octave is advantageous in pop music, as here mainly only a major chord is used, in which the highest and the lowest tone of a chord have a distance of a major third plus a minor third, i.e. a fifth. Alternatively, the above proceeding may of course also be applied to minor keys, in which chords of minor third and then major third occur.

In a step 870, means 304 then looks up in the spectrum evaluated with curves of equal volume or the perception-related spectrum of step 772, respectively, in order to obtain the respective minimum perception-related spectral value along the reference segment 852*a* and the line of the octave, fifth and/or third 858*a*–*d*. In the exemplary case of FIG. 20, consequently five minimum values result.

These minimum values are used in the subsequent step 872 in order to select one or none of the shifting lines of the octave, fifth and/or third 858*a*–*d* that depends on whether the minimum value determined for the respective lines of octave, fifth and/or third comprises a predetermined relation to the minimum value of the reference segment. In particular, an octave line 858*b* is selected from lines 858*a*–*d*, if the minimum value is smaller than the minimum value for the reference segment 852*a* by at most 30%. A line of the fifth 858*d* is selected if the minimum value determined for the same is at most 2.5% smaller than the minimum value of the reference segment 852*a*. One of the lines of the third 858*c* is used if the corresponding minimum value for this line is at least 10% greater than the minimum value for the reference segment 852*a*.

The above-mentioned values which were used as criterions for selecting from lines 858*a*–858*b* may of course be varied, although the same provided very good results for pieces of pop music. In addition, it is not necessarily required to determine the minimum values for the reference segment or the individual lines 858*a–d*, respectively, but for example also the individual average values may be used. The advantage of the difference of the criterions for the individual lines is that by this a probability may be considered that in the melody line determination 780 erroneously a jump of the octave, fifth or third has occurred, or that such a hop was in fact desired in the melody, respectively.

In a subsequent step 874, means 304 shifts the segment 852*b* to the selected line 858*a*–858*d*, as far as one such line was selected in step 872, provided that the shifting points into the direction of the melody center line 862, that is from the point of view of the follower segment 852*b*. In the exemplary case of FIG. 20 the latter condition would be fulfilled as long as the line of the third 858*a* is not selected in step 872.

After the harmony mapping 850, in a step 876 a vibrato recognition and a vibrato balance or equalization takes place whose functioning is explained in more detail with reference to FIGS. 21 and 27.

Figure 22:
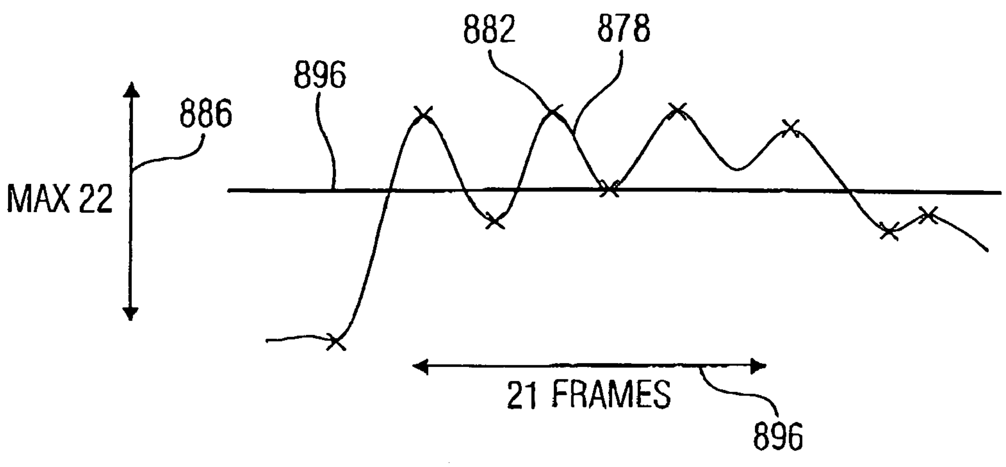
FIG. 22 shows a schematical illustration of a segment course for illustrating the proceedings according to FIG. 21.

The step 876 is performed in segments for each segment 878 in the melody line, as it results after the harmony mapping 850. In FIG. 22 an exemplary segment 878 is illustrated enlarged, i.e. in an illustration in which the horizontal axis corresponds to the time axis and the vertical axis corresponds to the frequency axis, as it was also the case in the preceding figures. In a first step 880 now within the scope of the vibrato recognition 876 the reference segment 878 is first of all examined with regard to local extremes. In doing so, it is indicated again that the melody line function and thus also the part corresponding to the interesting segment of the same uniquely maps the frames across this segment to frequency bins in order to form the segment 888. This segment function is examined with regard to local extremes. In other words, in step 880 the reference segment 878 is examined with regard to those locations where the same comprises local extremes with regard to the frequency direction, i.e. locations in which the gradient of the melody line function is zero. These locations are exemplarily indicated by vertical lines 882 in FIG. 22.

In a following step 884 it is checked whether the extremes 882 are arranged such that in the time direction neighboring local extremes 882 are arranged at frequency bins comprising a frequency separation larger than or smaller than or equal to a predetermined number of bins, i.e. for example 15 to 25 but preferably 22 bins in the implementation of the frequency analysis described with reference to FIG. 4 or a number of bins per semitone area of approximately 2 to 6, respectively. In FIG. 22, the length of 22 frequency bins is illustrated exemplarily with a double arrow 886. As it may be seen, the extremes 882 fulfill the criterion 884.

In a subsequent step 888 means 304 examines whether between the neighboring extremes 882 the time distance is always smaller than or equal to a predetermined number of time frames, wherein the predetermined number is for example 21.

If the examination in step 888 is positive, as it is the case in the example of FIG. 22, which may be seen at the double arrow 890, which is to correspond to the length of 21 frames, it is examined in a step 892 whether the number of the extremes 882 is larger than or equal to a predetermined number which is preferably 5 in the present case. In the example of FIG. 22 this is given. If, therefore, also the examination in step 892 is positive, in a subsequent step 894 the reference segment 878 or the recognized vibrato, respectively, is replaced by its average value. The result of step 894 is indicated in FIG. 22 at 896. In particular, in step 894 the reference segment 878 is removed on the current melody line and replaced by a reference segment 896 that extends via the same frames as the reference segment 878, runs along a constant frequency bin, however, corresponding to the average value of the frequency bin through which the replaced reference segment 878 was running. If the result of one of the examinations 884, 888 and 892 is negative, then the vibrato recognition or balance, respectively, for the respective reference segment ends.

Figure 21:
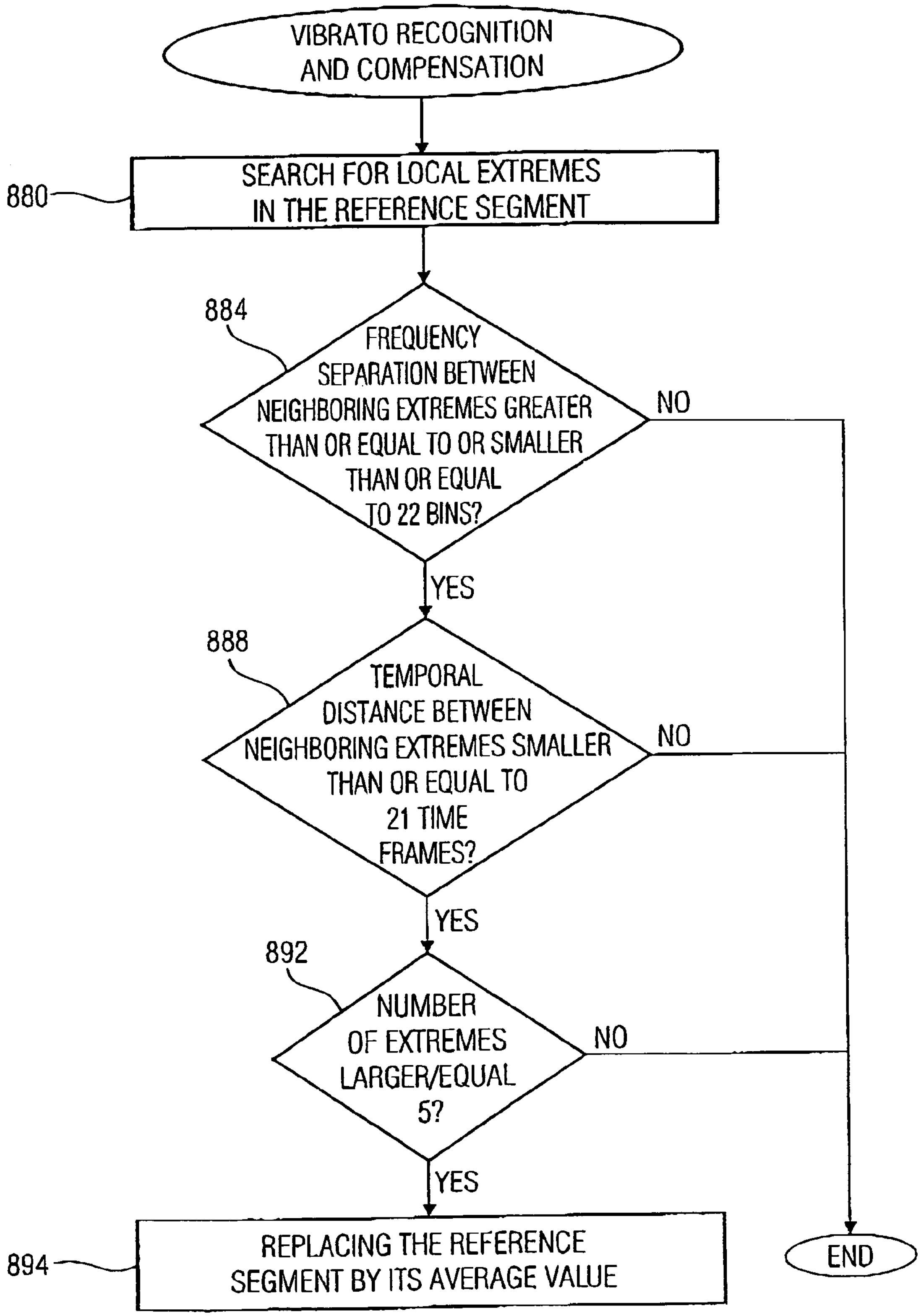
FIG. 21 shows a flow chart for illustrating the vibrator recognition and the vibrator balance in FIG. 3.

In other words, the vibrato recognition and the vibrato balance according to FIG. 21 performs a vibrato recognition by a feature extraction performed step by step in which local extremes, i.e. locale minima and maxima, are searched for, with a restriction with regard to the number of admissible frequency bins of the modulation and a restriction with regard to the temporal distance of the extremes, wherein as a vibrato only a group of at least 5 extremes is regarded. A recognized vibrato is then replaced by its average value in the melody matrix.

Figure 23:
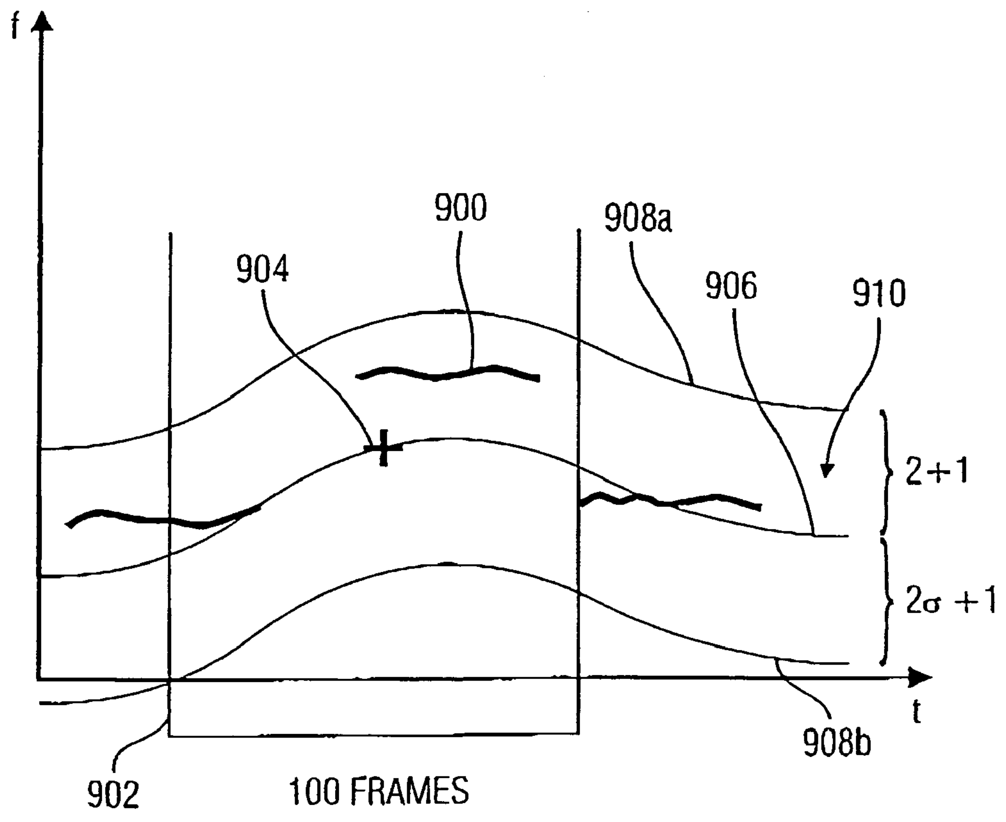
FIG. 23 shows a schematical illustration of a section from the melody line course for illustrating the proceedings in the statistic correction in FIG. 3.

After the vibrato recognition in step 876, in step 898 a statistical correction is performed which also considers the observation that in a melody short and extreme tone pitch fluctuations are not to be expected. The statistical correction according to 898 is explained in more detail with reference to FIG. 23. FIG. 23 exemplarily shows a section of a melody line 900, as it may result after the vibrato recognition 876. Again, the course of the melody line 900 is illustrated entered into the melody matrix, which is spanned by the frequency axis f and the time axis t. In the statistical correction 898, first of all similar to step 860 in the harmony mapping a melody center line for the melody line 900 is determined. For the determination, as in the case of step 860, a window 902 of a predetermined time length, like e.g. a length of also 100 frames, is shifted frames by frame along the time axis t, in order to calculate an average value of the frequency bins frame by frame, which are passed by the melody line 900 within the window 902, wherein the average value is associated with the frame in the middle of the window 902 as a frequency bin, whereupon a point 904 of the melody center line to be determined results. The thus resulting melody center line is indicated by the reference numeral 906 in FIG. 23.

After that, a second window not shown in FIG. 23 is shifted along the time axis t in frames, for example comprising a window length of 170 frames. Per frame, here the standard deviation of the melody line 900 to the melody center line 906 is determined. The resulting standard deviation for each frame is multiplied by 2 and supplemented by 1 bin. This value is then added for each frame to the respective frequency bin passing the melody center line 902 at this frame and subtracted from the same, in order to obtain a top and a bottom standard deviation line 908*a* and 908*b*.

The two standard deviation lines 908*a* and 908*b* define an admitted area 910 between the same.

Within the scope of the statistical correction 898, now all segments of the melody line 900 are removed that lie completely outside the area of admission 910. The result of the statistical correction 898 is consequently a reduction of the number of segments.

After step 898 a semitone mapping 912 follows. The semitone mapping is performed frame-by-frame, wherein for this the semitone vector of step 818 is used defining the semitone frequencies. The semitone mapping 912 functions such that for each frame at which the melody line which resulted from step 898 is presented, it is examined, in which one of the semitone areas the frequency bin is present, in which one the melody line passes the respective frame or to which frequency bin the melody line function maps the respective frame, respectively. The melody line is then changed such that in the respective frame the melody line is changed to the frequency value corresponding to the semitone frequency of the semitone arrange in which the frequency bin was present which the melody line passed.

Instead of the semitone mapping or quantization frame-by-frame, respectively, also a semitone quantization segment-by-segment may be performed, for example by the fact that only the frequency average value per segment is associated with one of the semitone areas and thus to the corresponding semitone area frequency in the above-described way, which is then used over the whole time length of the corresponding segment as the frequency.

The steps 782, 816, 818, 850, 876, 898 and 912 consequently correspond to step 760 in FIG. 2.

After the semitone mapping 912 an onset recognition and correction that takes place for every segment is performed in step 914. The same is explained in more detail with reference to FIGS. 24–26.

It is the aim of the onset recognition and correction 914 to correct or specify, respectively, the individual segments of the melody line resulting by the semitone mapping 912 in more detail with regard to their initial points of time, wherein the segments correspond more and more to the individual notes of the searched melody. To this end, again use is made of the incoming audio signal 302 or the one provided in step 750, respectively, as it is described in more detail in the following.

Figure 25:
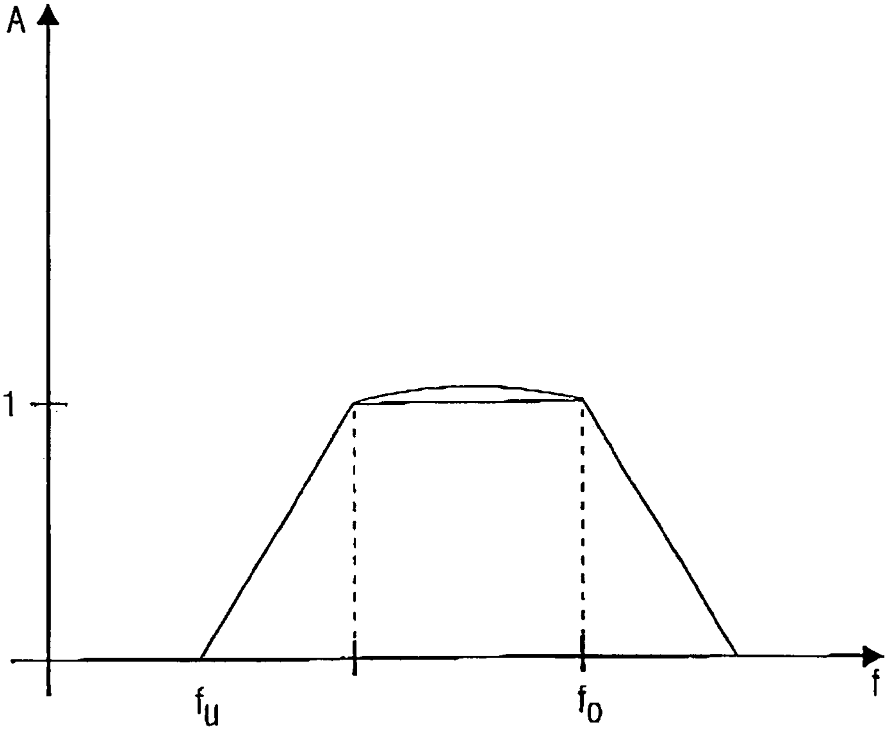
FIG. 25 shows a graph that shows an exemplary filter transmission function for use in the onset-recognition according to FIG. 24.

In a step 916, first of all the audio signal 302 is filtered with a band pass filter corresponding to the semitone frequency to which the respective reference segment in step 912 was quantized, or with a band pass filter, respectively, comprising cut-off frequencies between which the quantized semitone frequency of the respective segment is present. Preferably, the band pass filter is used as one that comprises cut-off frequencies corresponding to the semitone cut-off frequencies $f_u$ and $f_o$ of the semitone area in which the considered segment is located. Again preferably, as the band pass filter an IIR band pass filter is used with the cut-off frequencies $f_u$ and $f_0$ associated with the respective semitone area as filter cut-off frequencies or a Butterworth band pass filter whose transmission function is shown in FIG. 25.

Subsequently, in a step 918 a two-way rectification of the audio signal filtered in step 916 is performed, whereupon in a step 920 the time signal obtained in step 918 is interpolated and the interpolated time signal is folded with a hamming filter, whereby an envelope of the two-way rectified or the filtered audio signal, respectively, is determined.

Figure 26:
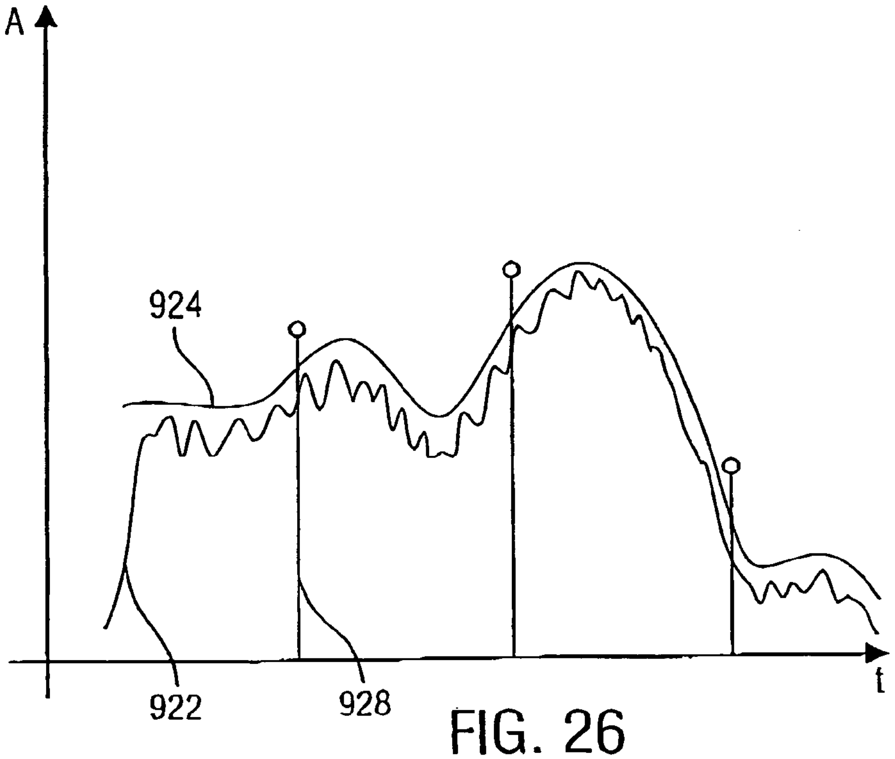
FIG. 26 shows a schematical course of a two-way rectified filtered audio signal and the envelope of the same, as they are used for an onset recognition and correction in FIG. 24.

The steps 916–920 are illustrated again with reference to FIG. 26. FIG. 26 shows the two-way rectified audio signal with the reference numeral 922, as it results after step 918, i.e. in a graph, in which horizontally the time t is plotted in virtual units and vertically the amplitude of the audio signal A is plotted in virtual units. Further, in the graph the envelope 924 is shown resulting in step 920.

The steps 916–920 only represent a possibility for generating the envelope 924 and may of course be varied. Anyway, envelopes 924 for the audio signal are generated for all those semitone frequencies or semitone areas, respectively, in which segments or note segments, respectively, of the current melody line are arranged. For each such envelope 924 then the following steps of FIG. 24 are performed.

First of all, in a step 926 potential initial points of time are determined, that is as the locations of the local maximum increase of the envelope 924. In other words, inflection points in the envelope 924 are determined in step 926. The points of time of the inflection points are illustrated with vertical lines 928 in the case of FIG. 26.

Figure 24:
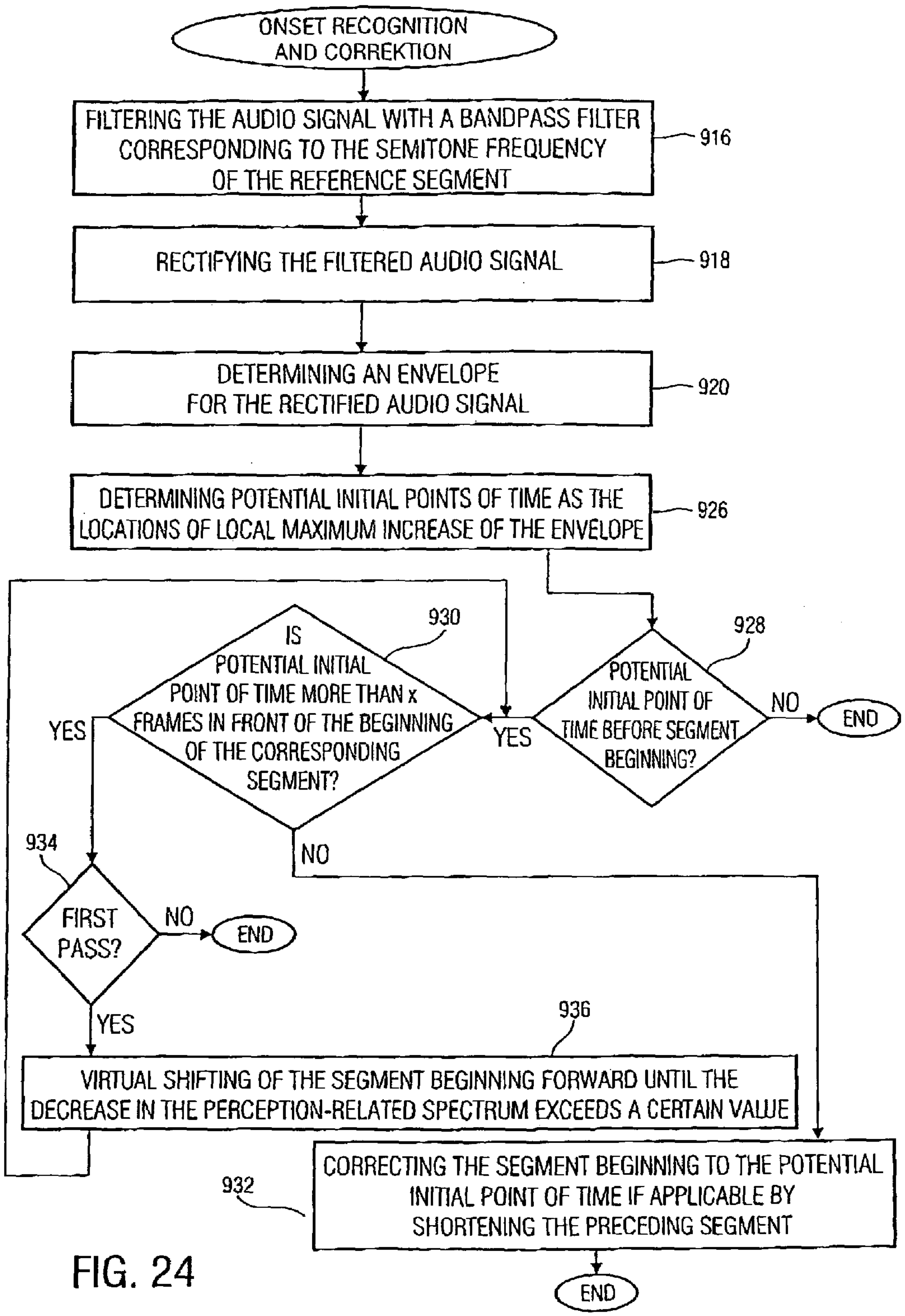
FIG. 24 shows a flow chart for illustrating the proceedings in the onset recognition and correction in FIG. 3.

For the following evaluation of the determined potential initial points of time or potential slopes, respectively, a down-sampling to the time resolution of the preprocessing is performed, if applicable within the scope of step 926, not shown in FIG. 24. It is to be noted that in step 926 not all potential initial points of time or all inflection points, respectively, have to be determined. It is further not necessary that all determined or established potential initial points of time, respectively, are to be supplied to the following processing. It is rather possible to establish or further process, respectively, only those inflection points as potential initial points of time, which are arranged in a temporal proximity before or within a temporal area corresponding to one of the segments of the melody line arranged in the semitone area underlying the determination of the envelope 924.

In a step 928 it is examined now, whether it holds true for a potential initial point of time that the same lies before the segment beginning of the segment corresponding to the same. If this is the case, the processing proceeds with step 930. Otherwise, i.e. when the potential initial point of time is behind the existing segment beginning, step 928 is repeated for a next potential initial point of time or step 926 for a next envelope which was determined for another semitone area, or the onset recognition and correction performed segment-by-segment is performed for a next segment.

In step 930 it is checked whether the potential initial point of time is more than x frames before the beginning of the corresponding segment, wherein x is for example between 8 and including 12 and preferably 10 with a frame length of 8 ms, wherein the values for other frame lengths would have to be changed correspondingly. If this is not the case, i.e. if the potential initial point of time or the determined initial point of time, respectively, is up to 10 frames before the interesting segment, in a step 932 the gap between the potential initial point of time and the previous segment beginning is closed or the previous segment beginning is corrected to the potential initial point of time, respectively. To this end, if applicable, the previous segment is correspondingly shortened or its segment end is changed to the frame before the potential initial point of time, respectively. In other words, step 932 includes an elongation of the reference segment in forward direction up to the potential initial point of time and a possible shortening of the length of the previous segment at the end of the same in order to prevent an overlapping of the two segments.

If, however, the examination in step 930 indicates that the potential initial point of time is closer than x frames in front of the beginning of the corresponding segments, then it is checked in a step 934 whether the step 934 is run for the first time for this potential initial point of time. If this is not the case, the processing ends here for this potential initial point of time and the corresponding segment and the processing of the onset recognition proceeds with step 928 for a further potential initial point of time or with step 926 for a further envelope.

Otherwise, however, in a step 936 the previous segment beginning of the interesting segment is virtually shifted forward. To this end, the perception-related spectral values which are located at the virtually shifted initial points of time of the segment are looked up in the perception-related spectrum. If the decrease of these perception-related spectral values in the perception-related spectrum exceeds a certain value, then the frame at which this exceeding took place is temporarily used as a segment beginning of the reference segment and step 930 is again repeated. If then the potential initial point of time is not more than x frames in front of the beginning determined in step 936 of the corresponding segment anymore, the gap in step 932 is also closed, as it was described above.

The effect of the onset recognition and correction 914 consequently consists in the fact that individual segments are changed in the current melody line with regard to their temporal extension, i.e. elongated to the front or shortened at the back, respectively.

After step 914 then a length segmentation 938 follows. In the length segmentation 938, all segments of the melody line which now occur as horizontal lines in the melody matrix due to the semitone mapping 912 which lie on the semitone frequencies, are scanned through, and those segments are removed from the melody line which are smaller than a predetermined length. For example, segments are removed which are less than 10–14 frames and preferably 12 frames and less long—again assuming as above a frame length of 8 ms or a corresponding adjustment of the numbers of frames. 12 frames at a time resolution or frame length, respectively, of 8 milliseconds correspond to 96 milliseconds, which is less than about a 1/64 note.

The steps 914 and 938 consequently correspond to step 762 of FIG. 2.

The melody line held in step 938 then consists of a slightly reduced number of segments which comprise exactly the same semitone frequency across a certain number of subsequent frames. These segments may uniquely be associated to note segments. This melody line is then, in a step 940 which corresponds to the above-described step 764 of FIG. 2, converted into a note representation or a midi file, respectively. In particular, each segment still located in the melody line after the length segmentation 938 is examined in order to find the first frame in the respective segment. This frame then determines the note initial point of time of the note corresponding to this segment. For the note, the note length is then determined from the number of frames, across which the corresponding segment extends. The quantized pitch of the note results from the semitone frequency which is constant in each segment due to step 912.

The midi output 914 through means 304 then results in the note sequence, based on which the rhythm means 306 performs the operations described above.

The preceding description with regard to FIGS. 3–26 was related to the melody recognition in means 304 for the case of polyphonic audio pieces 302. If it is known, however, that the audio signals 302 are of a monophonic type, as it is for example the case in the case of humming or whistling, respectively, for generating ring tones, as it was described above, a proceeding which is slightly changed compared to the proceeding in FIG. 3 may be preferred in so far that by the same errors may be prevented that may result in the proceeding of FIG. 3 due to musical shortcomings in the original audio signal 302.

Figure 27:
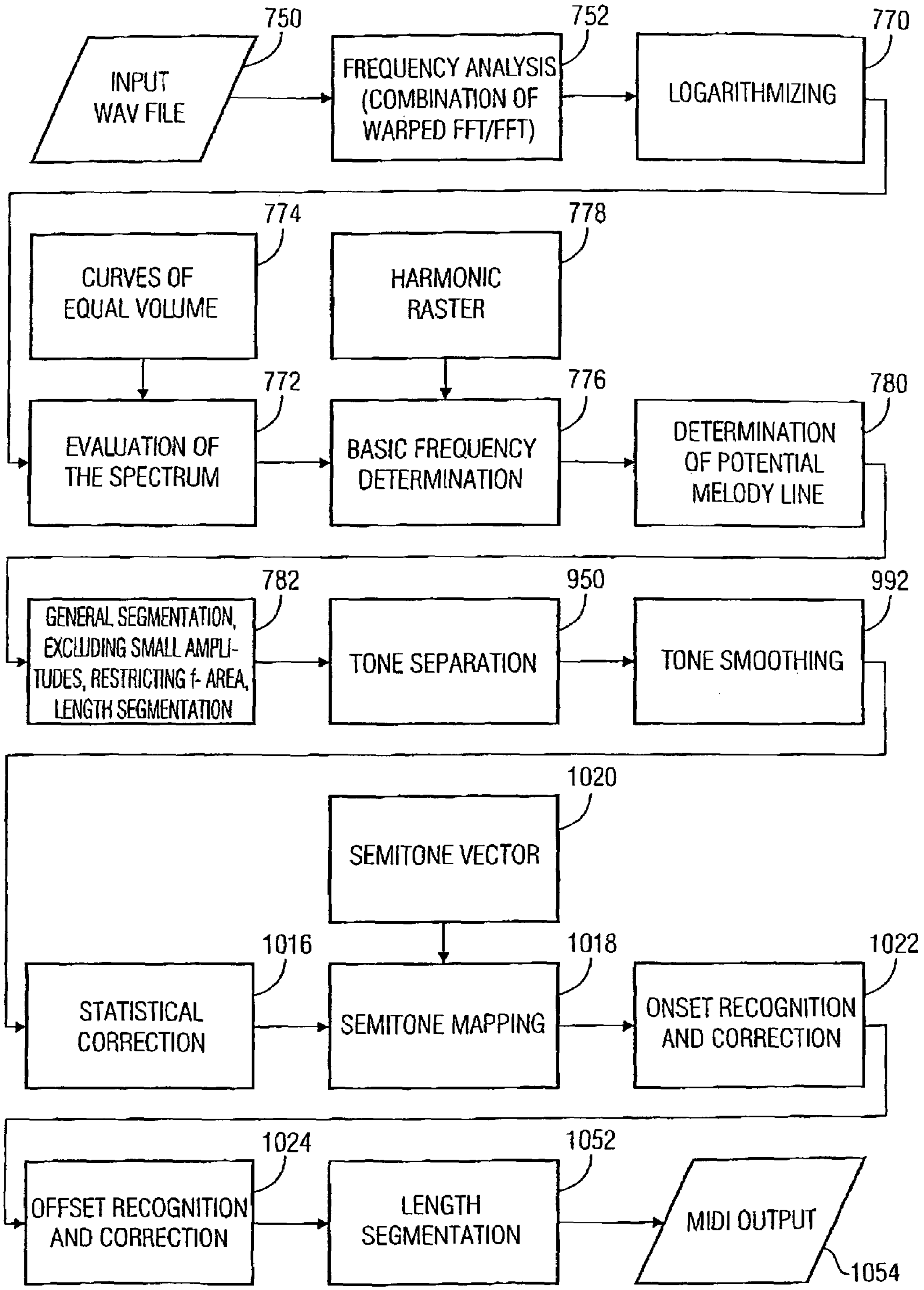
FIG. 27 shows a flow chart for illustrating the functioning of the extraction means of FIG. 1 for the case of monophonic audio input signals.
Figure 28:
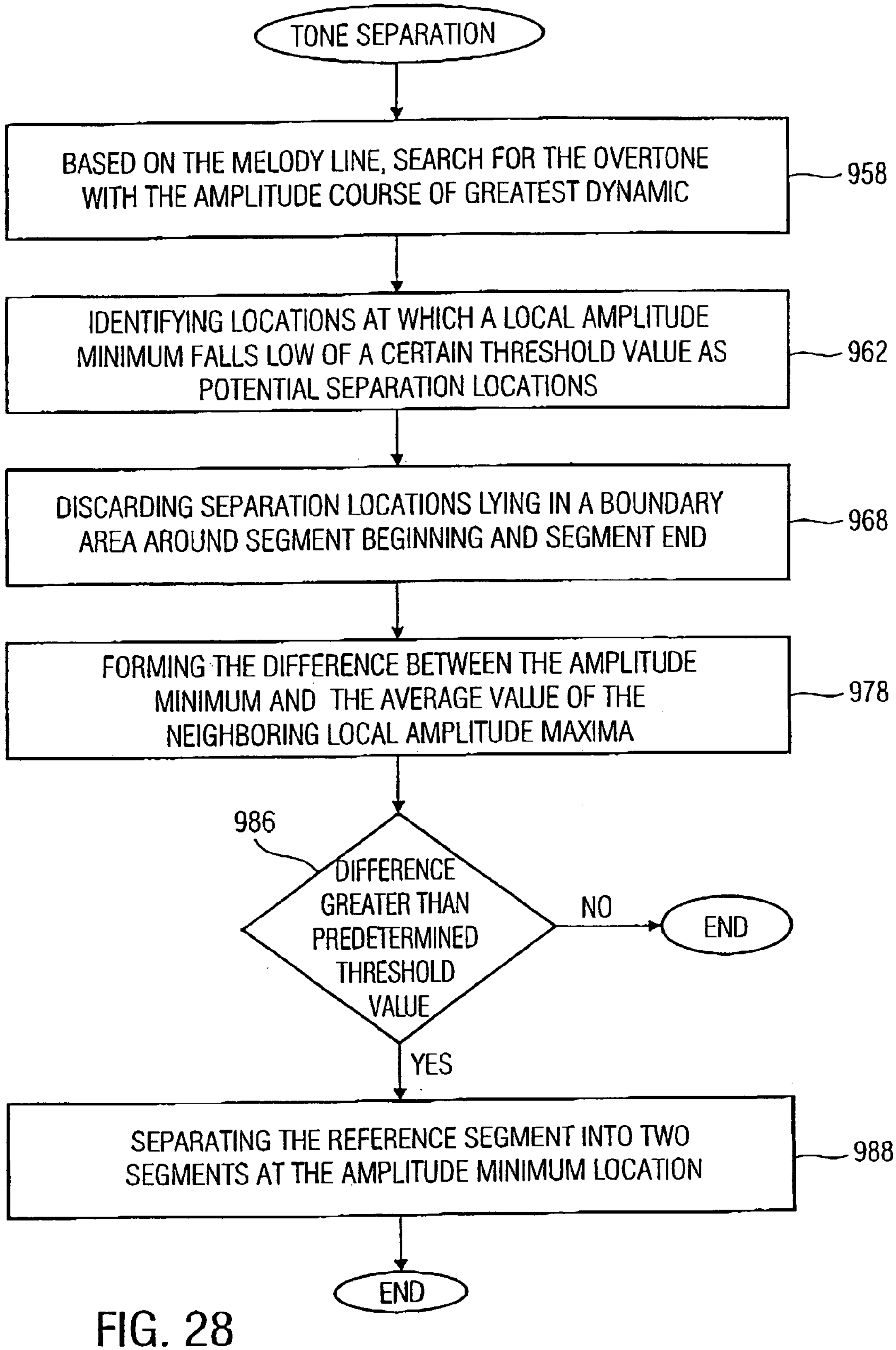
FIG. 28 shows a flow chart for illustrating the tone separation in FIG. 27.

FIG. 27 shows the alternative functioning of means 304 which is to be preferred for monophonic audio signals compared to the proceeding of FIG. 3, would, however, basically also be applicable for polyphonic audio signals.

Up to step 782 the proceeding according to FIG. 27 corresponds to that of FIG. 3, which is why for those steps also the same reference numerals as in the case of FIG. 3 are used.

Figure 29:
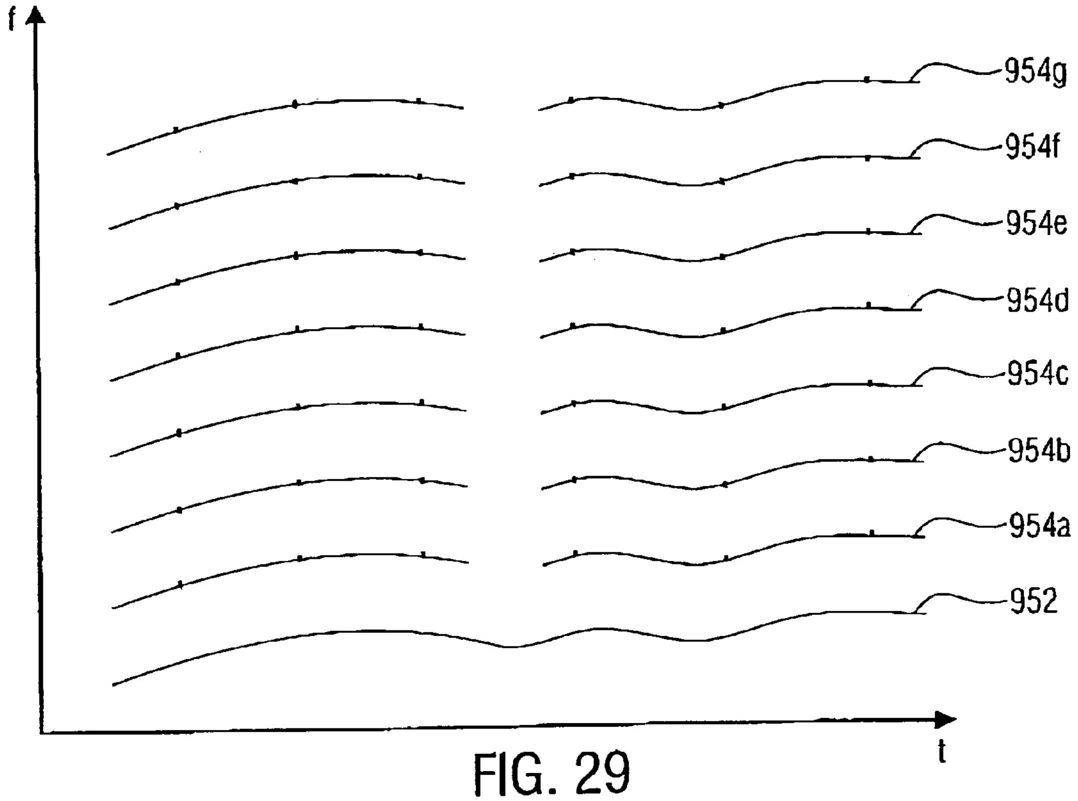
FIG. 29 shows a schematical illustration of a section from the amplitude course of the spectrogram of an audio signal along a segment for illustrating the functioning of the tone separation according to FIG. 28.

In contrast to the proceeding according to FIG. 3, after step 782 in the proceeding according to FIG. 27 a tone separation is performed in step 950. The reason for performing the tone separation in step 950 which is explained in more detail with reference to FIG. 28, may be illustrated with reference to FIG. 29 which illustrates the form of the spectrogram for a section of the frequency/time space of the spectrogram of the audio signal, as it results after the frequency analysis 752, for a predetermined segment 952 of the melody line, as it results after the general segmentation 782, for a keynote and for its overtones. In other words, in FIG. 29 the exemplary segment 952 was shifted along the frequency direction f by integer multiples of the respective frequency in order to determine overtone lines. FIG. 29 now shows only those parts of the reference segment 952 and the corresponding overtone lines 954*a–g*, at which the spectrogram of step 752 comprises spectral values exceeding an exemplary value.

As it may be seen, the amplitude of the keynote of the reference segment 952 obtained in the general segmentation 782 is continuously above the exemplary value. Only the above arranged overtones show an interruption about in the middle of the segment. The continuity of the keynote caused that the segment did not break down into two notes in the general segmentation 782, although probably about in the middle of the segment 952 a note boundary or interface exists. Errors of this kind predominantly only occur with monophonic music, which is why the tone separation is only performed in the case of FIG. 27.

Figure 30A:
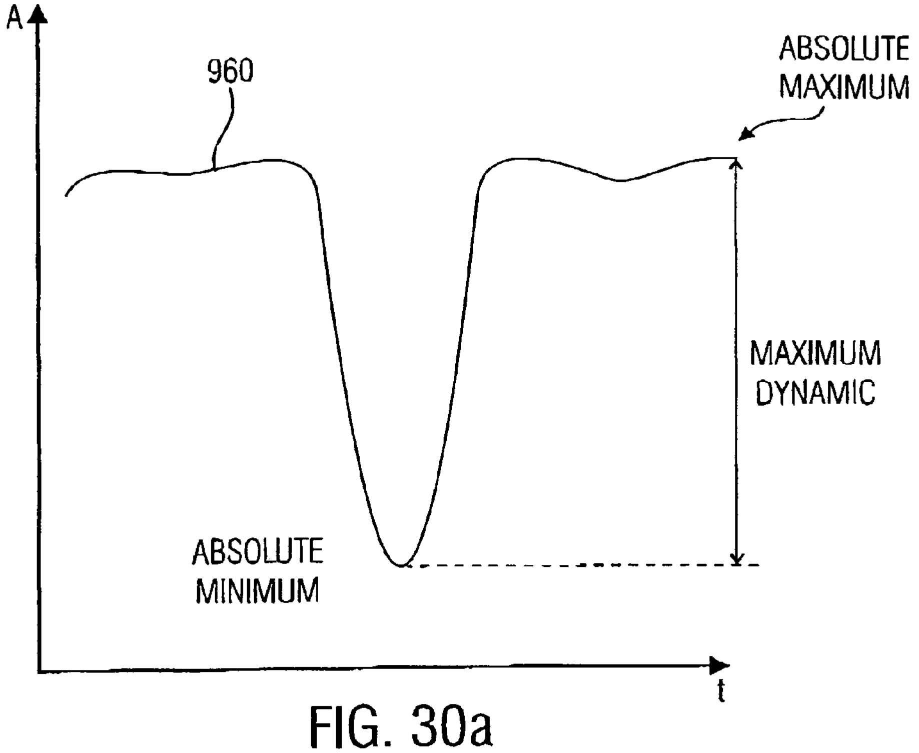
FIGS. 30*a* and *b* show schematical illustrations of a section from the amplitude course of the spectrogram of an audio signal along a segment for illustrating the functioning of the tone separation according to FIG. 28.

In the following now the tone separation 950 is explained in more detail with reference to FIG. 22, FIG. 29 and FIGS. 30*a, b*. The tone separation starts in step 958 based on the melody line obtained in step 782 with the search for the overtone or those overtone lines, respectively, 954*a*–954*g* along which the spectrogram obtained through the frequency analysis 752 comprises the amplitude course with the greatest dynamic. FIG. 30*a* shows exemplarily in a graph in which the x axis corresponds to a time axis t and the y axis corresponds to the amplitude or the value of the spectrogram, respectively, such an amplitude course 960 for one of the overtone lines 954*a*–954*g*. The dynamic for the amplitude course 960 is determined from the difference between the maximum spectral value of the course 960 and the minimum value within the course 960. FIG. 30*a* exemplarily illustrates the amplitude course of the spectrogram along the overtone line 450*a*–450*g* which comprises the greatest dynamic among all those amplitude courses. In step 958 preferably only the overtones of order 4 to 15 are considered.

Figure 30B:
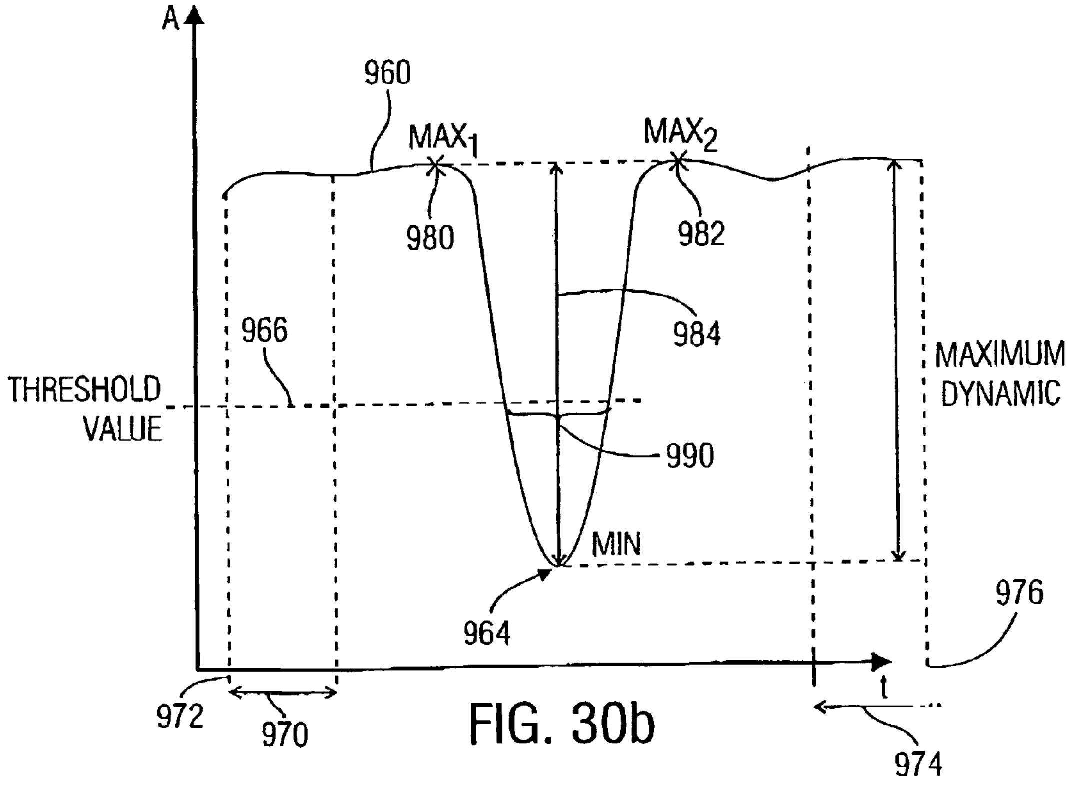

In a following step 962, thereupon in the amplitude course with the greatest dynamic those locations are identified as potential separation locations at which a local amplitude minimum falls under a predetermined threshold value. This is illustrated in FIG. 20*b*. In the exemplary case of FIG. 30*a* or b, respectively, only the absolute minimum 964 which of course also illustrates a local minimum, falls below the threshold value which is illustrated exemplarily in FIG. 30*b* using the dashed line 966. In FIG. 30*b* there is consequently only one potential separation location, i.e. the point of time or the frame, respectively, at which the minimum 964 is arranged.

In a step 968 then among the possibly several separation locations the ones are sorted out that lie in a boundary area 970 around the segment beginning 972 or within a boundary area 974 around the segment end 976. For the remaining potential separation locations, in a step 978 the difference between the amplitude minimum at the minimum 964 and the average value of the amplitudes of the local maxima 980 or 982, respectively, neighboring the minimum 964, is formed in the amplitude course 960. The difference is illustrated in FIG. 30*b* by a double arrow 984.

In a subsequent step 986 it is checked whether the difference 984 is larger than a predetermined threshold value. If this is not the case, the tone separation for this potential separation location and if applicable for the regarded segment 960 ends. Otherwise, in a step 988 the reference segment is separated into two segments at the potential separation location or the minimum 964, respectively, wherein the one extends from the segment beginning 972 to the frame of the minimum 964 and the other extends between the frame of the minimum 964 or the subsequent frame, respectively, and the segment end 976. The list of segments is correspondingly extended. A different possibility of separation 988 is to provide a gap between the two newly generated segments. For example in the area, in which the amplitude course 960 is below the threshold value—in FIG. 30*b* for example across the time area 990.

A further problem which mainly occurs with monophonic music is that the individual notes are subject to frequency fluctuations that make a subsequent segmentation more difficult. Because of this, after the tone separation 950 in step 992 a tone smoothing is performed which is explained in more detail with reference to FIGS. 31 and 32.

Figure 31:
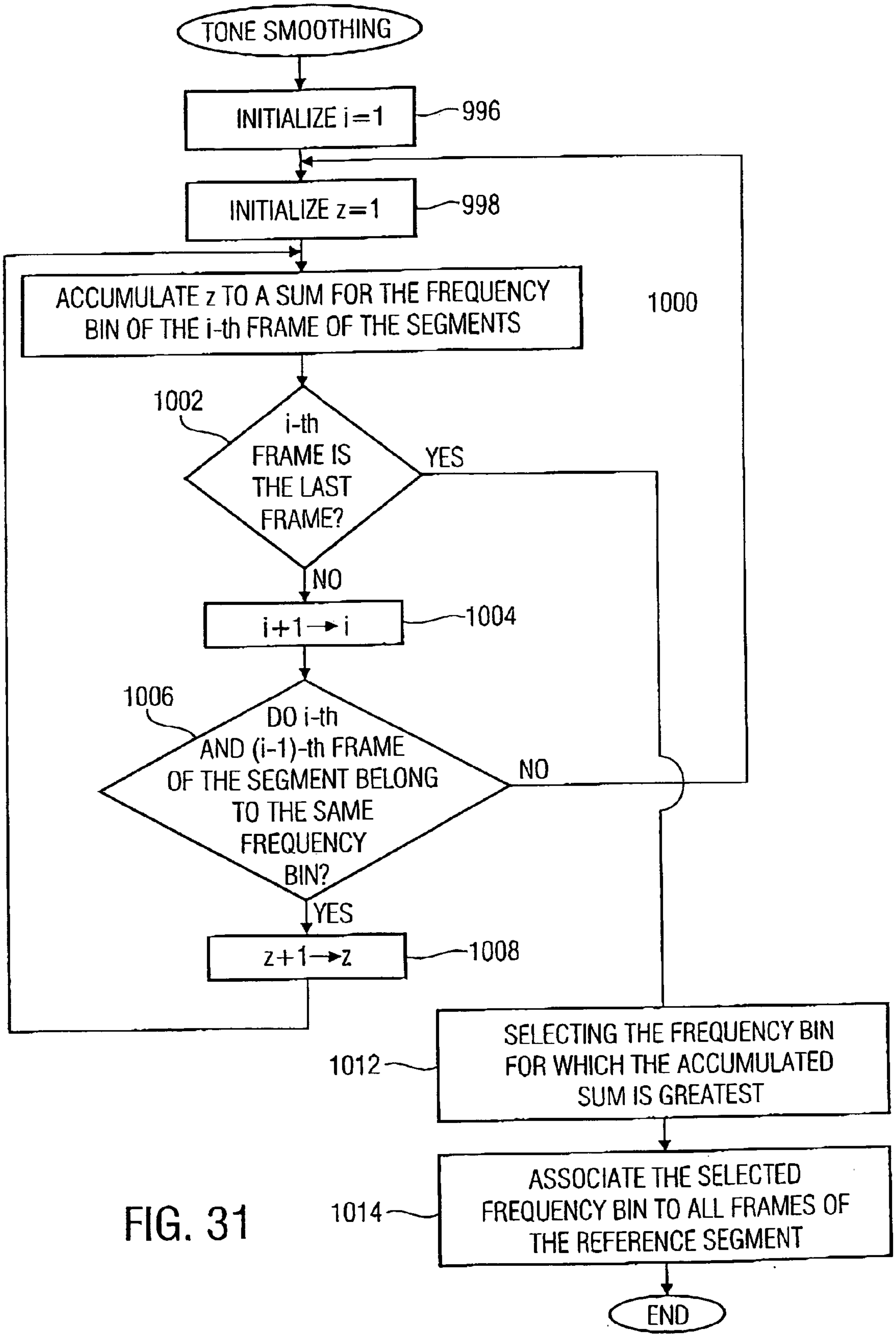
FIG. 31 shows a flow chart for illustrating the tone smoothing in FIG. 27.
Figure 32:
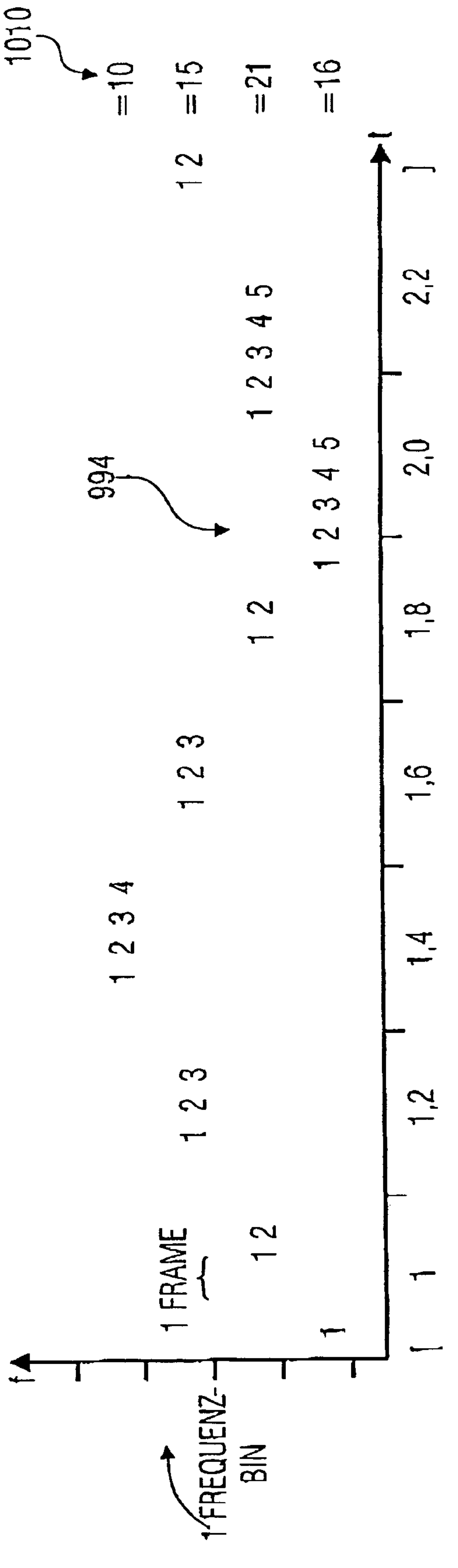
FIG. 32 shows a schematical illustration of a segment from the melody line course for illustrating the proceedings of the tone smoothing according to FIG. 31.
Figure 33:
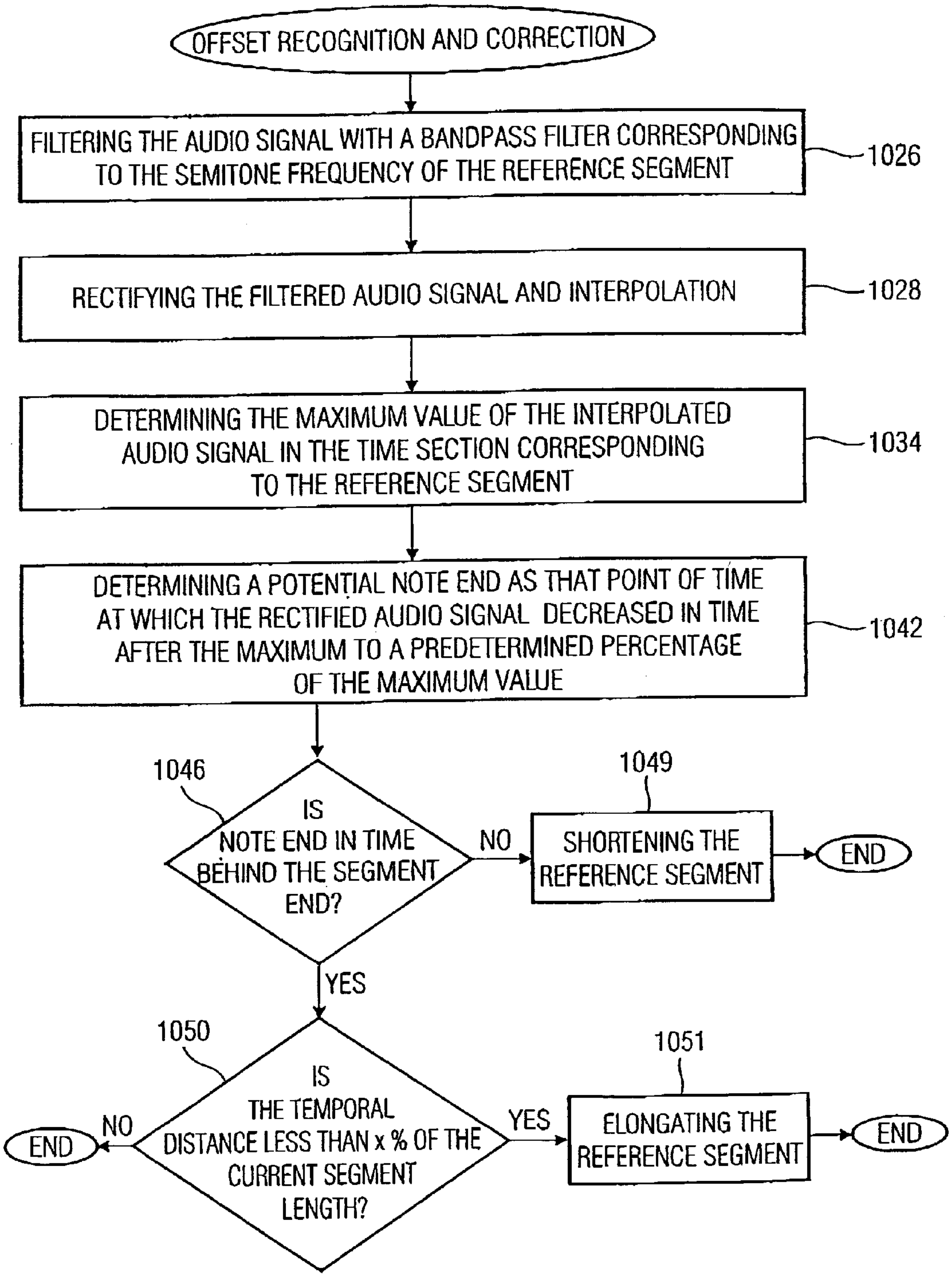
FIG. 33 shows a flow chart for illustrating the offset recognition and correction in FIG. 27.

FIG. 32 schematically shows one segment 994 in a great enlargement, as it is located in the melody line which results upon the tone separation 950. The illustration in FIG. 32 is such that in FIG. 32 for each tupel of frequency bin and frame which the segment 994 passes, a figure is provided at the corresponding tupel. The allocation of the figure is explained in more detail in the following with reference to FIG. 31. As it may be seen, the segment 994 in the exemplary case of FIG. 32 fluctuates across 4 frequency bins and extends across 27 frames.

The purpose of the tone smoothing is to select the one among the frequency bins between which the segment 994 fluctuates which is to be constantly associated to the segment 994 for all frames.

The tone smoothing begins in a step 996 with the initialization of a counter variable i to 1. In a subsequent step 998 a counter value z is initialized to 1. This counter variable i has the meaning of the numbering of the frames of the segment 994 from left to right in FIG. 32. The counter variable z has the meaning of a counter which counts across how many subsequent frames the segment 994 is located in one single frequency bin. In FIG. 32 for facilitating the understanding of the subsequent steps the value for z is already indicated for the individual frames in the form of the figures illustrating the course of the segment 994 in FIG. 32.

In a step 1000 now the counter value z is accumulated to a sum for the frequency bin of the i-th frame of the segment. For each frequency bin in which the segment 994 fluctuates to and fro, a sum or an accumulation value exists, respectively. The counter value may here be weighted according to a varying embodiment, like e.g. with a factor f(i), wherein f(i) is a function continuously increasing with i, in order to thus weight the portions to be summed up at the end of a segment more strongly, as the voice is already better assimilated to the tone, for example, compared to the transient process and the beginning of a note. Below the horizontal time axis in square brackets in FIG. 32 an example for such a function as f(i) is shown, wherein in FIG. 32 i increases along the time and indicates which position a certain frame takes among the frames of the neighboring segment, and subsequent values which take the exemplarily shown function for subsequent portions which are again indicated with small vertical lines along the time axis, are shown by numbers in those square brackets. As it may be seen, the exemplary weighting function increases with i from 1 to 2.2.

In a step 1002 it is examined whether the i-th frame is the last frame of the segment 994. If this is not the case, then in a step 1004 the counter variable i is incremented, i.e. a skip to the next frame is performed. In a subsequent step 1006 it is examined whether the segment 994 in the current frame, i.e. the i-th frame, is located in the same frequency bin, as where it was located in the (i−1)-th frame. If this is the case, in a step 1008 the counter variable z is imcremented, whereupon the processing again continues at step 1000. If the segment 994 in the i-th frame and the (i−1)-th frame is not in the same frequency bin, however, the processing continues with the initialization of the counter variable z to 1 in step 998.

If it is finally determined in step 1002 that the i-th frame is the last frame of the segment 994, then for each frequency bin in which the segment 994 is located a sum results, illustrated in FIG. 32 at 1010.

In a step 1012 upon the determination of the last frame in step 1002 the one frequency bin is selected for which the accumulated sum 1010 is largest. In the exemplary case of FIG. 32 this is the second lowest frequency bin among the four frequency bins in which the segment 994 is located. In a step 1014 then the reference segment 994 is smoothed by exchanging the same with a segment in which to each of the frames at which the segment 994 was located the selected frequency bin is associated. The tone smoothing of FIG. 31 is repeated segment by segment for all segments.

In other words, the tone smoothing consequently serves for compensating the start of singing and launch of singing of tones starting from lower or higher frequencies and facilitates this by determining a value across the temporal course of a tone which corresponds to the frequency of the steady-state tone. For the determination of the frequency value from the oscillating signal all elements of a frequency band are counted up, whereupon all counted-up elements of a frequency band located at the note sequence are added up. Then, the tone is plotted in the frequency band with the highest sum over the time of the note sequence.

After the tone smoothing 992, subsequently a statistical correction 916 is performed, wherein the performance of the statistical correction corresponds to that of FIG. 3, i.e. in particular to step 898. After the statistical correction 1016 follows a semitone mapping 1018 which corresponds to the semitone mapping 912 of FIG. 3 and also uses a semitone vector which is determined in a semitone vector determination 1020 that corresponds the one of FIG. 3 at 818.

The steps 950, 992, 1016, 1018 and 1020 consequently correspond to step 760 of FIG. 2.

After the semitone mapping 1018 an onset recognition 1022 follows which basically corresponds to the one of FIG. 3, i.e. step 914. Only preferably it is prevented in step 932 that gaps are closed again or that segments imposed by the tone separation 950 are closed again, respectively.

After the onset recognition 1022 an offset recognition and correction 1024 follows which is explained in more detail with reference to FIGS. 32–35. In contrast to the onset recognition, the offset recognition and correction serves for correcting the note end points of time. The offset recognition 1024 serves to prevent the echoing of monophonic pieces of music.

In a step 1026 similar to step 916, first of all the audio signal is filtered with a band pass filter corresponding to the semitone frequency of the reference segment, whereupon in a step 1028 corresponding to step 918 the filtered audio signal is two-way rectified. Further, in step 1028 again an interpretation of the rectified time signal is performed. This proceeding is sufficient for the case of offset recognition and correction in order to approximately determine an envelope, whereby the complicated step 920 of the onset recognition may be omitted.

Figure 34:
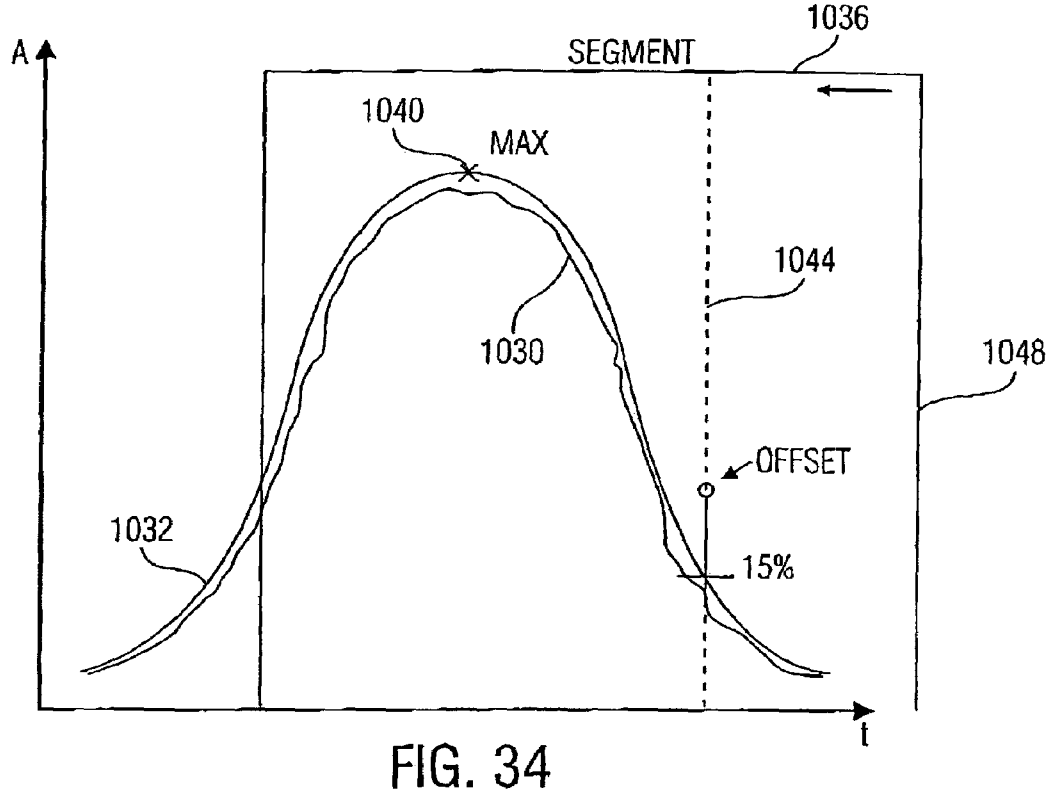
FIG. 34 shows a schematically illustration of a section from a two-way rectified filtered audio signal and its interpolation for illustrating the proceedings according to FIG. 33.
Figure 35:
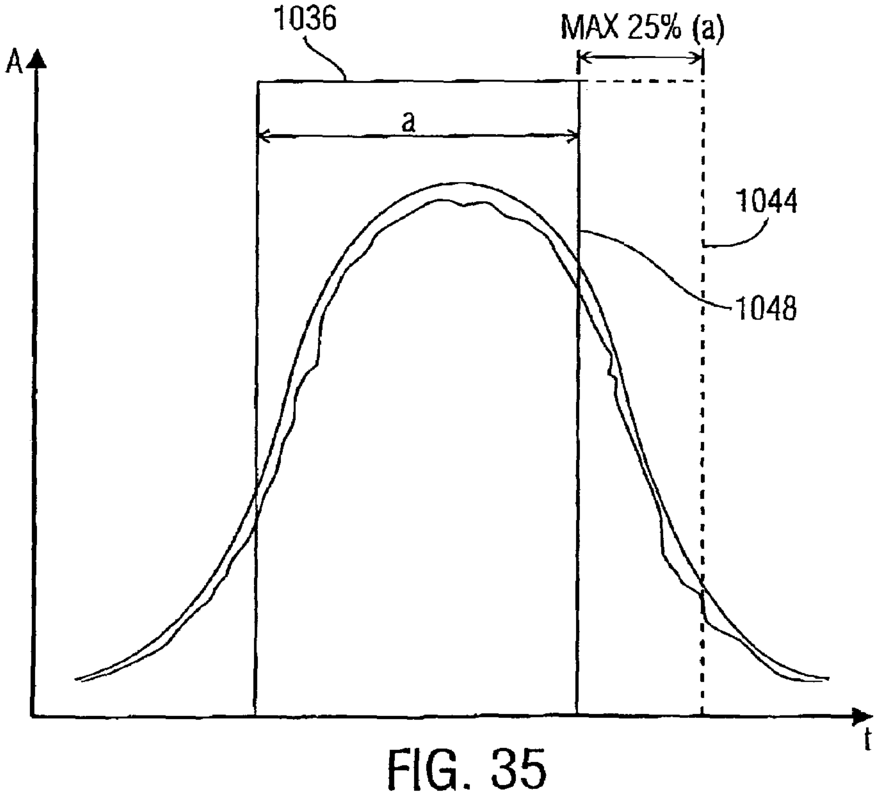
FIG. 35 shows a section from a two-way rectified filtered audio signal and its interpolation for the case of a potential segment elongation.

FIG. 34 shows in a graph in which along the x axis the time t is plotted in virtual units and along the y axis the amplitude A is plotted in virtual units, the interpolated time signal for example with a reference numeral 1030 and for a comparison to that the envelope with a reference numeral 1032, as it is determined in the onset recognition in step 920.

In a step 1034 now, in the time section 1036 corresponding to a reference segment a maximum of the interpolated time signal 1030 is determined, i.e. in particular the value of the interpolated time signal 1030 at the maximum 1040. In a step 1042, thereupon a potential note end point of time is determined as the point of time at which the rectified audio signal has fallen in time after the maximum 1040 to a predetermined percentage of the value at the maximum 1040, wherein the percentage in step 1042 is preferably 15%. The potential note end is illustrated in FIG. 34 with a dashed line 1044.

In a subsequent step 1046 it is then examined whether the potential note end 1044 is temporally after the segment end 1048. If this is not the case, as it is exemplarily shown in FIG. 34, then the reference segment of the time area 1036 is shortened in order to end at the potential note end 1044. If, however, the note end is in time before the segment end, as it is exemplarily shown in FIG. 35, then it is examined in a step 1050 whether the temporal distance between the potential note end 1044 and the segment end 1048 is less than a predetermined percentage of the current segment length a, wherein the predetermined percentage in step 1050 is preferably 25%. If the result of the examination 1050 is positive, an elongation 1051 of the reference segment by the length a takes place, in order to now end at the potential note end 1044. In order to prevent an overlapping with the subsequent segment, the step 1051 may, however, also be dependent on a threatening overlapping in order not to be performed in this case or only up to the beginning of the follower segment, if applicable with a certain distance to the same.

If the examination in step 1050 is negative, however, no offset correction takes place and the step 1034 and the following steps are repeated for another reference segment of the same semitone frequency, or it is proceeded with step 1026 for other semitone frequencies.

After the offset recognition 1024, in step 1052 a length segmentation 1052 corresponding to the step 938 of FIG. 3 is performed, whereupon a MIDI output 1054 follows corresponding to the step 940 of FIG. 3. The steps 1022, 1024 and 1052 correspond to step 762 of FIG. 2.

With reference to the preceding description of FIGS. 3–35, now the following is noted. The two alternative proceedings presented there for a melody extraction include different aspects which do not all have to be contained simultaneously in an operative proceeding for melody extraction. First of all it is noted, that basically the steps 770–774 may also be combined by converting the spectral values of the spectrogram of the frequency analysis 752 only using a single look-up in a look-up table into the perception-related spectral values.

Basically it would of course also be possible to omit the steps 770–774 or only the steps 772 and 774, which will, however, lead to a deterioration of the melody line determination in step 780 and therefore to a deterioration of the overall result of the melody extraction method.

In the basic frequency determination 776 a tone model of Goto was used. Other tone models or other weightings of the overtone portions, respectively, would also be possible, however, and could for example be adjusted to the origin or the source of the audio signal, respectively, as far as the same is known, like e.g. when in the embodiment of the ring tone generation the user is determined to hum.

With regard to the determination of the potential melody line in step 780 it is noted that according to the above-mentioned statement of musical science for each frame only the basic frequency of the loudest sound portion was selected, that it is further possible, however, to restrict the selection not only to a unique selection of the largest proportion for each frame. Just like it is for example the case in Paiva, the determination of the potential melody line 780 might comprise the association of several frequency bins to one single frame. Subsequently, a finding of several trajectories may be performed. This means the allowance of a selection of several basic frequencies or several sounds for each frame. The subsequent segmentation would then of course partially have to be performed differently and in particular the subsequent segmentation would be somewhat more expensive, as several trajectories or segments, respectively, would have to be considered and found. Conversely, in this case some of the above-mentioned steps or substeps could be taken over in the segmentation also for this case of the determination of trajectories which may overlap in time. In particular steps 786, 796 and 804 of the general segmentation may easily be also be transferred to this case. The step 806 could be transferred to the case that the melody line consists of trajectories overlapping in time, if this step took place after the identification of the trajectories. The identification of trajectories could take place similar to step 810, wherein, however, modifications would have to be performed such that also several trajectories overlapping in time may be traced. Also the gap-closing could be performed in a similar way for such trajectories between which no time gap exists. Also the harmony mapping could be performed between two trajectories directly subsequent in time. The vibrato recognition or the vibrato compensation, respectively, could easily be applied to one single trajectory just like to the above-mentioned non-overlapping melody line segments. Also the onset recognition and correction could also be applied with trajectories. The same holds true for the tone separation and the tone smoothing as well as for the offset recognition and correction and for the statistical correction and the length segmentation. The admission of the temporal overlapping of trajectories of the melody line in the determination in step 780 at least required, however, that before the actual note sequence output the temporal overlapping of trajectories has to be removed at some time. The advantage of the determination of the potential melody line in the above-described way with reference to FIGS. 3 and 27 is, that the number of the segments to be examined is restricted in advance to the most important aspect after the general segmentation, and that even the melody line determination itself in step 780 is very simple and yet leads to a good melody extraction or note sequence generation or transcription, respectively.

The above-described implementation of the general segmentation does not have to comprise all substeps 786, 796, 804 and 806, but may also include a selection from the same.

In gap closing, in steps 840 and 842 the perception-related spectrum was used. Basically it is possible, however, to also use the logarithmized spectrum or the spectrogram directly obtained from the frequency analysis in these steps, wherein, however, the use of the perception-related spectrum in these steps resulted in the best result with regard to melody extraction. Similar things hold true for step 870 of harmony mapping.

With regard to the harmony mapping it is noted that it might be provided there, when shifting 868 the follower segment, to perform the shifting only in the direction of the melody center line, so the second condition in step 874 may be omitted. With reference to step 872 it is noted that a non-ambiguity in the selection of the different lines of the octave, fifth and/or third may be achieved by the fact that among the same a priority ranking list is generated, like e.g. octave line before line of fifth before line of third, and among lines of the same line type (line of octave, fifth or third), the one which is closer to the original position of the follower segment.

With regard to the onset recognition and the offset recognition it is noted that the determination of the envelope or the interpolated time signal used instead in offset recognition, respectively, might also be performed differently. It is only essential, that in the onset and offset recognition the audio signal is used that is filtered with a band pass filter with a transmission characteristic around the respective semitone frequency in order to recognize the initial point of time of the note from the increase of the envelope of the thus formed filtered signal or the end point of time of the note using the decrease of the envelope.

With regard to the flow charts among FIGS. 8–41 it is noted that the same show the operation of the melody extraction means 304 and that each of the steps illustrated by a block in this flow chart may be implemented in a corresponding partial means of means 304. The implementation of the individual steps may thereby be realized in hardware as an ASIC circuit part or in software as a subroutine. In particular, in these figures the explanations written into the blocks coarsely show which process the respective step relates to which corresponds to the respective block, while the arrows between the blocks illustrate the order of the steps in the operation of means 304.

In particular it is noted, that depending on the conditions, the inventive scheme may also be implemented in software. The implementation may be performed on a digital storage medium, in particular a floppy disc or a CD with electronically readable control signals which may cooperate with a programmable computer system such that the corresponding method is performed. In general, the invention thus also consists in a computer program product having a program code stored on a machine readable carrier for performing the inventive method, when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for smoothing a melody line segment, comprising a provider for providing a time/spectral representation of the audio signal, wherein the provider for providing is implemented such that it provides a time/spectral representation that comprises a spectral band with a sequence of spectral values for each of a plurality of spectral components and that the time/spectral representation in each spectral band comprises a spectral value for each time section of a sequence of time sections of the audio signal;

a determinater for determining, on the basis of the time/spectral representation of the audio signal, a melody line segment of the audio signal that respectively uniquely associates one spectral component to each time section of a section of the sequence of time sections; and a tone smoother which is implemented to associate a number to each time section of the melody segment such that for all groups of directly adjacent time sections, that have the same spectral component associated to the same by the melody line segment, the numbers associated to the directly neighboring time sections are different numbers from one up to the number of the directly neighboring time sections, for each spectral component associated with one of the time sections of the melody line segment, add up the numbers of those groups to which time sections of the same the respective spectral component is associated by the melody line segment, determine a smoothing spectral component as the spectral component for which the greatest summing-up results;

change the melody line segment by associating the certain smoothing spectral component to each time section of the melody line segment.

2. The device according to claim 1, wherein the determinater for determining, on the basis of the time/spectral representation of the audio signal, the first melody line segment is implemented in order to determine, on the basis of the time/spectral representation of the audio signal, a melody line of the audio signal including the melody line segment by a unique association of exactly the one spectral component to each time section for which the time/spectral representation or a version of the time/spectral representation derived from the same is maximum.

3. The device according to claim 2, wherein the determinater for determining the melody line comprises:

a scaler for scaling the time/spectral representation using curves of equal volume reflecting the human volume perception in order to obtain a perception-related time/spectral representation; and the determinater for determining the melody of the audio signal based on the perception-related time/spectral representation.

4. The device according to claim 3, wherein the scaler for scaling comprises:

a logarithmizer for logarithmizing the spectral values of the time/spectral representation in order to indicate the sonic pressure level, whereby a logarithmized time/spectral representation is obtained; and a mapper for mapping the logarithmized spectral values of the logarithmized time/spectral representation, depending on their respective value and the spectral components to which they belong, to perception-related spectral values in order to obtain the perception-related time/spectral representation.

5. The device according to claim 4, wherein the mapper for mapping is implemented in order to perform the mapping based on functions representing the curves of equal volume, associating a logarithmic spectral value to each spectral component indicating a sonic pressure level, and are associated with different volumes.

6. The device according to claim 5, wherein the determinater for determining the melody line of the audio signal is implemented to delogarithmize the spectral values of the perception-related spectrum, in order to obtain a delogarithmized perception-related spectrum with delogarithmized perception-related spectral values, sum up, for each time section and for each spectral component, the delogarithmized perception-related spectral value of the respective spectral component and the delogarithmized perception-related spectral values of those spectral components representing a partial tone to the respective spectral component, in order to obtain a spectral sound value, whereby a time/sound representation is obtained, and generate a melody line by uniquely allocating the spectral components to each time section for which the summing-up for the corresponding time section results in the greatest spectral sound value.

7. The device according to claim 6, wherein the determinater for determining the melody line of the audio signal is implemented to differently weight the delogarithmized perception-related spectral values of the respective spectral components and that of those spectral components illustrating a partial tone to the respective spectral component in the summing-ups, so that the delogarithmized perception-related spectral values of partial tones of higher order are weighted less.

8. The device according to claim 6, further comprising:

the determinater for determining the melody of the audio signal based on the melody line, wherein the harmony mapper is part of the determinater for determining the melody line.

9. The device according to claim 8, wherein the determinater for determining the melody of the audio signal further comprises:

a segmenter for segmenting the melody line in order to obtain segments.

10. The device according to claim 9, wherein the segmenter for segmenting is implemented in order to prefilter the melody line in a state, as the melody line is indicated in binary form in a melody matrix of matrix positions which is spanned by the spectral components on the one side and the time sections on the other side.

11. The device according to claim 10, wherein the segmenter for segmenting is implemented in order to sum up the entry into this and neighboring matrix positions for each matrix position when prefiltering, compare the resulting information value to a threshold value and enter the comparative result at a corresponding matrix position in an intermediate matrix and subsequently multiply the melody matrix and the intermediate matrix in order to obtain the melody line in a prefiltered form.

12. The device according to claim 9, wherein the segmenter for segmenting is implemented to leave a part of the melody line unconsidered, which is outside a predetermined spectral value, during a subsequent part of the segmentation.

13. The device according to claim 12, wherein the segmenter for segmenting is implemented such that the predetermined spectral range reaches from 50–200 Hz to 1000–1200 Hz.

14. The device according to claim 9, wherein the segmenter for segmenting is implemented to leave a part of the melody line unconsidered in a subsequent part of the segmentation at which the logarithmized time/spectral representation comprises logarithmized spectral values which are less than a predetermined percentage of the maximum logarithmized spectral value of the logarithmized time/spectral representation.

15. The device according to claim 9, wherein the segmenter for segmenting is implemented in order to leave parts of the melody line unconsidered in a subsequent part of the segmentation at which, according to the melody line, less than a predetermined number of spectral components associated with neighboring time sections have a distance to each other which is smaller than a semitone distance.

16. The device according to claim 12, wherein the segmenter for segmenting is implemented in order to division the melody line reduced by the unconsidered parts into segments such that the number of the segments is as small as possible and neighboring time sections of a segment are associated with spectral components according to the melody line whose distance is smaller than a predetermined measure.

17. The device according to claim 16, wherein the segmenter for segmenting is implemented to close a gap between neighboring segments, in order to obtain a segment from the neighboring segments when the gap is smaller than a first number of time sections, and when with the time sections of the neighboring segments which are closest to the respective other one of the neighboring segments spectral components are associated by the melody line, which are in a same semitone area or in adjacent semitone areas, to only close the gap in the case that the same is greater than or equal to the first number of time sections but smaller than a second number of time sections which is larger than the first number, when spectral components are associated with the time sections of the neighboring segments, by the melody line, which are closest to the respective other one of the neighboring segments, which lie in the same semitone area or in adjacent semitone areas, the perception-related spectral values at those time sections are different by less than a predetermined threshold value; and an average value of all perception-related spectral values along a connecting line between the neighboring segments is greater than or equal to the average values of the perception-spectral values along the two neighboring segments.

18. The device according to claim 17, wherein the segmenter for segmenting is implemented in order to determine those spectral components within the scope of the segmentation which are associated with the time sections according to the melody line most frequently, and to determine a set of semitones relative to this spectral component, which are separated from each other by semitone boundaries which in turn define the semitone areas.

19. The device according to claim 17, wherein the segmenter for segmenting is implemented to perform the closing of the gap by means of a straight connecting line.

20. The device according to claim 16, wherein the segmenter for segmenting is implemented to temporarily shift a follower segment of the segments which is directly neighboring to a reference segment of the segments without a time section lying in between, in the spectrum direction in order to obtain a line of an octave, fifth and/or third;

select one or none of the line of the octave, fifth and/or third depending on whether a minimum among the perception-related spectral values along the reference segment has a predetermined relation to a minimum among the perception-related spectral values along the line of the octave, fifth and/or third; and if the line of the octave, fifth and/or third is selected, shift the follower segment finally onto the selected line of the octave, fifth and/or third.

21. The device according to claim 20, wherein the segmenter for segmenting is implemented to generate a melody center line by use of an averagevalue filter for the melody line and to perform the final shifting only if it points from the second melody line segment in the direction of the melody center line.

22. The device according to claim 20, wherein the segmenter for segmenting is implemented to make the selection depending on whether a minimum of the time/spectral representation or a version of the time/spectral representation derived from the same has a certain relation to a minimum of the time/spectral representation or the version derived from the same along the line of the octave, fifth and/or third, along the first melody line segment.

23. The device according to claim 16, wherein the segmenter for segmenting is implemented to determine all local extremes of the melody line in a predetermined segment;

determine a sequence of neighboring extremes among the determined extremes for which all neighboring extremes are arranged at spectral components which are less than a first predetermined measure separate from each other and at time sections which are separate from each other by less than a second predetermined measure, and change the predetermined segment so that the time sections of the sequence of extremes and the time sections between the sequence of extremes are associated with (894) the average value of the spectral components of the melody line at these time sections.

24. The device according to claim 16, wherein the segmenter for segmenting is implemented in order to determine the spectral component within the scope of the segmentation which is associated most frequently to the time sections according to the melody line and to determine a set of semitones relative to this spectral component which are separated from each other by semitone boundaries which in turn define the semitone areas, and wherein the segmenter for segmenting is implemented to change for each time section in each segment the spectral component associated with the same to a semitone of the set of semitones.

25. The device according to claim 24, wherein the segmenter for segmenting is implemented in order to perform the change to the semitones such that this semitone among the set of semitones comes closest to the spectral component to be changed.

26. The device according to claim 24, wherein the segmenter for segmenting is implemented to filter the audio signal comprising a transmission characteristic around the common semitone of a predetermined segment with a band pass filter in order to obtain a filtered audio signal;

examine the filtered audio signal in order to determine at which points of time an envelope of the filtered audio signal comprises inflection points, wherein these points of time represent candidate initial points of time, depending on whether a predetermined candidate initial point of time is less than a predetermined time period before the first segment, elongate the predetermined segment to the front by one or several further time sections, in order to obtain an elongated segment which ends approximately at the predetermined candidate initial point of time.

27. The device according to claim 26, wherein the segmenter for segmenting is implemented in order to shorten a preceding segment to the front when elongating the predetermined segment, when by this an overlapping of the segments across one or several time sections is prevented.

28. The device according to claim 26, wherein the segmenter for segmenting is implemented to depending on whether the predetermined candidate initial point of time is more than the first predetermined time duration before the first time section of the predetermined segment, trace in the perception-related time/spectral representation the perception-related spectral values along an elongation of the predetermined segment in the direction of the candidate initial point of time up to a virtual point of time where the same decrease by more than a predetermined gradient, and to then, depending on whether the predetermined candidate initial point of time is more than the first predetermined time duration before the virtual point of time, elongate the predetermined segment to the front by one or several further time sections in order to obtain the elongated segment which approximately ends at the predetermined candidate initial point of time.

29. The device according to claim 26, wherein the segmenter for segmenting is implemented to discard segments which are shorter than a predetermined number of time sections after performing the filtering, the determination and the supplementation.

30. The device according to claim 9, further comprising a converter for converting the segments into notes, wherein the converter for converting is implemented in order to allocate to each segment a note initial point of time which corresponds to the first time section of the segment, a note duration that corresponds to the number of the time sections of the segment multiplied by a time section time duration, and a tone pitch corresponding to an average of the spectral components which the segment passes.

31. The device according to claim 16, wherein the segmenter for segmenting is implemented to determine overtone segments for a predetermined one of the segments, determine the tone segment among the overtone segments along which the time/spectral representation of the audio signal comprises the greatest dynamic, establish a minimum in the course) of the time/spectral representation along the predetermined overtone segment;

examine whether the minimum fulfills a predetermined condition, and if this is the case, separate a predetermined segment at the time section where the minimum is located into two segments.

32. The device according to claim 31, wherein the segmenter for segmenting is implemented to compare, in the examination whether the minimum fulfills a predetermined condition, the minimum to an average value of neighboring local maxima of the course of the time/spectral representation along the predetermined overtone segment, and perform the separation of the predetermined segment into the two segments depending on the comparison.

33. The device according to claim 14, wherein the segmenter for segmenting is implemented to filter the audio signal with a band pass filter comprising a band pass around the common semitone of a predetermined segment in order to obtain a filtered audio signal;

localize, in an envelope of the filtered audio signal, a maximum in a time window corresponding to the predetermined segment;

determine a potential segment end as the point of time at which the envelope first fell to a value after the maximum which is smaller than a predetermined threshold value, if the potential segment end is temporally before an actual segment end of the predetermined segment, shorten the predetermined segment.

34. The device according to claim 33 wherein the segmenter for segmenting is implemented to, if the potential segment end is temporally behind the actual segment end of the predetermined segment, elongate the predetermined segment if the temporal distance between the potential segment end and the actual segment end is not greater than a predetermined threshold value.

35. A device according to claim 1, wherein the determinater for determining the melody line of the audio signal is implemented to for each time section and for each spectral component, sum up the spectral value of the respective spectral component, or a scaled spectral value obtained from the same by scaling, and the spectral values to those spectral components representing a partial tone for the respective spectral component, or scaled spectral values obtained from the same, by scaling in order to obtain a spectral sound value whereby a time/strain representation is obtained, and generate a melody line by uniquely allocating to each time section that spectral component for which the summing-up for the corresponding time section yields the highest spectral sound value.

36. A method for smoothing a melody line segment, comprising the steps of:

providing a time/spectral representation of the audio signal, wherein the provider for providing is implemented such that it provides a time/spectral representation comprising for each of a plurality of spectral components a spectral band with a sequence of spectral values, and that the time/spectral representation comprises in each spectral band a spectral value for each time section of a sequence of time sections of the audio signal;

determine on the basis of a time/spectral representation of the audio signal a melody line segment of the audio signal that uniquely associates one spectral component to each time section of a section of the sequence of time sections; and performing a tone smoothing by allocating a number to each time section of the melody line segment such that for all groups of directly neighboring time sections, to which the same spectral component is associated by the melody line segment, the numbers allocated to the directly neighboring time sections are different numbers from one to the number of the directly neighboring time sections, for each spectral component associated with one of the time sections of the melody line segment, adding up the numbers of those groups to which time sections of the same the respective spectral component is associated by the melody line segment, determining a smoothing spectral component as the spectral component for which the greatest summing-up results; and changing the melody line segment by associating to each time section of the melody line segment the determined smoothing spectral component.

37. A computer program having a program code for performing the method for smoothing a melody line segment, comprising the steps of:

providing a time/spectral representation of the audio signal, wherein the provider for providing is implemented such that it provides a time/spectral representation comprising for each of a plurality of spectral components a spectral band with a sequence of spectral values, and that the time/spectral representation comprises in each spectral band a spectral value for each time section of a sequence of time sections of the audio signal;

determine on the basis of a time/spectral representation of the audio signal a melody line segment of the audio signal that uniquely associates one spectral component to each time section of a section of the sequence of time sections; and performing a tone smoothing by allocating a number to each time section of the melody line segment such that for all groups of directly neighboring time sections, to which the same spectral component is associated by the melody line segment, the numbers allocated to the directly neighboring time sections are different numbers from one to the number of the directly neighboring time sections, for each spectral component associated with one of the time sections of the melody line segment, adding up the numbers of those groups to which time sections of the same the respective spectral component is associated by the melody line segment, determining a smoothing spectral component as the spectral component for which the greatest summing-up results; and changing the melody line segment by associating to each time section of the melody line segment the determined smoothing spectral component when the computer program runs on a computer.

* * * * *